: United States Patent  (10) Patent No.: US 11,771,285 B2
Jang et al.  (45) Date of Patent: Oct. 3, 2023

(54) MOBILE ROBOT

(71) Applicant: LG ELECTRONICS INC., Seoul (KR)

(72) Inventors: Jaewon Jang, Seoul (KR); Youngbin Kim, Seoul (KR); Yeongjae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 220 days.

(21) Appl. No.: 16/943,262

(22) Filed: Jul. 30, 2020

(65) Prior Publication Data

US 2021/0030236 A1 Feb. 4, 2021

(30) Foreign Application Priority Data

Jul. 31, 2019 (KR) ........................ 10-2019-0093483
Dec. 27, 2019 (KR) ........................ 10-2019-0176626

(51) Int. Cl.
*A47L 11/293* (2006.01)
*A47L 11/24* (2006.01)
*A47L 11/40* (2006.01)
*B25J 11/00* (2006.01)

(52) U.S. Cl.
CPC ............. *A47L 11/293* (2013.01); *A47L 11/24* (2013.01); *A47L 11/4005* (2013.01); *A47L 11/4016* (2013.01); *A47L 11/4038* (2013.01); *A47L 11/4041* (2013.01); *A47L 11/4069* (2013.01);
(Continued)

(58) Field of Classification Search
CPC ............. A47L 2201/04; A47L 2201/00; A47L 11/4061; A47L 11/293; A47L 11/24; A47L 11/4005; A47L 11/4016; A47L 11/4038; A47L 11/4041; A47L 11/4069; A47L 11/4072; A47L 11/4083
See application file for complete search history.

(56) References Cited

U.S. PATENT DOCUMENTS 11,116,377 B2 * 9/2021 Goto ................... A47L 11/4038
2015/0150429 A1 * 6/2015 Yoo ..................... A47L 11/4011
173/4
2019/0038106 A1 2/2019 Jang et al.

FOREIGN PATENT DOCUMENTS

CN 206761643 U 12/2017
CN 108024682 A 5/2018
CN 108372508 A 8/2018
(Continued)

OTHER PUBLICATIONS

Translation of EP0841868B1 (Year: 2022).*
(Continued)

*Primary Examiner* — Don M Anderson
*Assistant Examiner* — Sarah Akyaa Fordjour
(74) *Attorney, Agent, or Firm* — Birch, Stewart, Kolasch & Birch, LLP

(57) ABSTRACT

A center of gravity of a mobile cleaning robot may be positioned on an imaginary central longitudinal axis of the mobile robot. The center of gravity of the mobile robot may be positioned at a front side of an imaginary central horizontal line connecting spin rotation axes of left and right spin mops of the mobile robot. The center of gravity of the mobile robot may also be positioned at a front side of a center of gravity of a battery and a center of gravity of a water tank, and at a rear side of a center of gravity of a sweep module of the mobile robot.

13 Claims, 44 Drawing Sheets

(52) U.S. Cl.
CPC ....... *A47L 11/4072* (2013.01); *A47L 11/4083* (2013.01); *B25J 11/0085* (2013.01)

(56) References Cited

FOREIGN PATENT DOCUMENTS

| CN | 109715026 | A |   | 5/2019 |           |
|----|-----------|---|---|--------|-----------|
| CN | 208926226 | U |   | 6/2019 |           |
| EP | 0841868   | B1| * | 5/1998 |           |
| JP | 09263140  | A | * | 10/1997| A47L 11/4061 |
| JP | 2005-40578| A |   | 2/2005 |           |
| JP | 2018-099293|  |   | 6/2018 |           |
| KR | 10-2013-0131674 | A |  | 12/2013 |         |
| KR | 10-2018-0008248 |   |  | 1/2018  |         |
| KR | 20180008248 | A | * | 1/2018 |           |
| KR | 10-2019-0002702 |   |  | 1/2019  |         |
| KR | 10-2019-0015934 |   |  | 2/2019  |         |
| KR | 20190015934 | A1| * | 2/2019 |           |
| KR | 10-1966083  |   |   | 4/2019 |           |
| TW | I634403     | B |   | 9/2018 |           |
| TW | 201909827   | A |   | 3/2019 |           |

OTHER PUBLICATIONS

Translation of KR20180008248A (Year: 2022).*
Translation of JP-09263140-A (Year: 2023).*
Translation of KR20190015934A1 (Year: 2023).*
PCT Search Report dated Jun. 1, 2020, in PCT International Patent Application No. PCT/KR2020/001369.
European Search Report dated Dec. 16, 2020, in European Patent Application No. 20188859.1.

* cited by examiner

MOBILE ROBOT

TECHNICAL FIELD

The present disclosure relates to a mobile robot mopping a floor.

BACKGROUND

A mobile robot is a device that cleans a floor by picking up a foreign material such as a dust on the floor or wiping a foreign material on the floor. Recently, a mobile robot capable of mopping a floor has been developed. In addition, a mobile robot is a device that cleans while driving or traveling on its own.

As a conventional art, a mobile robot capable of moving by a mop surface is known. In the above-mentioned convention art, the mobile robot is provided with a first rotating member and a second rotating member for fixing a pair of mop surfaces arranged in a left-right direction and rotating on axes in an up-down direction or a vertical direction. The mobile robot according to the conventional art moves as the first rotating member and the second rotating member rotate in a state that only the mop surfaces fixed to the first rotating member and the second rotating member are in contact with the floor.

In the conventional art, when water is supplied to mops attached to the first rotating member and the second rotating member, it may be difficult to distribute the water evenly.

In addition, in the conventional art, an agitator is disposed at a front side of a dust container in a dry-type module. A robot cleaner may have a circular shape when viewed from an upper side to easily rotate at a corner and to improve aesthetics. In this instance, if the agitator does not protrude from a body, a width of the agitator is limited to a diameter of the body. Further, since the agitator is disposed at a front side of a dust container and a spin mop, a width of the agitator may be similar to a radius of the body.

Therefore, in the conventional art, the agitator may protrude toward a front side of the body of a dry-type module in order to increase a width of the agitator. In this structure, a rotation of the robot cleaner may be not easy and a volume of the robot cleaner may be large.

Further, in the conventional art, since the robot cleaner proceeds only by friction force of spin mops and a water level of stored water in a water tank is variable, it may be difficult to effectively mop a floor and driving power may be not sufficient.

Particularly, it may be very difficult for the conventional wet-type robot to adjust a traveling direction by friction force with rotating mops. According, cleaning is performed only by a random driving, and cleaning by driving the robot in a pattern in order to meticulously clean a surface is not possible.

Further, in the conventional art, since the cleaning is possible only by the random driving, meticulous cleaning at a corner of a floor or an area adjacent to a wall may be difficult.

SUMMARY

In a first aspect, the present disclosure describes a robot cleaner or a mobile robot that is able to increase a friction force between a mop and a floor regardless of a water-level change in a water tank for effective mopping and running, and to drive the robot in a pattern that allows meticulous cleaning through accurate driving.

In a second aspect, the present disclosure describes a robot cleaner or a mobile robot that is able to maintain a cleaning range of a dry-type module in a structure with a body that has a circular shape to facilitate a rotation of the robot cleaner. In this instance, an agitator is disposed at a rear side of a dust container (to be adjacent to a center of the body) so that the agitator has a sufficiently large width and a dry-type module is disposed not to protrude to an outside of the body.

In the conventional robot cleaner, there is a problem in that stability in a front-rear direction is poor as the robot cleaner is supported by two points at a pair of left and right mops. The present disclosure solves this problem and improves stability in a left-right direction and in a front-rear direction of a robot cleaner due to a structure that is supported at four points.

In a third aspect, the present disclosure describes a robot cleaner or a mobile robot that is able to achieve stable driving performance by deviating or positioning a center of gravity of the robot cleaner to a front side of a spin mop through appropriately disposing a battery, a motor, a water tank, a dry-type module, and spin mops with respect to rotation axes and a central longitudinal axis of the mobile robot.

Since the conventional robot cleaner moves by a pair of rotating mop surfaces at a left side and a right side, friction force generated by the pair of rotating mop surfaces may be frequently changed and thus it may be difficult to drive the robot cleaner in a straight line. Since driving in a straight line is difficult, the conventional robot cleaner may pass an area where driving in a straight line is necessary, such as, an area adjacent to a wall or so on, without mopping a floor. Thus, an area where the mopping is not performed may increase. Accordingly, in a fourth aspect of the present disclosure, a robot cleaner or a mobile robot solves the problem of driving in a straight line.

When the conventional robot cleaner mops a floor, a foreign material having a relatively large size does not adhere well to a mop surface, and thus, the foreign material having the relatively large size may remain on the floor even after the conventional robot cleaner mops the floor. Accordingly, in a fifth aspect of the present disclosure, a robot cleaner or a mobile robot solves the problem of removing foreign material having a relatively large size.

In a sixth aspect of the present disclosure, is a robot cleaner or mobile robot is able to perform both of dry-type cleaning and wet-type cleaning and thus to perform clean and efficient mopping.

In a robot cleaner or a mobile robot according to the present disclosure, a dust container is disposed at a front side of an agitator, and an entire portion of the agitator is vertically overlapped with a body.

In addition, in a robot cleaner or a mobile robot according to the present disclosure, a battery and a motor that are relatively heavy are disposed at an upper side of a spin mop.

In addition, in a robot cleaner or a mobile robot according to the present disclosure, a center of gravity of a mobile robot is disposed at a central longitudinal axis of the robot, is disposed at a front side of a central horizontal line connecting rotational axes of two spin mops, and is disposed at a rear side of two casters.

Specifically, a mobile robot according to the present disclosure includes a body; a left spin mop and a right spin mop, each rotatably installed on the body and supporting the body; a left-mop motor and a right-mop motor installed on the body and supplying driving force to the left spin mop and the right spin mop, respectively; and a battery installed on the body and supplying power to the left-mop motor and the right-mop motor. The left-mop motor is disposed on the left spin mop, the right-mop motor is disposed on the right spin mop, and at least a part of the battery is disposed on the left spin mop and the right spin mop.

Also, a mobile robot according to the present disclosure includes a body; a left caster and a right caster, each supporting the body and contacting a floor; a left spin mop and a right spin mop, each rotatably installed on the body, supporting the body, and disposed at a rear side of the left caster and the right caster. A center of gravity of the mobile robot is positioned at a rear side of a geometric center of the body.

The mobile robot may further include a left-mop motor installed on the body and supplying driving force to the left spin mop, and a right-mop motor installed on the body and supplying driving force to the right spin mop. The left-mop motor may be disposed on the left spin mop, and the right-mop motor may be disposed on the right spin mop.

The left-mop motor and the right-mop motor may be vertically overlapped with an imaginary central horizontal line connecting a spin rotation axis of the left spin mop and a spin rotation axis of the right spin mop.

The left-mop motor may be vertically overlapped with the left spin mop and may be deviated to a left side from a spin rotation axis of the left spin mop.

The left-mop motor may be vertically overlapped with the left spin mop and may be deviated to a left front side from a spin rotation axis of the left spin mop.

The right-mop motor may be vertically overlapped with the right spin mop and may be deviated to a right side from a spin rotation axis of the right spin mop.

The right-mop motor may be vertically overlapped with the right spin mop and may be deviated to a right front side from a spin rotation axis of the right spin mop.

The left-mop motor and the right-mop motor may be disposed symmetrically to each other with respect to an imaginary central longitudinal axis of the mobile robot.

The mobile robot may further include a battery installed on the body and supplying power to the left-mop motor and the right-mop motor. At least a part of the battery may be disposed on the left spin mop and the right spin mop.

The battery may be vertically overlapped with an imaginary central horizontal line connecting a spin rotation axis of the left spin mop and a spin rotation axis of the right spin mop.

A spin rotation axis of the left spin mop and a spin rotation axis of the right spin mop may be disposed at a rear side of a center of the body.

In addition, the mobile robot according to the present disclosure may further include a water tank disposed on the body of the mobile robot and storing water supplied to the left spin mop and the right spin mop. The water tank may be vertically overlapped with an imaginary central longitudinal axis of the mobile robot.

The battery may be vertically overlapped with the central longitudinal axis and may be disposed at a front side of the water tank.

A center of gravity of the battery and a center of gravity of the water tank may be positioned at the central longitudinal axis.

A center of gravity of the battery may be positioned at an imaginary central horizontal line connecting a spin rotation axis of the left spin mop and a spin rotation axis of the right spin mop. The center of gravity of the water tank may be positioned at a rear side of the imaginary central horizontal line.

The center of gravity of the mobile robot may move along the central longitudinal axis according to an amount of the water in the water tank.

A center of gravity of the battery may be positioned between a center of the body of the mobile robot and an imaginary central horizontal line connecting a spin rotation axis of the left spin mop and a spin rotation axis of the right spin mop. A center of gravity of the water tank may be positioned at a rear side of the imaginary central horizontal line.

The mobile robot according to the present disclosure may further include a sweep module disposed on the body of the mobile robot at a front side of the left spin mop and the right spin mop to be spaced apart from the left spin mop and the right spin mop and configured to collect a foreign material on the floor. A center of the sweep module may be positioned at an imaginary central longitudinal axis of the mobile robot.

A center of the sweep module may be positioned at a front side of a center of the body of the mobile robot.

The mobile robot according to the present disclosure may further include a sweep module disposed on the body at a front side of the left spin mop and the right spin mop to be spaced apart from the left spin mop and the right spin mop and configured to collect a foreign material on the floor. The sweep module may include: a dust housing having a storage space where a foreign material is stored; an agitator rotatably assembled with the dust housing and disposed at a rear side of the storage space; and a sweep motor providing a rotational force to the agitator. A rotation axis of the agitator may be parallel to an imaginary central horizontal line connecting a spin rotation axis of the left spin mop and a spin rotation axis of the right spin mop, and a center of the agitator may be positioned on an imaginary central longitudinal axis of the mobile robot.

The mobile robot according to the present disclosure may further include a left caster and a right caster, each disposed at both ends of the dust housing and contacting the floor. The left caster and the right caster may be disposed on a line parallel to the imaginary central horizontal line and may be disposed at a front side of the imaginary central horizontal line and the agitator.

The center of gravity of the mobile robot and the geometric center of the body may be positioned at an inside of an imaginary quadrangle formed by sequentially connecting the left caster, the right caster, a spin rotation axis of the right spin mop, and a spin rotation axis of the left spin mop.

The center of gravity of the mobile robot, the geometric center of the body, and a center of gravity of the battery may be positioned at an inside of an imaginary quadrangle formed by sequentially connecting the left caster, the right caster, a spin rotation axis of the right spin mop, and a spin rotation axis of the left spin mop. The center of gravity of the mobile robot, the geometric center of the body, and a center of gravity of the sweep module may be positioned at an inside of an imaginary quadrangle formed by sequentially connecting the left caster, the right caster, a spin rotation axis of the left spin mop, and a spin rotation axis of the right spin mop.

Further, a mobile robot according to embodiment includes: a body; a left spin mop and a right spin mop, each rotatably installed on the body and supporting the body; a left-mop motor and a right-mop motor installed on the body and supplying driving force to the left spin mop and the right spin mop, respectively; a sweep module disposed on the body at a front side of the left spin mop and the right spin mop to be spaced apart from the left spin mop and the right spin mop and collecting a foreign material on a floor; a battery supplying power to the left-mop motor and the right-mop motor and positioned at a rear side of the body of the sweep module; and a water tank storing water supplied to the left spin mop and the right spin mop and positioned at a rear side of the body of the mobile robot. A center of the battery, a center of the water tank, and a center of the sweep module are positioned at an imaginary central longitudinal axis of the mobile robot. The left spin mop and the right spin mop are symmetrically disposed relative to each other with respect to an imaginary central longitudinal axis. The left-mop motor is disposed on the left spin mop, and the right-mop motor is disposed on the right spin mop.

Furthermore, a mobile robot according to an embodiment of this disclosure includes: a body; a left spin mop and a right spin mop, each rotatably installed on the body and supporting the body; a left-mop motor and a right-mop motor installed on the body and supplying driving force to the left spin mop and the right spin mop, respectively; a sweep module disposed on the body at a front side of the left spin mop and the right spin mop to be spaced apart from the left spin mop and the right spin mop and configured to collect a foreign material on a floor; a battery supplying power to the left-mop motor and the right-mop motor and positioned at a rear side of the body of the sweep module; and a water tank storing water supplied to the left spin mop and the right spin mop and positioned at a rear side of the body of the battery. A center of gravity of the mobile robot is positioned on an imaginary central longitudinal axis of the mobile robot, is positioned at a front side of an imaginary central horizontal line connecting a spin rotation axis of the left spin mop and a spin rotation axis of the right spin mop, is positioned at a front side of a center of gravity of the battery and a center of gravity of the water tank, and is disposed at a rear side of a center of gravity of the sweep module.

In addition, a mobile robot according to an exemplary embodiment of this disclosure includes: a body; a left spin mop and a right spin mop, each rotatably installed on the body and supporting the body; and a left-mop motor and a right-mop motor installed on the body and supplying driving force to the left spin mop and the right spin mop, respectively. The left-mop motor is disposed on the left spin mop, and the right-mop motor is disposed on the right spin mop. The left-mop motor is vertically overlapped with the left spin mop and is deviated to a left front side from a spin rotation axis of the left spin mop. The right-mop motor is vertically overlapped with the right spin mop and is deviated to a right front side from a spin rotation axis of the right spin mop.

According to various exemplary embodiments of the present disclosure, a body of the mobile robot has a circular shape and a dry-type module does not protrude to an outside of the body. Accordingly, the robot cleaner can be freely rotated at any position in a cleaning area. Also, an agitator can have a sufficiently large width, and thus, a cleaning range can be wide, and both of collection and mopping of a foreign material having a relatively large size may be accomplished by a mobile robot according to this disclosure.

In addition, according to the present disclosure, friction force of a mop can be increased and efficiency of mopping a floor can be enhanced by disposing a battery and a motor that are heavier than other components or elements on the spin mop to be vertically overlapped with the spin mop.

In addition, according to the present disclosure, friction force of a mop can be increased and efficiency and accuracy of mopping a floor can be enhanced. Accordingly, in a cleaner that is driven by frictional force of a mop, an accurate driving of the mobile robot according to a desired pattern can be performed and meticulous cleaning can be performed better than in a random driving of the mobile robot.

In addition, according to the present disclosure, a robot cleaner or a mobile robot are in contact with a floor by a pair of spin mops at left and right sides and auxiliary wheels spaced apart from the spin mops in a front direction and spaced apart from each other in a left-right direction. Also, heavier components or elements of the mobile robot may be positioned such that a center of gravity of the mobile robot is positioned within an imaginary quadrangle formed by a pair of auxiliary wheels and a pair of spin mops. Accordingly, an overturn of the robot cleaner or the mobile robot to a front side can be prevented by a sweep module, and an overturn of the robot cleaner or the mobile robot to a rear side can be prevented by a mop surface of a mop module. Thus, stable driving is possible regardless of a water level of a water tank.

In addition, a sweep module provides friction force against shaking of a mop module in a left-right direction, and thus, a robot cleaner or a mobile robot can move straight while moving due to the friction force of the mop surface.

In addition, according to the present disclosure, a water level is exposed to a rear side of a body so that a user intuitively knows the water level, considering a spatial limitation. Also, a center of gravity of a battery that is relatively heavy is disposed between a geometric center of a body of the mobile robot and a central horizontal line connecting central axes of a pair of spin mops. The pair of spin mops may be disposed along a central horizontal line connecting central axes of the pair of spin mops at various elevations. Accordingly, a center of gravity of a robot cleaner or a mobile robot can be deviated to a front side of the central horizontal line through appropriately disposing the component or element that is relatively heavy, such as the battery.

In addition, by applying the largest friction force to a left front side of a lower surface of a left spin mop and applying the largest friction force to a right front side of a lower surface of a right spin mop, a ratio of weight of a rear side to weight of a front side is increased with respect to an imaginary axis connecting two points Pla and Plb, shown in FIG. 38, that receive the greatest friction force. In this case, with regard to a total load of the robot cleaner, a ratio of a load transmitted to a mop module to a load transmitted to a sweep module can be increased. Therefore, mopping efficiency and driving efficiency can be enhanced by a rotation operation of the mop module.

Furthermore, a pair of auxiliary wheels, a pair of mop driving units, and a pair of mop motors may be symmetrically arranged with respect to each other, and with respect to a central longitudinal axis of the mobile robot. A center of gravity or a geometric center of a battery, a water tank, or an agitator may be disposed along the central longitudinal axis of the mobile robot. Therefore, stability in a left-right direction can be enhanced and driving control can be more accurate.

Further, through disposing a center of gravity of a water tank, a battery and/or a pump along the central longitudinal axis of the mobile robot, the driving control can be more accurate.

In addition, by providing a collection driving unit including a motor rotation axis disposed along the central longitudinal axis of the mobile robot, the collection driving unit can be symmetrically provided with respect to the central longitudinal axis. On the other hand, a gap may be formed between a pair of collection portions and between a pair of sweeping portions, respectively. This arrangement of the collection portions and sweeping portions of the collection driving unit relative to a central longitudinal axis of the mobile robot results in the collection driving unit being bisymmetrical with a bi-lateral symmetry.

A sweep module is disposed at a front side of a mop module, and a pair of sweeping members are disposed at a front side of a pair of collection portions. Therefore, it is possible to mop a floor where sweeping of a foreign material was performed while following the swept portion. Accordingly, efficient cleaning can be possible.

DETAILED DESCRIPTION

Figure 1:
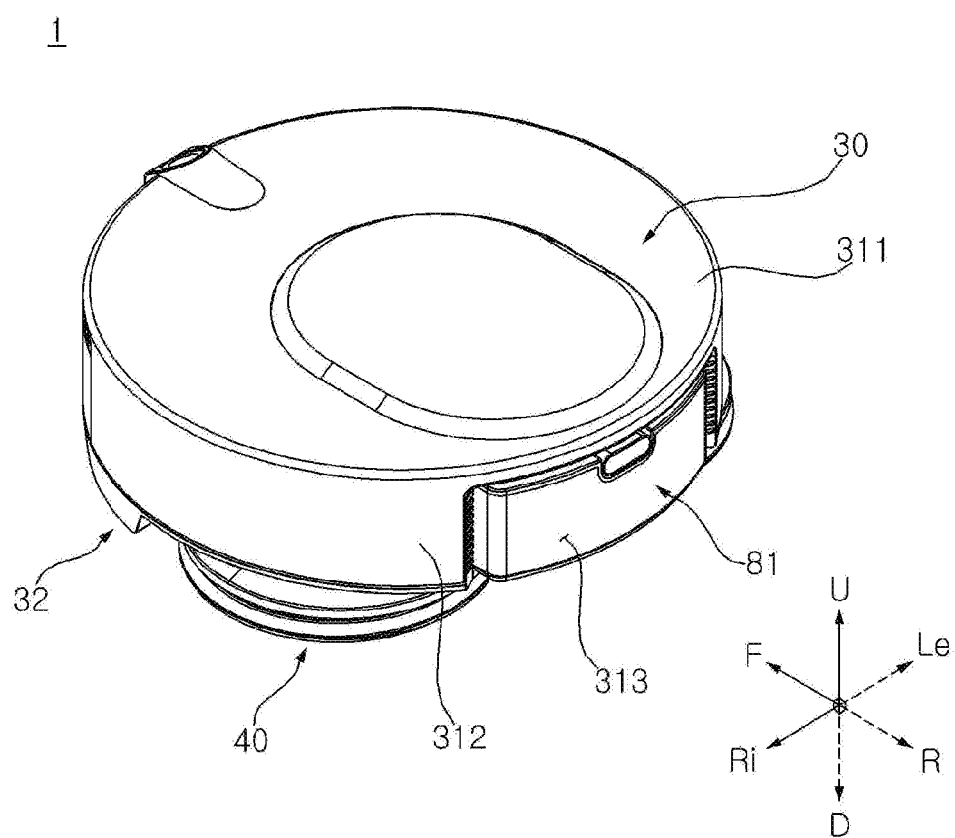
FIG. 1 is a perspective view of a mobile robot according to a first embodiment of the present disclosure.
Figure 2:
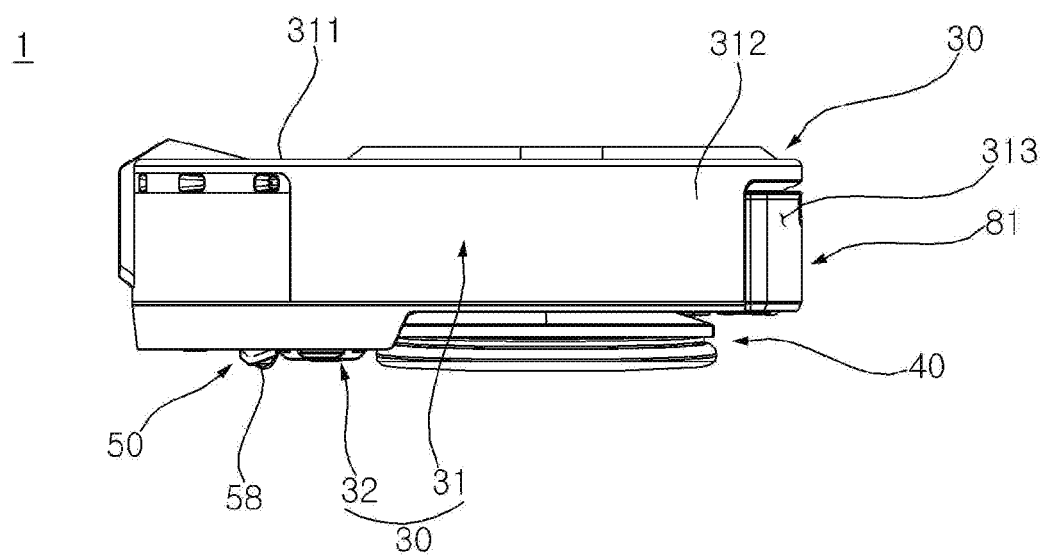
FIG. 2 is a left side view of the mobile robot shown in FIG. 1.
Figure 3:
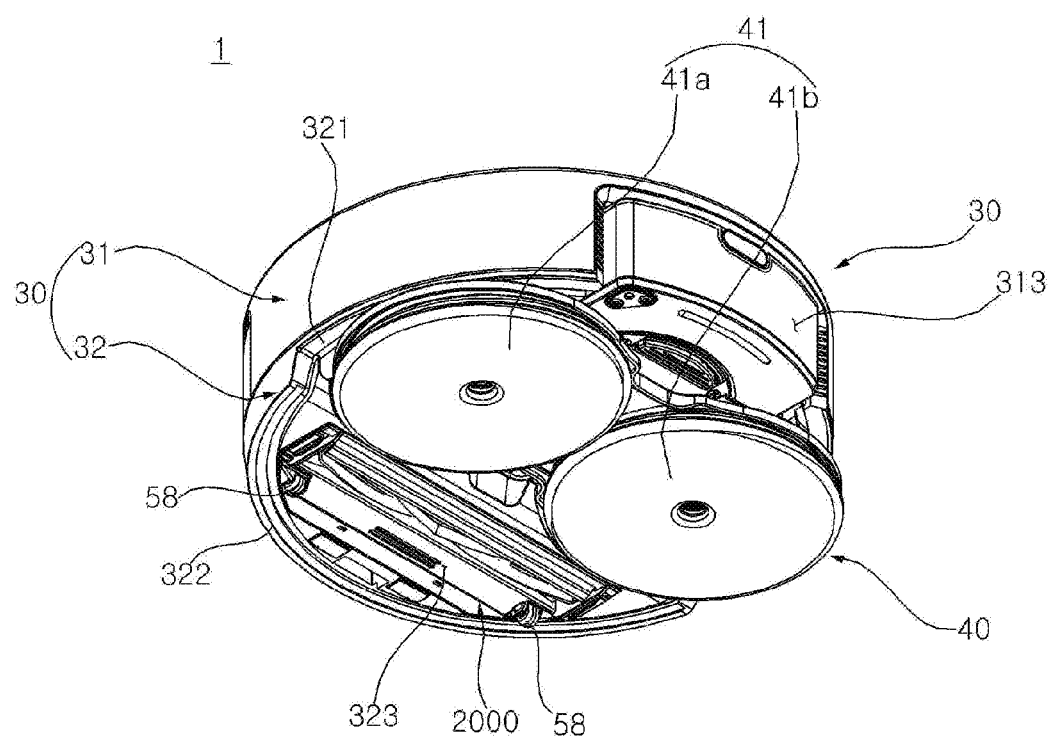
FIG. 3 is a bottom perspective view of the mobile robot shown in FIG. 1.
Figure 4:
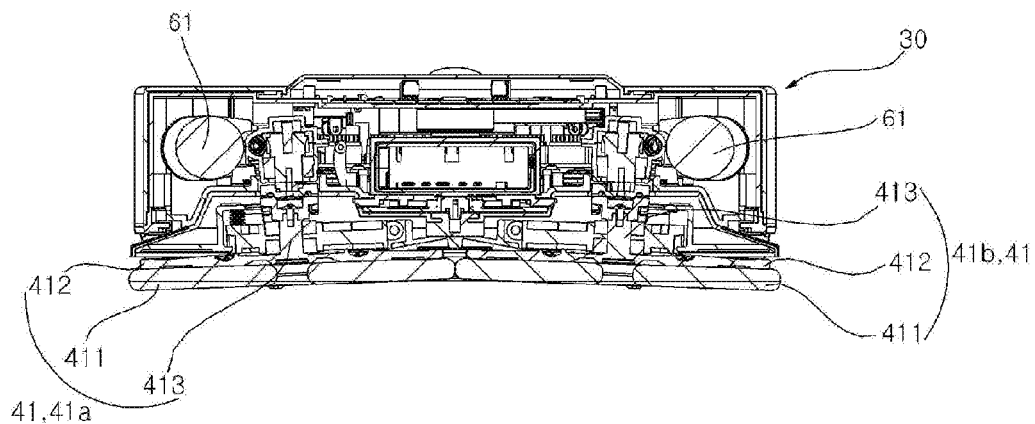
FIG. 4 is a front cross-sectional view of the mobile robot shown in FIG. 1.
Figure 5:
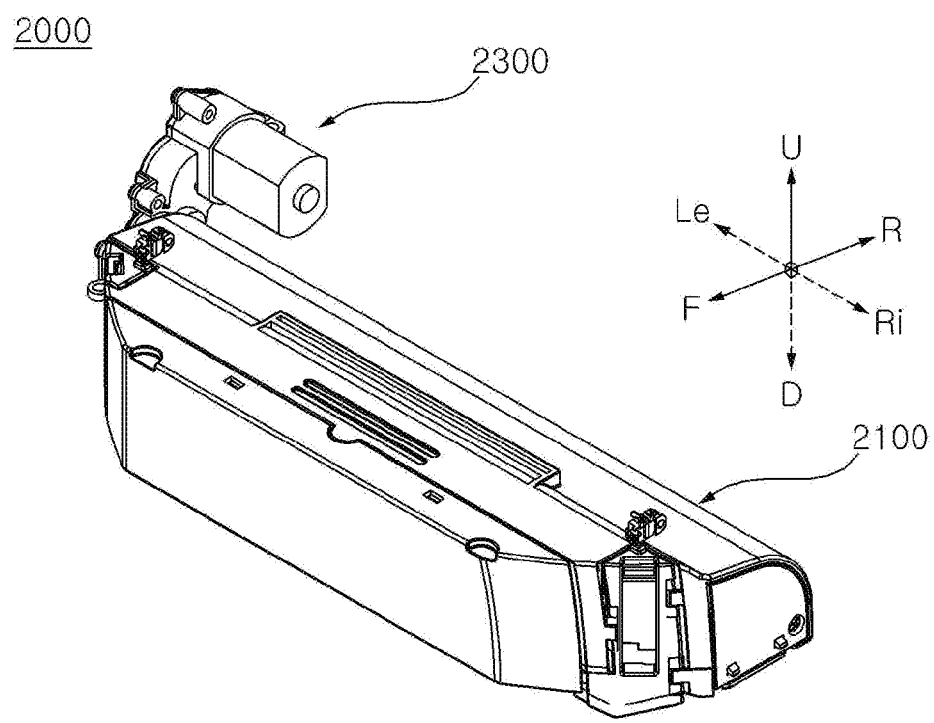
FIG. 5 is a perspective view of a sweep module shown in FIG. 3.
Figure 6:
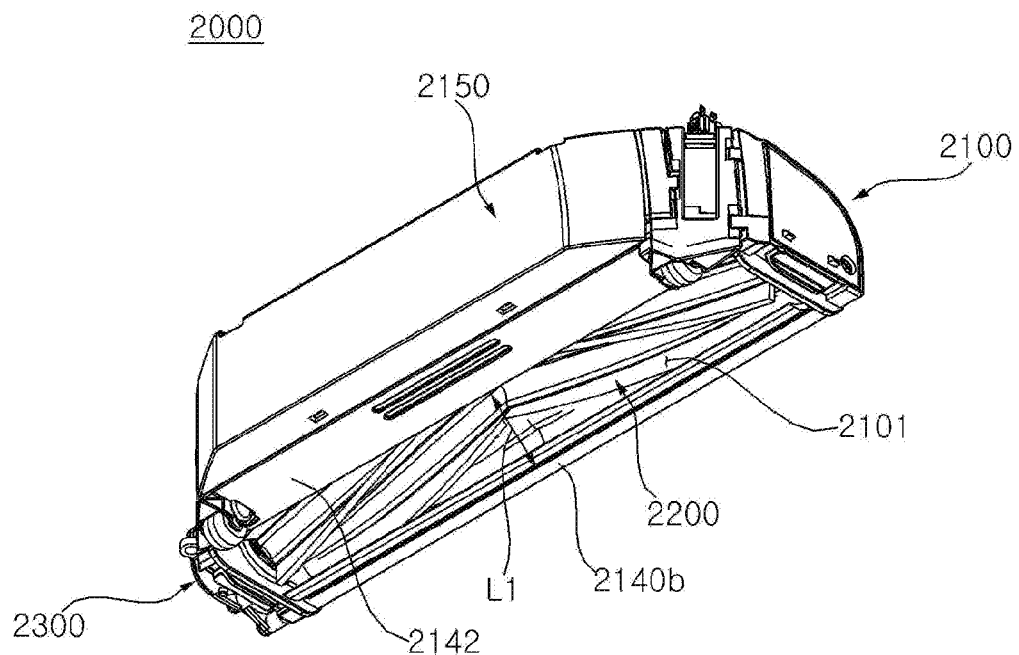
FIG. 6 is a bottom perspective view of the sweep module shown FIG. 5.
Figure 7:
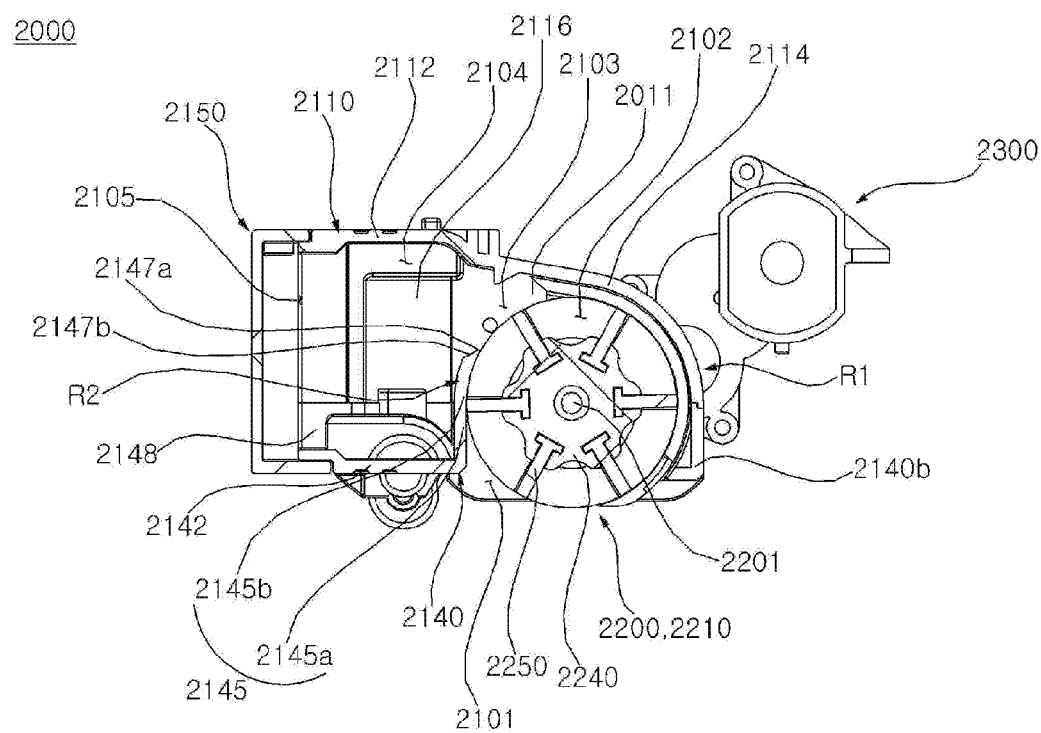
FIG. 7 is a right cross-sectional view of the sweep module shown in FIG. 5.
Figure 8:
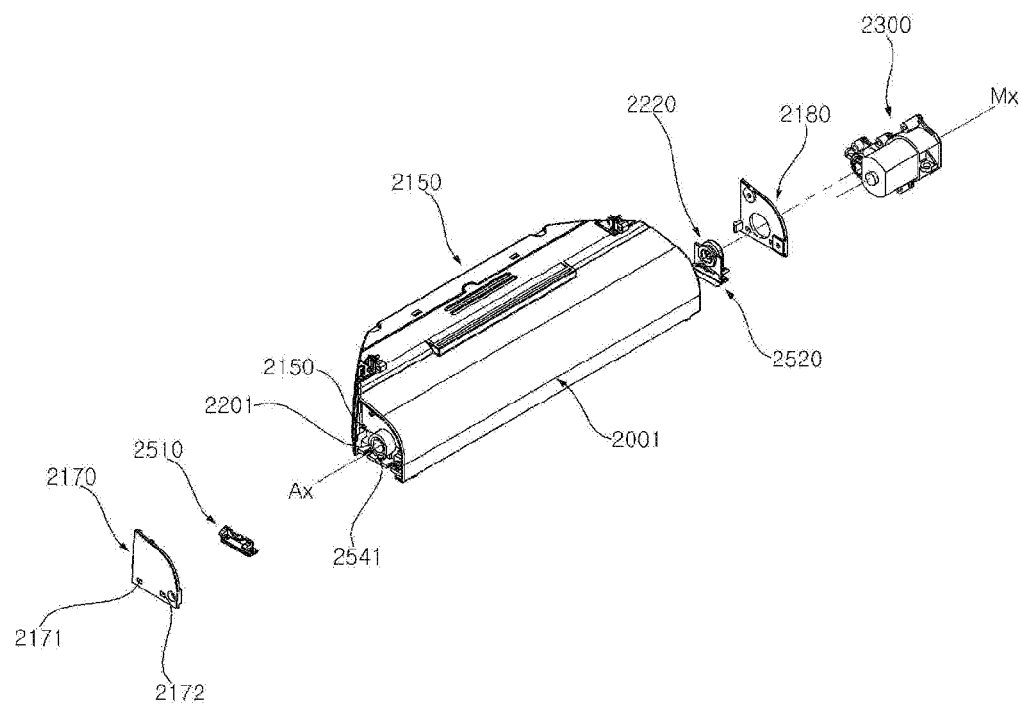
FIG. 8 is an exploded perspective view of the sweep module shown in FIG. 3.
Figure 9:
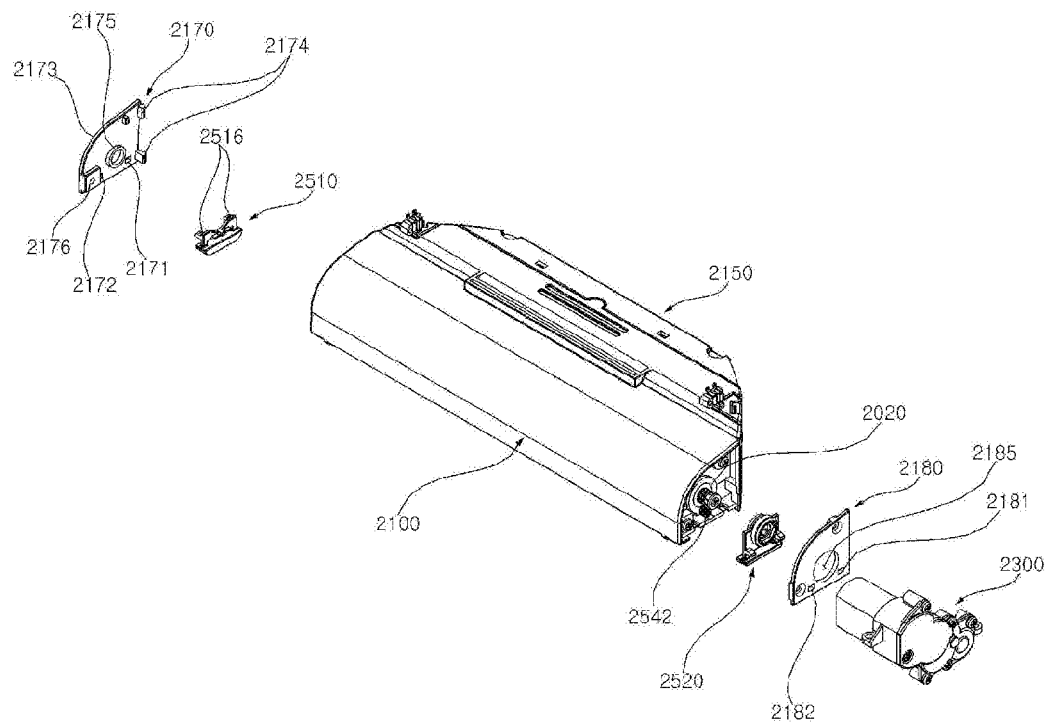
FIG. 9 is an exploded perspective view of the sweep module viewed from a right side of FIG. 8.
Figure 10:
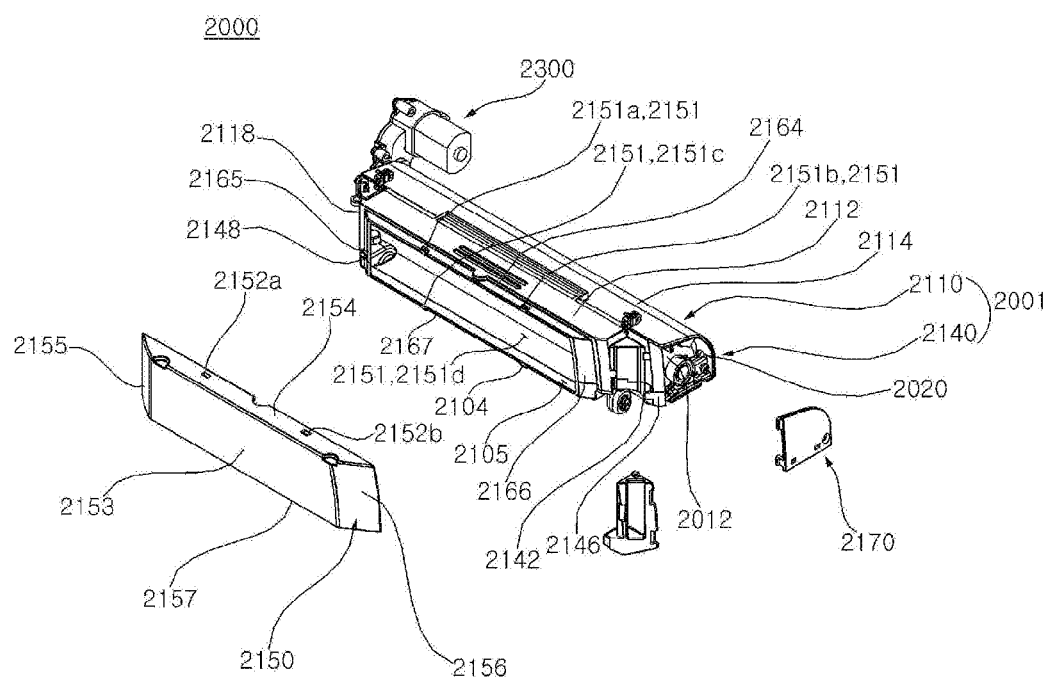
FIG. 10 is a partially exploded perspective view of the sweep module shown in FIG. 5.
Figure 11:
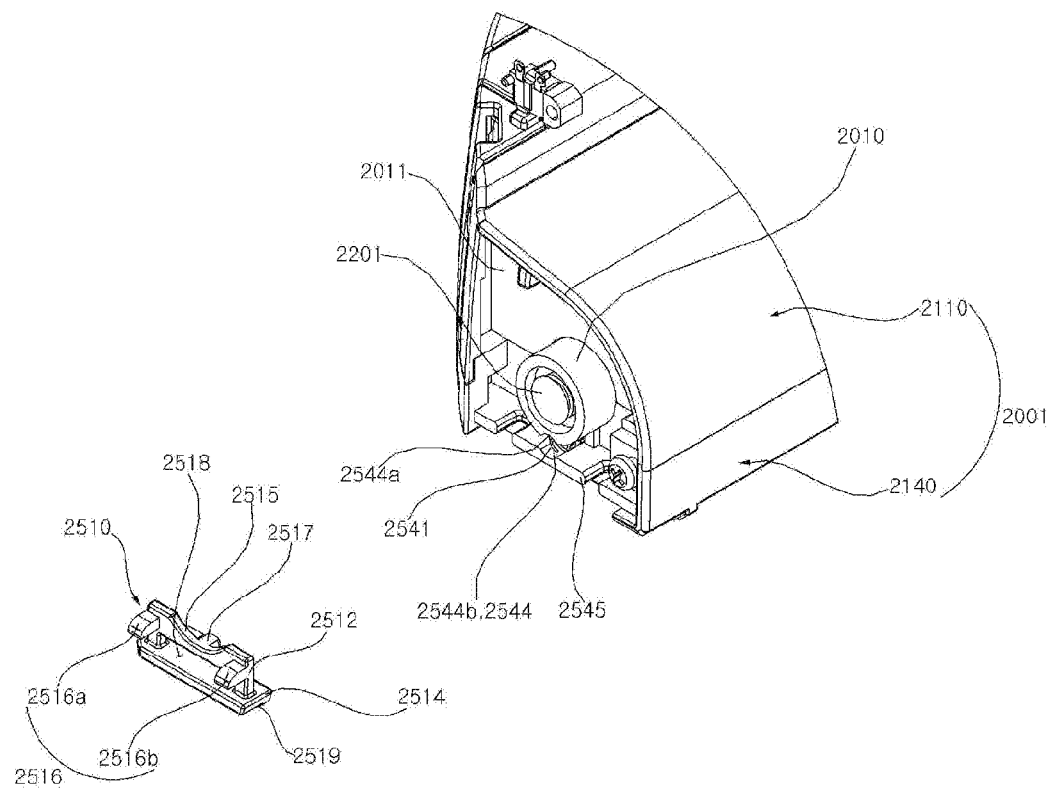
FIG. 11 is an enlarged perspective view of a first lever shown in FIG. 8.
Figure 12:
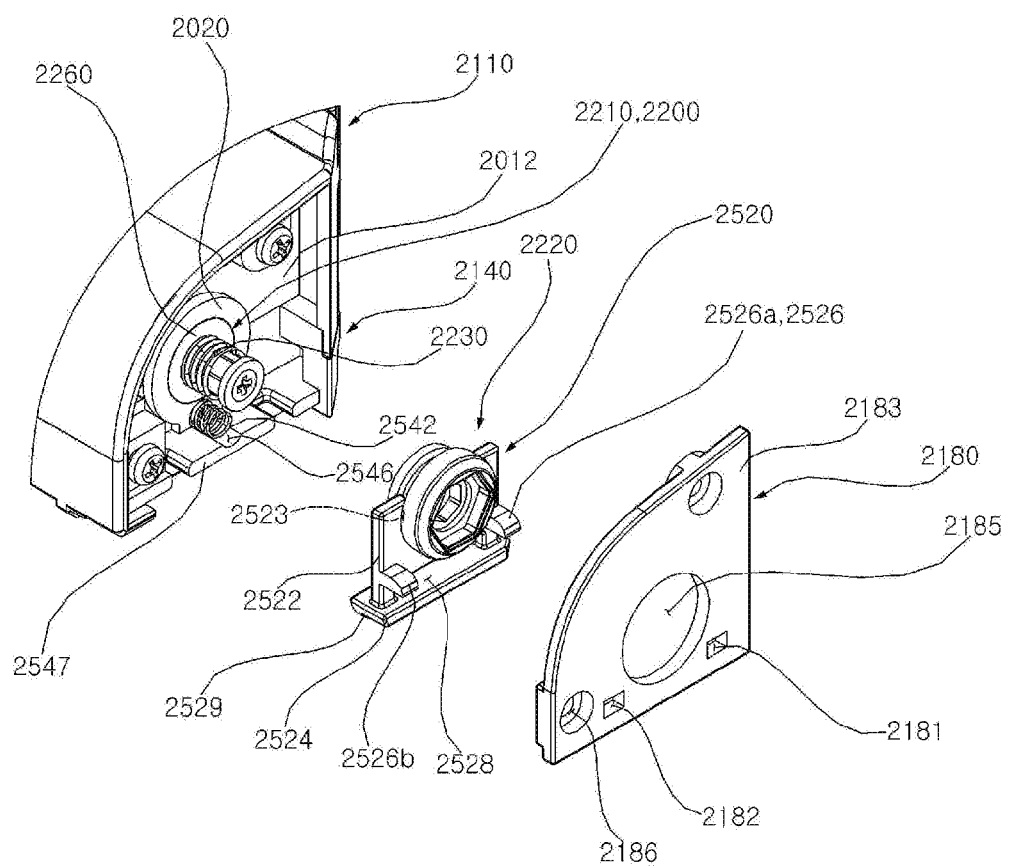
FIG. 12 is an enlarged perspective view of a second lever shown in FIG. 9.
Figure 13:
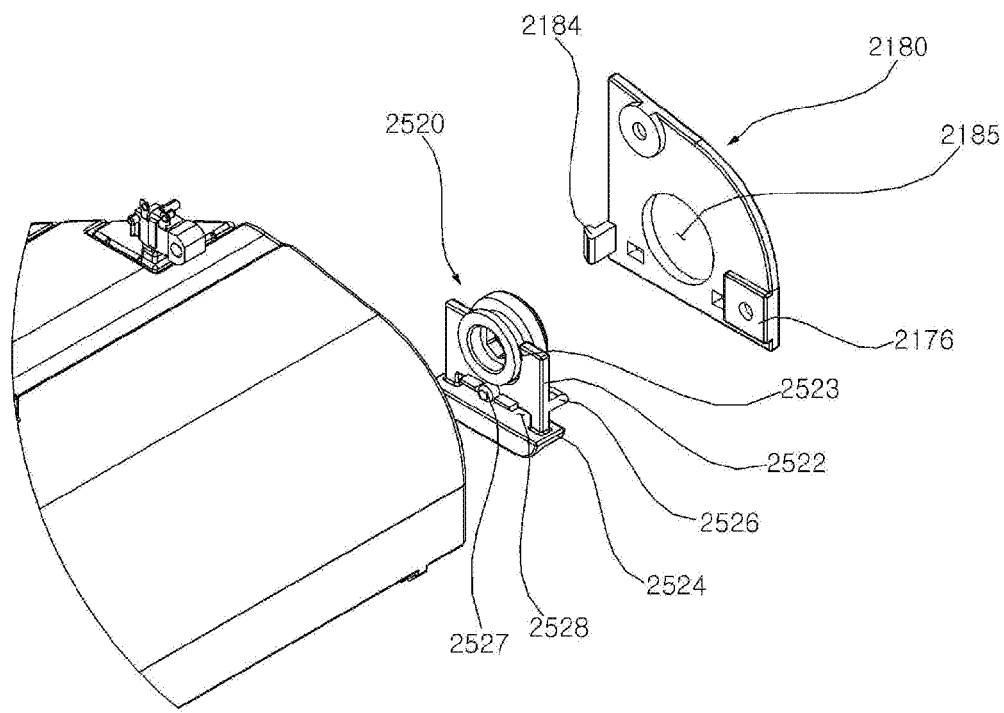
FIG. 13 is an enlarged perspective view of the second lever viewed from a left side of FIG. 12.
Figure 14:
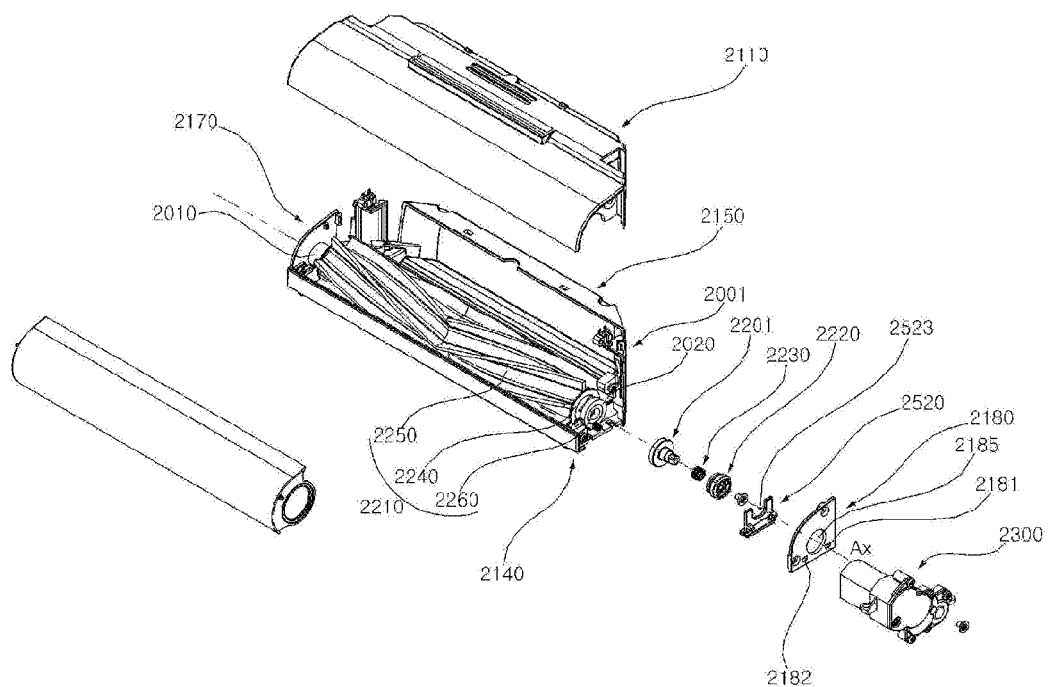
FIG. 14 is a partially exploded perspective view of the sweep module showing a coupled structure of an agitator shown in FIG. 5.
Figure 15:
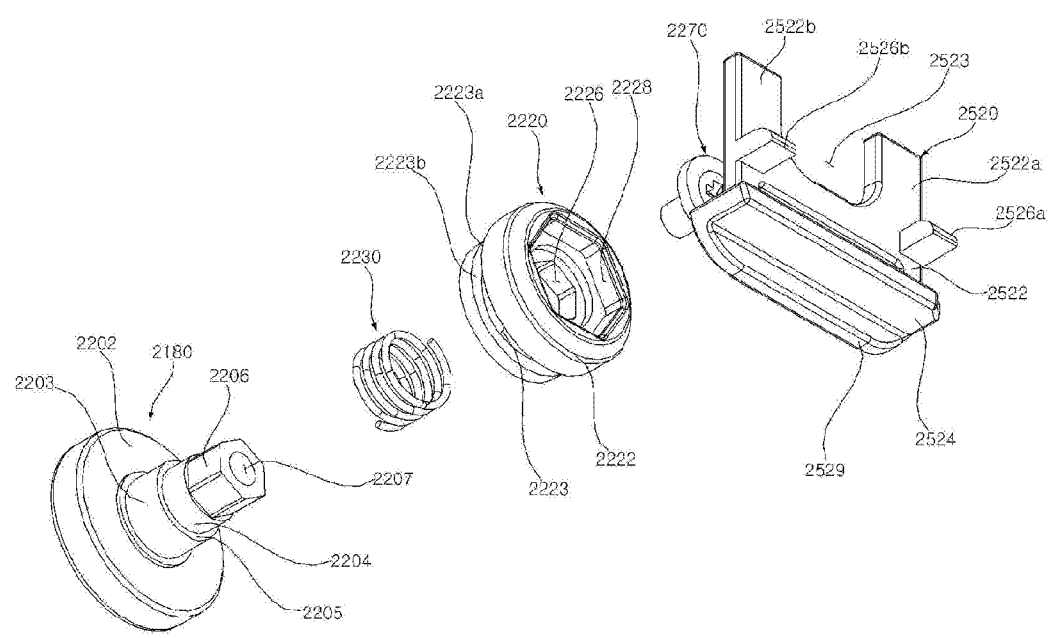
FIG. 15 is an exploded perspective view showing an assembled structure of a driven coupling shown in FIG. 14.
Figure 16:
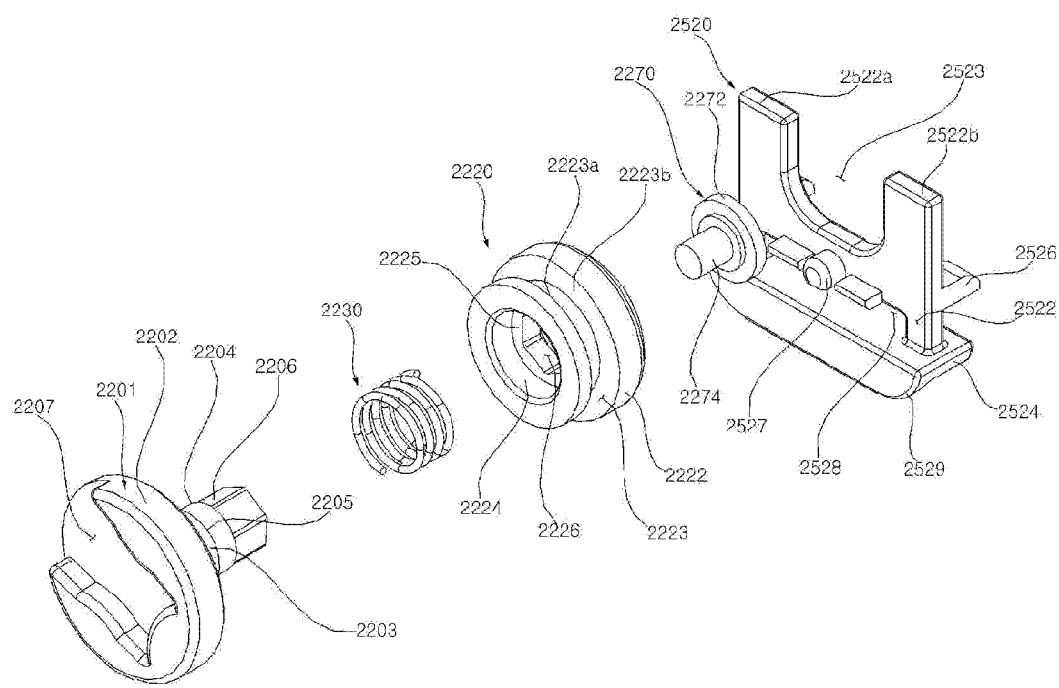
FIG. 16 is a perspective view viewed from a left side of FIG. 15.
Figure 17:
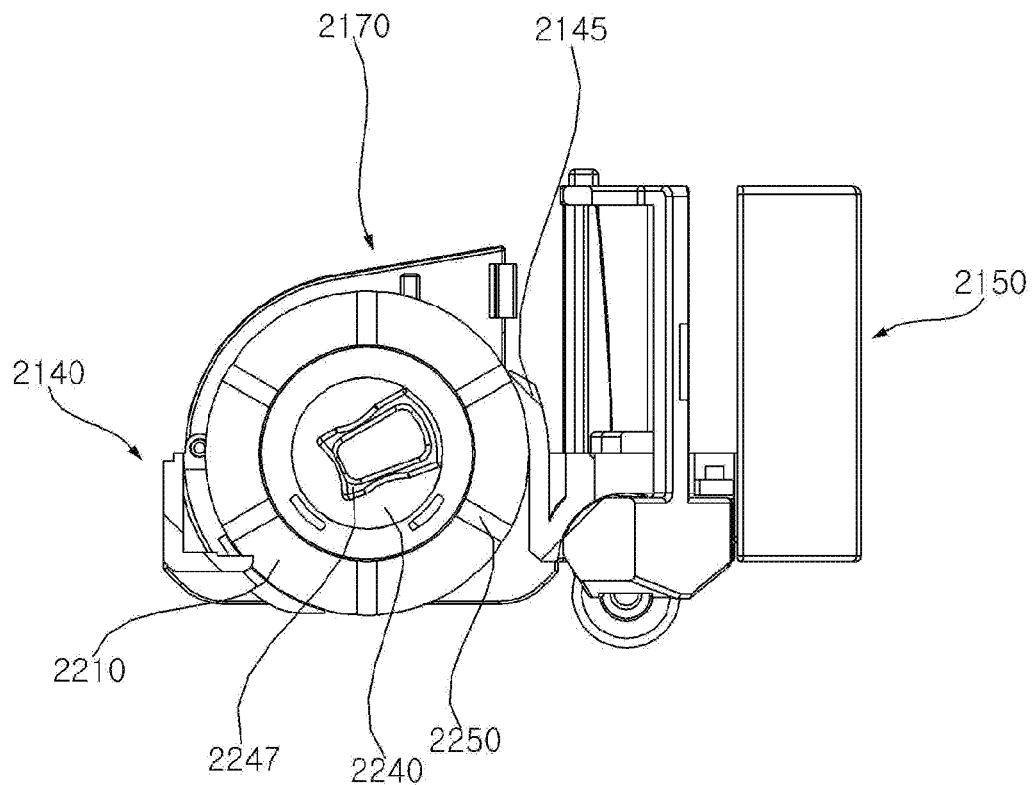
FIG. 17 is a right cross-sectional view showing the agitator of FIG. 14.
Figure 18:
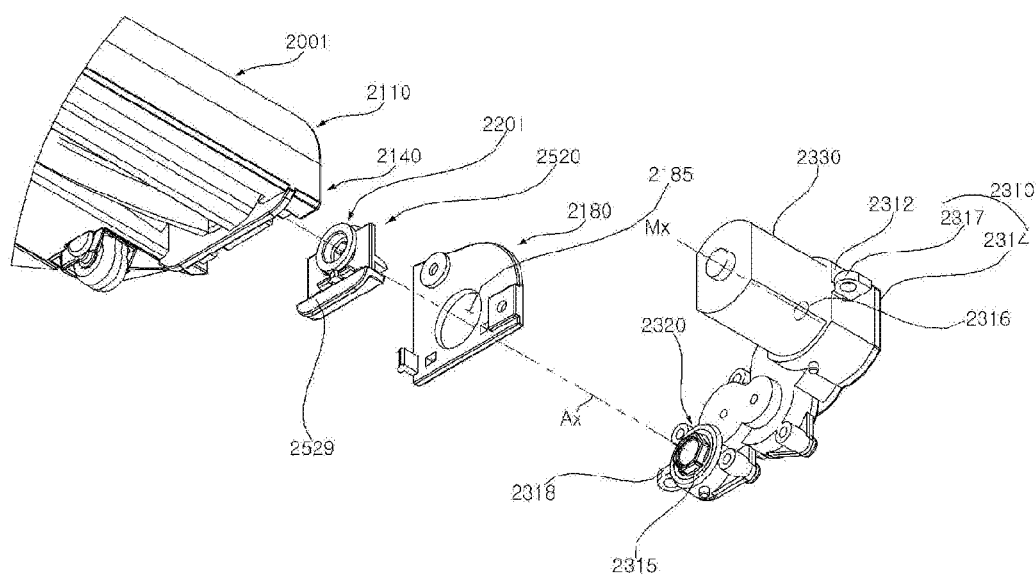
FIG. 18 is an exploded perspective view of a driving unit viewed from a left side of FIG. 14.

Expressions referring to directions such as a front direction (a frontward direction or a forward direction) (F), a rear direction (a rearward direction) (R), a left direction (a leftward direction) (Le), a right direction (a rightward direction) (Ri), an upper direction (an up direction or an upward direction) (U), and a down direction (an downward direction) (D), or so on may be defined as indicated in the drawings. The directional references are for the purposes of explanation only, and are not limiting as the directions may be defined differently depending on where a reference is placed.

For example, a direction parallel to an imaginary line connecting a central axis of a left spin mop and a central axis of a right spin mop may be defined as a left-right direction. A direction perpendicular to the left-right direction and parallel to the central axes of the spin mops may have an error angle within 5 degrees with respect to the central axes of the spin mops and may be defined as an up-down direction or a vertical direction. A direction perpendicular to each of the left-right direction and the up-down direction may be defined as a front-back direction or a longitudinal direction. A front direction may mean a main traveling direction of a mobile robot or a main traveling direction of a pattern traveling of a mobile robot. In this instance, the main traveling direction may mean a vector sum value of directions traveling in a predetermined time.

A term of 'first', 'second', 'third', or so on in front of a component mentioned below is only to avoid confusion between the component being referred to and other component, and does not relate to an order, an importance, or a master-servant relationship between components. For example, an embodiment only having a second component without a first component may be possible.

A term of 'a mop' mentioned hereinafter may have any of materials such as fabric or paper, and may be a multi-use product being able to be used repeatedly through washing or a disposable product.

The present disclosure may be applied to a mobile robot manually moved by a user or a robot cleaner traveling or driving on its own. Hereinafter, an embodiment will be described based on a robot cleaner.

A cleaner 1 according to an embodiment of the present disclosure may include a body 30 having a controller. The cleaner 1 may include a mop module 40 to mop a floor (a surface to be cleaned) while being in contact with the floor. The cleaner 1 may include a sweep module 2000 provided to collect a foreign material on the floor.

The mop module 40 may be disposed at a lower side of the body 30 and may support the body 30. The sweep module 2000 may be disposed at the lower side of the body 30 and may support the body 30. In the present embodiment, the body 30 may be supported by the mop module 40 and the sweep module 2000. The body 30 may form an appearance or an exterior. The body 30 may be arranged to connect the mop module 40 and the sweep module 2000.

The mop module 40 may form an appearance or an exterior. The mop module 40 is disposed at the lower side of the body 30. The mop module 40 is disposed at a rear side of the sweep module 2000. The mop module 40 provides driving force for a movement of the cleaner 1. In order to move the cleaner 1, the mop module 40 may be preferably disposed at the rear side of the cleaner 1.

The mop module 40 may be provided with at least one mop portion 411 to mop the floor while rotating. The mop module 40 may include at least one spin mop 41, and the spin mop 41 may rotate in a clockwise direction or a counterclockwise direction when viewed from an upper side. The spin mop 41 may be in contact with the floor.

In the present embodiment, the mop module 40 may include a pair of spin mops 41a and 41b. The pair of spin mops 41a and 41b may rotate in a clockwise direction or a counterclockwise direction when viewed from an upper side, and may mop the floor through rotation. When the pair of spin mops 41a and 41b are viewed from a front side of a traveling direction of the cleaner, a spin mop disposed at a left side may be referred to as a left spin mop 41a, and a spin mop disposed at a right side may be defined as a right spin mop 41b.

Each of the left spin mop 41a and the right spin mop 41b may be rotated with respect to its rotation axis. The rotation axis may be arranged in an up-down direction. The left spin mop 41a and the right spin mop 41b may be rotated independently of each other.

Each of the left spin mop 41a and the right spin mop 41b may include a rotating plate 412 to which the mop portion 411 is attached and a spin shaft 414. Each of the left spin mop 41a and the right spin mop 41b may include a water container (a water receiving portion) 413.

The sweep module 2000 may form an appearance or an exterior. The sweep module 2000 may be disposed at a front side of the mop module 40. In order to prevent a foreign material on the floor from first contacting the mop module 40, the sweep module 2000 may preferably disposed at the front side of the cleaner 1 in a traveling direction.

The sweep module 2000 may be spaced apart from the mop module 40. The sweep module 2000 may disposed at the front side of the mop module 40 and be in contact with the floor. The sweep module 2000 collects the foreign material on the floor.

The sweep module 2000 may be in contact with the floor and may collect the foreign material at the front side of the sweep module 2000 to an inside when the cleaner 1 moves. The sweep module 2000 may be disposed at a lower side of the body 30. A width of the sweep module 2000 in a left-right direction may be smaller than a width of the mop module 40 in the left-right direction.

The body 30 may include a case 31 forming an appearance or an exterior and a base 32 disposed at a lower side of the case 31.

The case 31 may form a side surface and an upper surface of the body 30. The base 32 may form a bottom surface of the body 30.

In the present embodiment, the case 31 may have a cylindrical shape with an open bottom surface. When viewed in a top view, an overall shape of the case 31 may be a circular shape. Since the case 31 has a plane shape of a circular shape, a rotation radius when rotating can be minimized.

The case 31 may include an upper wall 311 having an overall shape in a circular shape, and a side wall 312 formed integrally with the upper wall 311 and extending downward from an edge of the upper wall 311.

A part of the sidewall 312 may be open. An opened portion of the side wall 312 may be defined as a water-tank insertion opening (a water-tank insertion hole or a water-tank insertion portion) 313, and a water tank 81 may be detachably installed through the water-tank insertion opening 313. The water-tank insertion opening 313 may be disposed at a rear side based on the traveling direction of the cleaner. Since the water tank 81 is inserted through the water-tank insertion opening 313, the water-tank insertion opening 313 may be preferably disposed close to the mop module 40.

The mop module 40 may be coupled to the base 32. The sweep module 2000 may be coupled to the base 32. A controller Co and a battery Bt may be disposed in an inner space formed by the case 31 and the base 32. In addition, a mop driving unit (a mop driver) 60 may be disposed on the body 30. A water supply module may be disposed at the body 30.

The base 32 may include a base body 321, a base guard 322, and an insertion hole 323. The base body 321 may cover the opened bottom surface of the case 31. The base guard 322 may be formed along an outer edge of the base body 321 and protrude downward from the edge of the base body 321. The insertion hole 323 may penetrate through the base body 321 in an up-down direction, and the sweep module 2000 may be detachably inserted into the insertion hole 323.

The sweep module 2000 may be detachably mounted or installed on the body 30 through the insertion hole 323. The sweep module 2000 may be positioned at a front side of the mop module 40 and configured to collect a foreign material at the front side of the mop module 40. The sweep module 2000 may be detachably assembled with the base 32. The sweep module 2000 in an assembled state with the base 32 may be separated from the base 32 through a lever 2500.

An installation space 325 in which the sweep module 2000 is mounted is formed at the base 32. In the present embodiment, a storage housing 326 forming the installation space 325 may be further provided. The storage housing 326 may be assembled with the base 32 and may be disposed at an upper side of the insertion hole 323.

The storage housing 326 may protrude to an upper side from the base body 321.

A lower side of the storage housing 326 may be opened to communicate with the insertion hole 323. An interior space of the storage housing 326 provides the installation space 325. The installation space 325 of the storage housing 326 corresponds to a shape of the sweep module 2000.

The sweep module 2000 may include a dust housing 2100, an agitator 2200, a driving unit 2300, a driving coupling 2320, a driven coupling 2220, and a lever 2500. The dust housing 2100 may be detachably assembled with the body 30, and a foreign material may be stored in the dust housing 2100. The agitator 2200 may be rotatably assembled with the dust housing 2100. The driving unit 2300 may be installed on the body 30 and provide rotational force to the agitator 2200. The driving coupling 2320 may be disposed at the driving unit 2300 and transmit the rotational force of the driving unit 2300 to the agitator 2200. The driven coupling 2220 may transmit the rotational force of the driving coupling 2320 to the agitator 2200. The lever 2500 may be disposed at the dust housing 2100. The lever 2500 may couple or separate the driving coupling 2320 and the driven coupling 2220 by receiving operation force.

The dust housing 2100 accommodates the agitator 2200. A foreign material collected through the rotation of the agitator 2200 may be stored in the dust housing 2100. That is, the dust housing 2100 provides an installation and operation structure of the agitator 2200, and also provides a storage space for a foreign material.

The dust housing 2100 may include a collection space 2102 for a rotation of the agitator 2200 and a storage space 2104 for storing a foreign material. The dust housing 2100 may longitudinally extend in a left-right direction. A width of the dust housing 2100 may be narrower than a width of the mop module 40.

The dust housing may be formed by separately fabricating a structure for the collection space 2102 and a structure for the storage space 2104 and assembling them together. In the present embodiment, the collection space 2102 and the storage space 2104 are disposed in the dust housing 2100, and a partition 2145 for partitioning the collection space 2102 and the storage space 2104 may be disposed.

In the present embodiment, the dust housing 2100 may include an upper housing 2110, a lower housing 2140, a dust cover 2150. The upper housing 2110 may provide an upper outer shape. The lower housing 2140 may be disposed at a lower side of the upper housing 2110 and be coupled to the upper housing 2110. The dust cover 2150 may detachably assembled with at least one of the upper housing 2110 and the lower housing 2140.

The collection space 2102 and the storage space 2104 are formed by assembling the upper housing 2110 and the lower housing 2140. That is, the upper housing 2110 may provide an upper partial space of the collection space 2102 and an upper partial space of the storage space 2104, and the lower housing 2140 may provide the remaining lower space of the collection space 2102 and the remaining lower space of the storage space 2014.

In the present embodiment, the collection space 2102 may be positioned at a rear side of the storage space 2104.

That is, the storage space 2104 is positioned at a front side of the collection space 2102, and the dust cover 2150 is positioned at a front side of the upper housing 2110.

The upper housing 2110 and the lower housing 2140 may be integrally assembled. The upper housing 2110 and the lower housing 2140 that are integrally assembled may be defined as a housing assembly 2001.

The dust cover 2150 is detachably assembled with the housing assembly. When the dust cover 2150 is separated from the housing assembly, the storage space 2104 is exposed to an outside. The foreign material stored in the storage space 2104 may be discarded when the dust cover 2150 is separated.

The upper housing 2110 provides an upper surface, a left upper surface, a right upper surface, and a rear surface of the dust housing 2100. The upper housing 2110 forms an upper side of the collection space 2102 and the storage space 2104. The upper housing 2110 provides upper partial portions of the collection space 2102 and the storage space 2104.

The upper housing 2110 may include a first upper housing portion 2112, a second upper housing portion 2114, a third upper housing portion 2116, and a fourth housing portion 2118. The first upper housing portion 2112 may form an upper wall of the storage space 2104. The second upper housing portion 2114 may be integrally connected with the first upper housing portion 2112 and forms an upper wall and a rear wall of the collection space 2102. The third upper housing portion 2116 may provide a part of a left wall of the collection space 2102 and the storage space 2104, and the fourth upper housing portion 2118 may provide a part of a right wall of the collection space 2102 and the storage space 2104.

A shape of the first upper housing 2112 is not limited. However, since the second upper housing portion 2114 accommodates the agitator 2200, the second upper housing portion 2114 may have a shape corresponding to a shape of the agitator 2200.

At least a part of the second upper housing portion 2114 may have a center of curvature at a rotation axis of the agitator 2200. At least a part of the second upper housing portion 2114 may have an arc shape.

In the present embodiment, the second upper housing portion 2114 may have a radius of curvature R1 greater than a diameter of the agitator 2200. An outer edge of the agitator 2200 may be preferably in contact with an inner surface of the second upper housing portion 2114.

A foreign material collected through a contact of the agitator 2200 and the second upper housing portion 2114 may be moved to the storage space 2104 along the inner surface of the second upper housing portion 2114. When the agitator 2200 and the second upper housing 2114 are spaced apart from each other, the foreign material collected by the agitator 2200 may fall back to the floor.

A collection opening surface 2101 may be formed at the lower housing 2140. The collection opening surface 2101 may be exposed to the floor. The agitator 2200 may penetrate the collection opening surface 2101 and protrude to a lower side of the collection opening surface 2101.

The collection opening surface 2101 may be disposed at a rear side of the storage space 2102.

The lower housing 2140 may be disposed at a lower side of the upper housing 2110 and may be spaced apart from the upper housing 2110 to form a storage opening surface 2103. In the present embodiment, the lower housing 2140 and the upper housing 2110 may be spaced apart from each other in the up-down direction.

The lower housing 2140 may include a first lower housing portion 2142, a third lower housing portion 2146, a fourth lower housing portion 2148, and a partition 2145. The first lower housing portion 2142 may form a lower wall of the storage space 2104 and has the collection opening surface 2101 where the foreign material is collected. The third lower housing portion 2146 may provide a rest of the left wall of the collection space 2102 and the storage space 2104, and the fourth lower housing portion 2148 may provide a rest of the right wall of the collection space 2102 and the storage space 2104, The partition 2145 may be integral with the first lower housing portion 2142, and may partition the collection space 2102 and the storage space 2104.

In the present embodiment, the first lower housing portion 2142, the third lower housing portion 2146, the fourth lower housing portion 2148, and the partition 2145 may be formed to have an integral structure. Unlike the present embodiment, any one of the first lower housing portion 2142, the third lower housing portion 2146, the fourth lower housing portion 2148, or the partition 2145 may be separately manufactured and then be assembled.

A left wall 2011 of the housing assembly 2001 may be provided through assembling the third lower housing portion 2146 and the third upper housing portion 2116. A right wall 2012 of the housing assembly 2001 may be provided through assembling the fourth lower housing portion 2148 and the fourth upper housing portion 2118.

A left rotation axis of the agitator 2200 may penetrate the left wall 2011 of the housing assembly, and a right rotation axis of the agitator 2200 may penetrate the right wall 2012 of the housing assembly.

The partition 2145 may protrude to an upper side from the first lower housing portion 2142. A length of the partition 2145 in the left-right direction may correspond to or relate to a length of the agitator 2200 in the left-right direction. The length of the partition 2145 in the left-right direction may be greater than the length of the agitator 2200 in the left-right direction.

The partition 2145 may include a first partition portion 2145a and a second partition portion 2145b. The first partition portion 2145a may protrude to an upper side from the first lower housing portion 2142, form the collection opening surface 2101, and partition the collection space 2102 and the storage space 2104. The first partition portion 2145a may be not in contact with the agitator 2200. The second partition portion 2145b may extend to an upper side from the first partition portion 2145a, partition the collection space 2102 and the storage space 2104, and be in contact with the agitator 2200.

The first partition portion 2145a may protrude to the upper side from the first lower housing portion 2142. The collection opening surface 2101 may be formed between the first partition portion 2145a and a rear end 2140b of the first lower housing portion 2142.

A length L1 of the collection opening surface 2101 in a front-rear direction may be smaller than a diameter of the agitator 2200. Since the length L1 of the collection opening surface 2101 in the front-rear direction is smaller than the diameter of the agitator 2200, the agitator 2200 cannot be drawn out to an outside through the collection opening surface 2101.

The agitator 2200 may be mounted on an upper side of the lower housing portion 2140, and a lower end of the agitator 2200 may protrude to an outside of the collection opening surface 2101 and thus may be in contact with the floor.

The first partition portion 2145a may be not in contact with the agitator 2200.

However, the second partition portion 2145b may be in contact with the agitator 2200.

The second partition portion 2145b may have an arc shape. A curvature center of the second partition 2145b may be positioned at a rotation axis Ax of the agitator 2200. A radius of curvature R2 of the second partition 2145b may be equal to or smaller than a diameter of the agitator 2200.

The second partition portion 2145b may have a curved surface facing the agitator 2200. An upper end 2147a of the second partition portion 2145b may be positioned higher than the rotation axis Ax of the agitator 2200.

The upper end 2147a of the second partition portion 2145b may protrude to a rear side of the first partition portion 2145a.

The upper end 2147a of the second partition portion 2145b may be sharply formed. An inclined surface 2147b may be formed at the upper end 2147a of the second partition portion 2145b. The inclined surface 2147b may separate a foreign material attached to a surface of the agitator 2200 and guide the foreign material to the storage space 2104.

When assembling the upper housing 2110 and the lower housing 2140, a discharge surface 2105 that is opened to a front side may be formed. The discharge surface 2105 may be formed at a front surface of the housing assembly 2001, and a dust cover 2150 may open and close the discharge surface 2105.

The dust cover 2150 may be disposed at a front side of the housing assembly 2001 and may cover the discharge surface 2105. The foreign material in the storage space 2104 may be discharged to an outside of the sweep module 2000 through the discharge surface 2105.

The dust cover 2150 may be detachably assembled with the housing assembly 2001. In the present embodiment, the dust cover 2150 and the housing assembly 2001 may be assembled through a mutually-engaged structure (a mutually-fastened structure, a mutually-locked structure, or a mutually-hooked structure). The mutually-engaged structure may be released by operation force of a user.

For the mutually-engaged structure of the dust cover 2150 and the housing assembly 2001, a protrusion 2151 may be formed at one of the dust cover 2150 and the housing assembly 2001, and an engaged groove 2152 may be formed at the other of the dust cover 2150 and the housing assembly 2001.

In the present embodiment, the engaged groove 2152 is formed at the dust cover 2150, and the protrusion 2151 is formed at the housing assembly 2001.

A number of engaged grooves 2152 corresponds to a number of protrusions 2151. A plurality of protrusions 2151 may be disposed. The protrusions 2151 may be disposed at the upper housing 2110 and the lower housing 2140, respectively.

In the present embodiment, two protrusions 2151 are disposed at the upper housing 2110, and two protrusions 2151 are also disposed at the lower housing 2140.

If it is necessary to distinguish, protrusions disposed at the upper housing 2110 are referred to as upper protrusions 2151a and 2151b, and protrusions disposed at the lower housing 2140 are referred to as lower protrusions 2151c and 2151d.

The upper protrusions 2151a and 2151b protrude to an upper side at an upper surface of the upper housing 2110. The lower protrusion 2151c and 2151d protrude to a lower side at a bottom surface of the lower housing 2140.

At the dust cover 2150, upper engaged grooves 2152a and 2152b corresponding to the upper protrusions 2151a and 2151b are formed, and lower engaged groove 2152c and 2152d corresponding to the lower protrusions 2151c and 2151d are formed.

The dust cover 2150 may include a front cover portion 2153, a top cover portion 2154, a left cover portion 2155, and a right cover portion 2156, and a bottom cover portion 2157. The front cover portion 2153 may be disposed to face the discharge surface 2105. The top cover portion 2154 may protrude from an upper edge of the front cover portion 2153 toward the housing assembly. The left cover portion 2155 may protrude from a left edge of the front cover portion 2153 toward the housing assembly, and the right cover portion 2156 may protrude from a right edge of the front cover portion 2153 toward the housing assembly. The bottom cover portion 2157 may protrude from a lower edge of the front cover portion 2153 toward the housing assembly side.

The dust cover 2150 may have a concave insertion space from a rear side to a front side.

The upper engaged groove 2152a and 2152b are formed at the top cover portion 2154. The lower engaged groove 2152c and 2152d are formed at the bottom cover portion 2157. The upper engaged groove 2152a and 2152b and the lower engaged groove 2152c and 2152d may be preferably disposed to be opposite to each other.

The upper engaged groove 2152a and 2152b or the lower engaged groove 2152c and 2152d may have a shape of a groove or a hole.

The housing assembly 2001 may have an insertion portion 2160 being inserted into the insertion space and being in close contact with an inner surface of the dust cover 2150. The insertion portion 2160 may be located at a front side of the upper housing 2110 and the lower housing 2140.

The insertion portion 2160 may include a top insertion portion 2164, a left insertion portion 2165, a right insertion portion 2166, and a bottom insertion portion 2167. The top insertion portion 2164 may form an upper side of the discharge surface 2105 and protrude to a front side. The left insertion portion 2165 may form a left side of the discharge surface 2105 and protrude to a front side. The right insertion portion 2166 may form a right side of the discharge surface 2105 and protrude to a front side. The bottom insertion portion 2167 may form a lower side of the discharge surface 2105 and protrude to a front side.

In the present embodiment, the top insertion portion 2164, the left insertion portion 2165, the right insertion portion 2166, and the bottom insertion portion 2167 are connected. Unlike the present embodiment, the top insertion portion 2164, the left insertion portion 2165, the right insertion portion 2166, and the bottom insertion portion 2167 may be separated. An area of the insertion portion 2160 may become narrower as it goes from a rear side to a front side.

The top insertion portion 2164 may be in close contact with the top cover portion 2154, the left insertion portion 2165 may be in close contact with the left cover portion 2155, the right insertion portion 2166 may be in close contact with the right cover portion 2156, and the bottom insertion portion 2167 may be in close contact with the bottom cover portion 2157.

In the present embodiment, the upper protrusions 2151a and 2111b are formed at the top insertion portion 2164, and the lower protrusions 2151c and 2151d are formed at the bottom insertion portion 2167.

The upper protrusions 2151a and 2151b may be inserted into the upper engaged groove 2152a and 2152b from a lower side to an upper side of the upper engaged groove 2152a and 2152b to form a mutually-engaged structure. The lower protrusions 2151c and 2151d may be inserted into the lower engaged groove 2152c and 2152d from an upper side to a lower side of the lower engaged groove 2152c and 2152d to form a mutually-engaged structure.

By operation force of a user to pull the dust cover 2150, the dust cover 2150 or the insertion portion 2160 is elastically deformed and thus the mutually-engaged structure is released.

The agitator 2200 may be disposed to be rotated in the housing assembly 2001.

The agitator 2200 may be disposed between the upper housing 2110 and the lower housing 2140. The agitator 2200 may be disposed at the upper housing 2110. In the present embodiment, the agitator 2200 is disposed at the lower housing 2140 and rotates while being supported by the lower housing 2140.

A rotation axis of the agitator 2200 is disposed in the left-right direction and the agitator 2200 may rotate forward or backward.

The housing assembly 2001 may further include a first journal 2010 and a second journal 2020 supporting the agitator 2200. The first journal 2010 is disposed at a left side of the housing assembly 2001, and the second journal 2020 is disposed at a right side of the housing assembly 2001.

The first journal 2010 and the second journal 2020 penetrate the housing assembly 2001 in the left-right direction and communicate with the collection space 2102.

In the present embodiment, the first journal 2010 and the second journal 2020 may have a cylindrical shape. Unlike the present embodiment, at least one of the first journal and the second journal may have a semi-cylindrical shape. When the first journal and the second journal have a semi-cylindrical shape, the first journal and the second journal are arranged to support the rotation axis of the agitator 2200 at a lower side.

The dust housing 2100 may be mounted on the installation space 325 of the base 32, and a lever 2500 may be disposed to couple or separate the base 32 and the dust housing 2100.

The lever 2500 may be disposed between the base 32 and the dust housing 2100 and may form a mutually-engaged structure with respect to the base 32 and the dust housing 2100. The lever 2500 may form a mutually-engaged structure with the dust housing 2100 in a direction of gravity and suppress the dust housing 2100 from being separated from a lower side of the base 32.

A plurality of levers 2500 may be disposed, and form a mutually-engaged structure at a plurality of places of the dust housing 2100. In the present embodiment, the lever 2500 includes a first lever 2510 and a second lever 2520, and the first lever 2510 and the second lever 2520 are arranged in the left-right direction.

The first lever 2510 is disposed at a left side of the dust housing 2100, and the second lever 2520 is disposed at a right side of the dust housing 2100.

Operation mechanisms of the first lever 2510 and the second lever 2520 are the same, and only operation directions of the first lever 2510 and the second lever 2520 are opposite to each other.

The first lever 2510 disposed at the left side is moved to the right side to release the mutually-engaged structure with the base 32, and the second lever 2520 disposed at the right side is moved to a left side to release the mutually-engaged structure with the base 32.

The sweep module 2000 may include a first lever 2510, a second lever 2520, a first-lever elastic member 2541, and a second-lever elastic member 2542. The first lever 2510 may be disposed at one side of the housing assembly to be relatively movable in the left-right direction. The second lever 2520 may be disposed at the other side of the housing assembly to be relatively movable in the left-right direction. The first-lever elastic member 2541 may be disposed between the first lever 2510 and the dust housing 2100 and provide elastic force to the first lever 2510. The second-lever elastic member 2252 may be disposed between the second lever 2520 and the dust housing 2100 and provide elastic force to the second lever 2520.

Since the first lever 2510 and the second lever 2520 may have the same or similar structures, a structure of the first lever will be described as an example.

In the present embodiment, the dust housing 2100 may be provided with a first side cover 2170 covering or shielding the first lever 2510 and a second side cover 2180 covering or shielding the second lever 2520.

Unlike the present embodiment, the first lever 2510 and the second lever 2520 may be exposed to an outside of the dust housing 2100 without the first side cover 2170 and the second side cover 2180. Also, unlike the present embodiment, the first side cover 2170 may be disposed at a right side and the second side cover 2180 may be disposed at a left side.

The first side cover 2170 may be coupled to a left side of the housing assembly 2001. The first side cover 2170 may have a shape corresponding to a left shape of the housing assembly 2001. The first side cover 2170 may shield a shaft member 2201 of the agitator 2200 from being exposed to an outside. The first side cover 2170 may cover or shield most of the first lever 2510 and exposes only a portion for the mutually-engaged structure with the base 32.

The first side cover 2170 may include a first side cover body 2173, a through hole 2171 or 2172, a hook portion 2174, a journal-coupled portion 2175, and a fastening portion 2176. The first side cover body 2173 may be in close contact with one side of the housing assembly 2001. The through hole 2171 or 2172 may be disposed to penetrate the first side cover body 2173. The hook portion 2174 may protrude from the first side cover body 2173 toward the housing assembly 2001 and may be hooked-coupled with the housing assembly 2001. The journal-coupled portion 2175 may protrude from the first side cover body 2173 toward the housing assembly 2001 and be mutually coupled to the journal 2010 (the first journal 2010 in the present embodiment). The fastening portion 2176 may couple the first side cover body 2173 and the housing assembly 2001 by a fastening member (not shown).

The fastening portion 2176 and the hook portion 2174 are disposed at opposite sides based on the journal-coupled portion 2175. A plurality of hook portions 2174 may be arranged in an up-down direction.

The journal-coupled portion 2175 may be inserted into an inner diameter of the first journal 2010.

The first lever 2510 may include an upper lever body 2512, a lower lever body 2514, and a lever engaging portion 2516. The upper lever body 2512 may be disposed between the housing assembly 2001 and the first side cover 2170 and be elastically supported by the first-lever elastic member 2541. The lower lever body 2514 may be disposed between the housing assembly 2001 and the first side cover 2170, be integral with the upper lever body 2512, be exposed to an outside of the housing assembly 2001, and receive operation force of a user. The lever engaging portion 2516 may protrude from the upper lever body 2512 and be disposed to penetrate the through holes 2171 and 2172 of the first side cover 2170.

The upper lever body 2512 may be disposed in an up-down direction, and the lower lever body 2514 may be disposed in a horizontal direction.

The lower lever body 2514 may be disposed to be exposed to an outside of the dust housing 2100. The lower lever body 2514 may be positioned at a lower side of the upper lever body 2512. The lower lever body 2514 may be exposed to an outside of a lower surface of the lower housing 2140.

In the present embodiment, an operation portion 2519 protruding to a lower side from the lower lever body 2514 may further provided. Since the operation portion 2519 longitudinally extends in the front-rear direction, the operation portion 2519 may easily receive operation force of a user in the left-right direction.

A user may move the first lever 2510 by pushing the operation unit 2519 in the left-right direction.

The lever engaging portion 2516 may protrude from the upper lever body 2512 to an outside (a side opposite to the agitator). Since a number of the lever engaging portions 2516 corresponds to a number of through holes, a first lever engaging portion 2516a and a second lever engaging portion 2516b are disposed in the present embodiment.

The lever engaging portion 2516 has a structure that forms a mutually-engaged structure in a direction of gravity and minimizes forming a mutually-engaged structure in an opposite direction of gravity. Therefore, an upper surface of the lever engaging portion 2516 may have a round shape or an inclined surface to a lower side, and a lower surface of the lever engaging portion 2516 may have a flat surface.

If the levers 2510 and 2520 are not returned to initial positions when the levers 2510 and 2520 move, the sweep module 2000 may be separated from a fixed position because the mutually engaged structure is not formed. To prevent this, the sweep module 2000 may further include a structure for guiding a horizontal movement of the first lever 2510.

The sweep module 2000 may include a first guide 2545, a first guide hole 2518, a second guide 2547, and a second guide hole 2528. The first guide 2545 may protrude to the first lever 2510 at one side (a left side in the present embodiment) of the dust housing 2100 and mutually interfere with the first lever 2510 to guide a movement direction of the first lever 2510. The first guide hole 2518 may be formed at the first lever 2510, and the first guide 2545 may be inserted into the first guide hole 2518 so that the movement of the first guide 2545 is guided. The second guide 2547 may protrude to the second lever 2520 at the other side (a right side in the present embodiment) of the dust housing 2100 and mutually interfere with the second lever 2520 to guide a movement direction of the second lever 2520. The second guide hole 2528 may be formed at the second lever 2520, and the second guide 2547 may be inserted to the second guide hole 2528 so that the movement of the second guide 2547 is guided.

The first guide 2545 may be formed in the movement direction of the first lever 2510, and the second guide 2547 may be formed in the moving direction of the second lever 2520. Thus, the first guide 2545 and the second guide 2547 may be formed in a horizontal direction. The first guide hole 2518 and the second guide hole 2528 may be formed in the horizontal direction to correspond to the first guide 2545 and the second guide 2547.

The guide holes 2518 and 2528 may be disposed at either the upper lever body 2512 or the lower lever body 2514. In the present embodiment, the guide holes 2518 and 2528 are formed to penetrate the upper lever body 2512 in the horizontal direction.

One end of the first-lever elastic member 2541 is supported by the dust housing 2100, and the other end of the first-lever elastic member 2541 is supported by the first lever 2510. The first-lever elastic member 2541 elastically supports the first lever 2510 toward an outside of the dust housing 2100.

The sweep module 2000 may further include a structure for preventing displacement of the lever elastic members 2541 and 2542.

In order to maintain an operation position of the first-lever elastic member 2541, the sweep module 2000 may include a first position fixing portion 2517 and a second position fixing portion 2544. The first position fixing portion 2517 may be disposed at the first lever 2510 and may be inserted into the other end of the first-lever elastic member 2541. The second position fixing portion 2544 may be disposed at the dust housing 2100 and one end of the first-lever elastic member 2541 may be inserted into the second position fixing portion 2544.

In the present embodiment, the first-lever elastic member 2541 and the second-lever elastic member 2542 may be formed of a coil spring. In the present embodiment, the first position fixing portion 2517 may have a boss shape, and the second position fixing portion 2544 may have a groove shape.

The first position fixing portion 2517 may be inserted into the first-lever elastic member 2541, and the first position fixing portion 2517 may allow the first-lever elastic member 2541 to move in the left-right direction. Thus, a movement of the first-lever elastic member 2541 in the front-rear direction or in the up-down direction may be suppressed.

The second position fixing portion 2544 may have a groove shape, and the first-lever elastic member 2541 may be inserted into the second position fixing portion 2544. The second position fixing portion 2544 may allow the first-lever elastic member 2541 to move in the left-right direction. Thus, a movement of the first-lever elastic member 2541 in the front-rear direction or in the up-down direction may be suppressed.

In the present embodiment, the second position fixing portion 2544 may be disposed between the first journal 2010 and the first guide 2545. The second position fixing portion 2544 may include a first position fixing part 2544a and a second position fixing part 2544b. The first position fixing part 2544a may have a concave shape at a portion of a lower side of the first journal 2010, and the second position fixing part 2544b may have a concave shape at a portion of an upper side of the first guide 2545.

When viewed from a later side, each of the first position fixing part 2544a and the second position fixing part 2544b may have a curved surface, and a curvature center of each of the first position fixing part 2544a and the second position fixing part 2544b may be positioned at an inside of the first-lever elastic member 2541.

A radius of curvature of each of the first position fixing part 2544a and the second position fixing part 2544b may be larger than a diameter of the first-lever elastic member 2541.

When the first lever 2510 is moved toward the housing assembly 2001 by operation force of a user, the lever engaging portion 2516 releases the mutually-engaged structure with the base 32. In this instance, since the first-lever elastic member 2541 elastically supports the first lever 2510, when the operation force of the user is removed, the first lever 2510 is moved back to the first side cover 2170 and the lever engaging portions 2516 are exposed to an outside of the through holes 2171 and 2172.

The sweep module 2000 may be maintained in a state mounted on the base 32 through the mutually-engaged structure of the lever engaging portion 2516 protruding to an outside of the through holes 2171 and 2172 and the base 32.

When the mutually-engaged structure between the lever engaging portion 2516 and the base 32 is released, the sweep module 2000 can be separated from the base 32.

In the present embodiment, since the first lever 2510 and the second lever 2520 are disposed at the left and right sides of the sweep module 2000, respectively, the sweep module 2000 can be separated from the body 30 only when all the mutual engagement of the first lever 2510 and the second lever 2520 is released.

The first lever 2510 provides the mutually-engaged structure with the base 32 and releases the mutually-engaged structure with the base 32. The second lever 2520 provides not only an act of the first lever 2510 but also a connection structure with the driving unit 2300.

The second lever 2520 may include an upper lever body 2522, a lower lever body 2524, a lever engaging portion 2526, and an operation portion 2529. The upper lever body 2522 may be disposed between the housing assembly 2001 and the second side cover 2180 and be elastically supported by the second-lever elastic member 2542. The lower lever body 2524 may be disposed between the housing assembly 2001 and the second side cover 2180, be integral with the upper lever body 2522, be exposed to an outside of the housing assembly 2001, and receive operation force of a user. The lever engaging portion 2526 may protrude from the upper lever body 2522 and be disposed to penetrate through holes 2181 and 2182 of the second side cover 2180. The operation portion 2529 may protrude to a lower side from the lower lever body 2524.

The lever engaging portion 2526 may protrude from the lower lever body 2522 to an outside (a side opposite to the agitator). The lever engaging portion 2526 may include a first lever engaging portion 2526a and a second lever engaging portion 2526b.

The lever engaging portion 2526 may form a mutually-engaged structure with an engaged groove 3266 formed at the storage housing 326 of the base 32.

Since the lever engaging portion 2526 includes the first lever engaging portion 2526a and the second lever engaging portion 2526b, the engaged groove 3266 may include a first engaged groove 3266a and a second engaged groove 3266b to correspond to them. With respect to the lever engaging portion 2516 of the first lever 2510, an engaged groove (not shown) having the same structure may be formed. The first engaged groove 3266a and the second engaged groove 3266b may be formed at a sidewall 3262 of the storage housing 326.

The first engaged groove 3266a and the second engaged groove 3266b may be at a lower side of a driven coupling 2220 and a driving coupling 2320.

The second side cover 2180 may include a second side cover body 2183, a through hole 2181 or 2182, a hook portion 2184, a fastening portion 2186, and an opening surface 2185. The second side cover body 2183 may be in close contact with the other side (a right side in the present embodiment) of the housing assembly 2001. The through hole 2181 or 2182 may be disposed to penetrate the second side cover body 2183. The hook portion 2184 may protrude from the second side cover body 2183 toward the housing assembly 2001 and may be hooked-coupled with the housing assembly 2001. The fastening portion 2186 may couple the second side cover body 2183 and the housing assembly 2001 by a fastening member (not shown). In order to transmit driving force of the driving unit 2300 to the agitator 2200, the driving unit 2300 may penetrate the opening surface 2185.

The opening surface 2185 may be disposed in the left-right direction. A first coupler 2310 of the driving unit 2300, which will be described later, may be inserted through the opening surface 2185.

The sweep module 2000 may include a second guide 2547, a second guide hole 2528, a third position fixing portion 2527, and a fourth position fixing portion 2546. The second guide 2547 may protrude to the second lever 2520 at the other side (a right side in the present embodiment) of the dust housing 2100 and mutually interfere with the second lever 2520 to guide a movement direction of the second lever 2520. The second guide hole 2528 may be formed at the second lever 2520, and the second guide 2547 may be inserted to the second guide hole 2528 so that the movement of the second guide 2547 is guided. The second position fixing portion 2527 may be disposed at the second lever 2520 and may be inserted into the other end of the second-lever elastic member 2542. The fourth position fixing portion 2544 may be disposed at the dust housing 2100 and one end of the second-lever elastic member 2542 may be inserted into the fourth position fixing portion 2546.

The agitator 2200 may include an agitator assembly 2210, a driven coupling 2220, a coupling elastic member 2230, a coupling stopper 2270. The agitator assembly 2210 may sweep a foreign material on a floor into the collection space 2102 through rotation. The driven coupling 2220 may receive rotational force from the driving unit 2300 and may be relatively movably disposed between the driving unit 2300 and the agitator assembly 2210. The coupling elastic member 2230 may be disposed between the agitator assembly 2210 and the driven coupling 2220, provide elastic force to the driven coupling 2220, and press the driven coupling 2220 toward the driving unit 2300. The coupling stopper 2270 may penetrate the driven coupling 2220 and be coupled to the agitator assembly 2210, and form a mutually-engaged structure with the driven coupling 2220 in a left-right direction to prevent the driven coupling 2220 from being separated.

The agitator assembly 2210 may include an agitator body 2240, a shaft member 2201, a collection member 2250, and a baring 2600. The agitator body 2240 may be disposed at the collection space 2102, and be rotated by receiving the rotational force of the driving unit 2300. The shaft members 2201 may be disposed at one side and the other side of the agitator body 2240, respectively, provide a rotation center of the agitator body 2240, and be rotatably supported by the dust housing 2100. The collection member 2250 may be installed on an outer circumferential surface of the agitator body 2240 and sweep a foreign material into the collection space 2102. The baring 2600 may provide rolling friction to the shaft member 2201.

In the present embodiment, the driven coupling 2220 may be assembled detachably with a lever (the second lever 2520 in the present embodiment) and the shaft member 2201 and may move together with the lever. In the present embodiment, the coupling of the driven coupling 2220 with the driving unit 2300 may be released by operation force of a user applied to the second lever 2520.

The driven coupling 2220 may move toward the shaft member 2201, and the coupling with the driving unit 2300 may be released. The driven coupling 2220 may relatively move in a horizontal direction between the agitator assembly 2210 and the driving unit 2300.

The agitator body 2240 may be disposed in the left-right direction. The agitator body 2240 may be disposed at an inside of the collection space 2102.

The collection member 2250 may be formed along an outer circumferential surface of the agitator body 2240. The collection member 2250 may protrude radially outward from the outer circumferential surface of the agitator body 2240. The collection member 2250 may rotate together with the agitator body 2240 when the agitator body 2240 rotates. The collection member 2250 may penetrate the collection opening surface 2101 and be in contact with the floor. The collection member 2250 may be composed of a plurality of brushes.

When the agitator assembly 2210 rotates, the collection member 2250 may be contact with the foreign material on the floor and move the foreign material into the collection space 2102.

The shaft members 2201 may be disposed at one side and the other side of the agitator body 2240, respectively. The shaft member 2201 may form a center of rotation of the agitator assembly 2210.

The shaft member 2201 may be disposed in the left-right direction. The shaft member 2201 may penetrate left and right sides of the collection space 2102.

In the present embodiment, the shaft member 2201 may penetrate the left wall 2011 and the right wall 2012 of the dust housing 2100. The shaft member 2201 may be integral with the agitator body 2240.

In the present embodiment, the shaft member 2201 may be separably or detachably assembled with the agitator body 2240. The shaft member 2201 and the agitator body 2240 may form a mutually-engaged structure in a rotation direction of the agitator 2200, but may be separated in a rotation-axis direction (a left-right direction in the present embodiment) of the agitator 2200.

The agitator assembly 2210 and the shaft member 2201 may be detachably assembled, Therefore, only the agitator assembly 2210 can be replaced. That is, the agitator assembly 2210 may be separated from the dust housing 2100 in a state that each shaft member 2201 is assembled to the dust housing 2100.

Since the agitator 2200 is a consumable element, the agitator 2200 may be periodically replaced. Through a coupling structure of the shaft member 2201 and the agitator body 2240, only the agitator body 2240 may be separated from the dust housing 2100 without an entire separation of the agitator 2200. The shaft member 2201 and the agitator body 2240 maintain a state of a mutually-engaged structure.

The shaft member 2201 may include a rotating shaft body 2202, a shaft portion 2203, and a coupling guide 2204. The rotating shaft body 2202 may be mutually coupled to the agitator body 2240. The shaft portion 2203 may protrude from the rotating shaft body 2202 toward the driving unit 2300, provide a rotation center of the agitator 2200, and be coupled with the bearing 2260. The coupling guide 2204 may protrude from the shaft portion 2203 toward the driving portion 2300 more and penetrate the driven coupling 2220. The coupling stopper 2270 may be coupled to the coupling guide 2204.

The rotating shaft body 2202 may have a disk shape. The shaft portion 2203 may protrude from the rotating shaft body 2202 toward the driving portion 2300.

A diameter or a size of the shaft portion 2203 may be smaller than a diameter of the rotating shaft body 2202.

The shaft portion 2203 may have a cylindrical shape. An outer surface of the shaft portion 2203 may be inserted into the bearing 2260. The shaft portion 2203 may be inserted into and supported by the bearing 2260.

The coupling guide 2204 may further protrude from the shaft portion 2203 toward the driving portion 2300 more. Curvature centers of the coupling guide 2204 and the shaft portion 2203 may be located on the same rotation center.

A diameter of the coupling guide 2204 may be smaller than a diameter of the shaft portion 2203, and a first step 2205 may be formed between the coupling guide 2204 and the shaft portion 2203 due to a diameter difference.

One end of the coupling elastic member 2230 may be supported by the first step 2205.

The coupling guide 2204 may further include a through portion 2206 penetrating the driven coupling 2220. A coupling stopper 2270 may be fixed to the through portion 2206.

The driven coupling 2220 may move in the left-right direction along the coupling guide 2204. Since the driven coupling 2220 is elastically supported by the coupling elastic member 2230, the driven coupling 2220 may be kept in close contact with the driving unit 2300 when external force is not applied.

In the present embodiment, the coupling guide 2204 may have a circular columnar shape, and the through portion 2206 may have a polygonal column shape (a hexagonal column shape in the present embodiment).

The through portion 2206 may be inserted into the driven coupling 2220 and form a mutually-engaged structure in a rotation direction of the agitator 2200.

On the other hand, the shaft member 2201 is provided with a key groove 2207 for a mutually-engaged structure with the agitator body 2240. The key groove 2207 may be disposed on an opposite side of the shaft portion 2203 based on or with respect to the rotating shaft body 2202. The key groove 2207 may be disposed at a side facing the agitator body 2240. The key groove 2207 may have a shape of an atypical polygon. The key groove 2207 may be open in a radial direction of the rotation axis.

A key 2247, which is inserted into the key groove 2207, may be formed at the agitator body 2240. The key 2247 may protrude toward the shaft member 2201 or the driven coupling 2220.

The driven coupling 2220 may include a coupling body 2222, a first guide groove 2224, a second guide groove 2226, a second step 2225, and a power transmission groove 2228. The coupling body 2222 may be coupled with a lever (the second lever 2520 in the present embodiment). The first guide groove 2224 may be formed at one side (a left side in the present embodiment) of the coupling body 2222 to have a concave shape, The coupling guide 2204 may be inserted and the coupling elastic member 2230 may be inserted into the first guide groove 2224. The second guide groove 2226 may communicate with the first guide groove 2224, and penetrate the coupling body 2222. The through portion 2206 may be inserted to the second guide groove 2226. The second step 2225 may be disposed between the first guide groove 2224 and the second guide groove 2226, and the first step 2205 may be supported by the second step 2225. The power transmission groove 2228 may be formed at the other side (the right side in the present embodiment) of the coupling body 2222 to have a concave shape. The driving coupling 2320 coupled to the driving unit 2300 may be detachably inserted into the power transmission groove 2228.

A diameter of the first guide groove 2224 may be larger than a diameter of the coupling elastic member 2230. A diameter of the coupling elastic member 2230 may be larger than a diameter of the coupling guide 2204 and smaller than a diameter of the first guide groove 2224.

The first guide groove 2224 may have a circular hollow shape.

The second guide groove 2226 may have a shape corresponding to a shape of the through portion 2206. In the present embodiment, the second guide groove 2226 has a hollow shape which side surface has a hexagonal shape.

The coupling body 2222 may be provided with a groove 2223, which has a concave shape to an inside in a radial direction at an outer side surface. A diameter of the groove 2223 may be smaller than an outer surface diameter of the coupling body 2222.

A coupling groove 2523 may be formed at the upper lever body 2522 of the second lever 2520. The coupling groove 2523 may be inserted into the groove 2223 and thus may be engaged with the driven coupling 2220.

The groove 2223 may be perpendicular to a rotation center of the agitator 2200.

The second lever 2520 may be coupled to or separated from the driven coupling 2220 in the up-down direction and form a mutually-engaged structure with the driven coupling 2220 in the left-right direction.

The second lever 2520 may further include a first extension portion 2522a and a second extension portion 2522b extending from an upper side of the upper lever body 2522. The coupling groove 2523 may be formed between the first extension portion 2522a and the second extension portions 2522b.

The first extension portion 2522a and the second extension portion 2522b are structures for more robust assembly with the driven coupling 2220. The first extension portion 2522a and the second extension portion 2522b may be contact with one side surface 2223a and the other side surface 2223b of the groove 2223.

The coupling stopper 2270 may penetrate the driven coupling 2220 and may be fastened to the through portion 2206. The driven coupling 2220 may move in the left-right direction between the coupling stopper 2270 and the shaft member 2201.

A head 2272 of the coupling stopper 2270 may interfere with the power transmission groove 2228 of the driven coupling 2220 and prevent the driven coupling 2220 from being separated to a right side. A coupling portion 2274 of the coupling stopper 2270 may be inserted into and fastened to a fastening groove 2207 of the through portion 2206.

The driving coupling 2320 may be inserted into the power transmission groove 2228 and may be coupled to the power transmission groove 2228 to transmit rotational force. The power transmission groove 2228 may have any of various shapes or forms. In the present embodiment, the power transmission groove 2228 may have a hexagonal groove when viewed from a lateral side.

A diameter of the power transmission groove 2228 may be larger than a diameter of the second guide groove 2226. The power transmission groove 2228 and the second guide groove 2226 may communicate with each other. The first guide groove 2224 may be disposed at one side of the second guide groove 2226 to be communicated with the second guide groove 2226 and the power transmission groove 2228 may be disposed at the other side of the second guide groove 2226 to be communicated with the second guide groove 2226.

The power transmission groove 2228 may be open toward the other side, and the first guide groove 2224 may be open toward one side.

When the driven coupling 2220 is coupled to the upper lever body 2522, the power transmission groove 2228 may be positioned at the other side of the upper lever body 2522 and the first guide groove 2224 may be positioned at one side of the upper lever body 2522.

The second lever 2520 may form a mutually-engaged structure with the driven coupling 2220 with respect to a direction perpendicular to the shaft member 2201. In addition, the lever engaging portion 2526 of the second lever 2520 may form a mutually-engaged structure with the base 32.

When the second lever 2520 is pressed toward the agitator 2200, the second lever 2520 moves toward the agitator 2200. Thus, the mutually-engaged structure of the lever engaging portion 2526 and the base 32 is released and the dust housing 2100 is in a state being able to be separated from the base 32.

In addition, when the second lever 2520 is pressed toward the agitator 2200, the coupling elastic member 2230 may be compressed and the driven coupling 2220 may move toward the agitator 2200.

When the driven coupling 2220 moves toward the agitator 2200 by the second lever 2520, the driven coupling 2220 and the driving unit 2300 are physically separated and the dust housing 2100 is in a state where it is able to be separated from the base 32.

Since the sweep module 2000 according to the present embodiment has a structure in which the agitator 2200 is installed on the inside of the sweep module 2000, the dust housing 2100 should be physically separated from the driving unit 2300 when the dust housing 2100 is separated from the base 32.

The movement of the second lever 2520 not only releases the coupling of the dust housing 2100 and the base 32 but also releases the coupling of the driven coupling 2220 and the driving unit 2300 at the same time.

In this instance, since the second lever 2520 is hidden or shield inside the dust housing 2100 and only the operation unit 2529 is exposed to the outside, a coupling structure of the driven coupling 2220 is not exposed to the outside. In particular, since the second side cover 2180 shields or blocks most of the second lever 2520, damage to the second lever 2520 due to external impact can be minimized.

Even if the second lever 2520 is repeatedly used, the second lever 2520 moves only at an inside of the dust housing 2100 and thus separation or damage of the second lever 2520 can be minimized.

In addition, since the side covers 2170 and 2180 shield or cover the levers 2510 and 2520 inside the dust housing 2100, an intrusion of an external foreign material or the like to portions where the levers 2510 and 2520 can be minimized. Accordingly, reliability according to the operation can be ensured.

Then, when the operation force applied to the second lever 2520 is removed, the driven coupling 2220 moves toward the other side by elastic force of the coupling elastic member 2230.

In this instance, since the shaft member 2201 penetrates through the driven coupling 2220 and the coupling stopper 2270 is coupled to the shaft member 2201, the driven coupling 2220 can be prevented from being separated from the shaft member 2201. That is, the driven coupling 2220 may move along an axis direction of the shaft member 2201, but may be prevented from being separated from the shaft member 2201 by the coupling stopper 2270.

The driving unit 2300 may include a drive housing 2310, a sweep motor 2330, a power transmission assembly 2340, a driving coupling 2320. The drive housing 2310 may be assembled with the body 30. The sweep motor 2330 may be assembled with a drive housing 2310. The power transmission assembly 2340 may be disposed at an inside of the drive housing 2310 and be assembled with the sweep motor 2330 to receive rotational force. The driving coupling 2320 may be coupled to the power transmission assembly 2340 and be selectively engaged with the driven coupling 2220.

Since the agitator 2200 is disposed inside the sweep module 2000 and the sweep motor 2330 is disposed inside the body 30, the driving coupling 2320 and the driven coupling 2220 transmitting the rotational force to the agitator 2200 may have selectively-detachable structure. If the driving coupling 2320 and the driven coupling 2220 are not detachable, the dust housing 2100 cannot be separated from the body 30.

The drive housing 2310 may be fixed to the body 30. The drive housing 2310 is fixed to the base 32 in the present embodiment. The drive housing 2310 is a structure for installing the power transmission assembly 2340 and the sweep motor 2330.

The drive housing 2310 may have any of various shapes of forms. In the present embodiment, the drive housing 2310 shields or covers the power transmission assembly 2340 therein, and exposes only the sweep motor 2330 and the driving coupling 2320 to the outside.

The drive housing 2310 may include a first drive housing 2312 and a second drive housing 2314, a coupling-installed portion 2315, and a hole 2316. The first drive housing 2312 and the second drive housing 2314 may form an outer shape. The coupling-installed portion 2315 may be disposed at one of the first drive housing 2312 and the second drive housing 2314, and the driving coupling 2320 may be disposed at the coupling-installed portion 2315. The hole 2316 may be disposed at one of the first drive housing 2312 and the second drive housing 2314, and a motor shaft of the sweep motor 2330 may penetrate the hole 2316.

The power transmission assembly 2340 may be disposed between the first drive housing 2312 and the second drive housing 2314.

In the present embodiment, the first drive housing 2312 is disposed at one side (toward the agitator 2200), and the second drive housing 2314 is disposed at the other side (at an outside).

In the present embodiment, the coupling-installed portion 2315 is disposed at the first drive housing 2312. The driving coupling 2320 is disposed at the coupling-installed portion 2315 and is connected to the power transmission assembly 2340. The driving coupling 2320 may rotate in a state that the driving coupling is installed on the coupling installation unit 2315.

The driving coupling 2320 has a shape corresponding to a shape of the power transmission groove 2228 of the driven coupling 2220. In the present embodiment, the driving coupling 2320 has a hexagonal shape when viewed from a lateral side. The driving coupling 2320 may be selectively engaged with the driven coupling 2220 through the opening surface 2185 of the second side cover 2180.

The driving coupling 2320 may protrude toward the second side cover 2180 of one side (a left side) of the first drive housing 2312 in a state that the driving coupling 2320 is assembled to the drive housing 2310.

A rotation center of the driving coupling 2320 is disposed at the left-right direction and may match the rotation center of the agitator 2200.

In the present embodiment, the first drive housing 2312 may have a space formed therein, and the power transmission assembly 2340 may be rotatably installed in the space. The second drive housing 2314 may have a shape or a form of a cover covering the first drive housing 2312.

The drive housing 2310 may further include a first fastening portion 2317 and a second fastening portion 2318. The first fastening portion 2317 and the second fastening portion 2318 may be disposed at the first drive housing 2312. The first fastening portion 2317 and the second fastening portion 2318 may be formed so that a fastening member is installed on the first fastening portion 2317 or the second fastening portion 2318 in an up-down direction.

A motor axis of the sweep motor 2330 may be disposed in the left-right direction. The sweep motor 2330 may be disposed at one side or the other side of the drive housing 2310.

The sweep motor 2330 may be disposed toward an inside of the body 30 based on or with respect to the drive housing 2310. A volume of the body 30 may be minimized by arranging the sweep motor 2330 at a side of the agitator 2200.

In the present embodiment, a motor axis direction Mx of the sweep motor 2330 and a rotation axis Ax of the agitator 2200 may be parallel. In the present embodiment, a rotation center of the agitator 2200, a rotation center of the shaft member 2201, a center of the driven coupling 2220, and a center of the driving coupling 2320 are located on a line of the rotation axis Ax of the agitator 2200.

In the present embodiment, the sweep motor 2330 is positioned at an upper side of the dust housing 2100. The sweep motor 2330 is positioned at a rear side of the dust housing 2100. The sweep motor 2330 is positioned at an upper side of the installation space 325 and the storage housing 326 of the base 32.

The power transmission assembly 2340 may include a plurality of gears. A number and a shape of gears included in the power transmission assembly 2340 may be various depending on a number of revolutions and transmitted torque.

Meanwhile, the sweep module 2000 may further include a housing elastic member 327 that provides elastic force to the dust housing 2100. The housing elastic member 327 may be disposed at the installation space 325.

The housing elastic member 327 may be disposed at the base 32, and more particularly, may be installed on the storage housing 326. In the present embodiment, the housing elastic member 327 may be a plate spring. In order to install the housing elastic member 327 of the plate spring, an installation structure for fitted-fixing is disposed at the storage housing 326.

The storage housing 326 is provided with an elastic-member storage portion 328 that protrudes to an upper side to have a convex shape at the installation space 325. An elastic-member storage space 328b in which the housing elastic member 327 is accommodated is formed at a lower side of the elastic-member storage portion 328.

The elastic member storage portion 328 may further include an elastic-member opening surface 328a opened in an up-down direction. The elastic-member opening surface 328a may communicate with the elastic-member storage space 328b and the installation space 325.

In addition, an elastic-member support portion 329, which is disposed at a lower side of the elastic-member storage space 328b and is connected to the storage housing 326, may be further disposed.

The elastic-member support portion 329 may be positioned at a lower side of the elastic-member storage portion 328.

The housing elastic member 327 may be inserted between the elastic-member storage portion 328 and the elastic-member support portion 329. The housing elastic member 327 may be exposed to an upper side of the storage housing 326 through the elastic-member opening surface 328a.

The housing elastic members 327 may be positioned at both sides of the elastic-member support portion 329, respectively.

The elastic member storage portion 328 may longitudinally extend in the left-right direction, and the elastic-member support portion 329 may be disposed in the left-right direction.

The housing elastic member 327 may include a first elastic portion 327a, a second elastic portion 327b, and a third elastic portion 327c. The first elastic portion 327a may be positioned at an upper side of the elastic-member support portion 329. The second elastic portion 327b may extend to one side (a left side in the present embodiment) from the first elastic portion 327a and be disposed in the elastic-member storage space 328b. The third elastic portion 327c may extend to the other side (a right side in the present embodiment) from the first elastic portion 327a and be disposed in the elastic-member storage space 328b.

Each of the second elastic portion 327b and the third elastic portion 327c may be bent from the first elastic portion 327a.

The second elastic portion 327b and the third elastic portion 327c may be positioned at a lower side of the elastic-member storage portion 328. The second elastic portion 327b may be disposed to be inclined toward a left down side, and the third elastic portion 327c may be disposed to be inclined toward a right down side.

When the dust housing 2100 is inserted into the installation space 325, the second elastic portion 327b and the third elastic portion 327c may elastically support an upper surface of the dust housing 2100.

When the mutually-engaged structure of the dust housing 2100 and the base 32 is released by the first lever 2510 and the second lever 2520, the second elastic portion 327b and the third elastic portion 327c push the dust housing 2100 to a lower side and moves the dust housing 2100 to an outside of the storage housing 326.

By the elastic force of the housing elastic member 327, a user can easily separate the dust housing 2100 from the installation space 325.

Since the elastic-member support portion 329 supports the housing elastic member 327, the housing elastic member 327 can be prevented from being separated to the installation space 325. Even if the dust housing 2100 is repeatedly mounted and separated, the housing elastic member 327 is firmly supported by the elastic-member support portion 329.

The mobile robot 1 may have a structure in which the body 30 moves by rotational motion of at least one of the mop module 40 and the sweep module 2000 without additional driving wheels. The body 30 may move only by the rotational motion of the mop module 40. The mobile robot 1 may have a structure in which the body 30 moves by rotational motion of a pair of spin mops 41*a* and 41*b* without additional driving wheels.

The mobile robot 1 may include a mop driving unit 60 that provides driving force to the mop module 40. The rotational force provided by the mop driving unit is transmitted to the spin mop 41 of the mop module 40.

Figure 22:
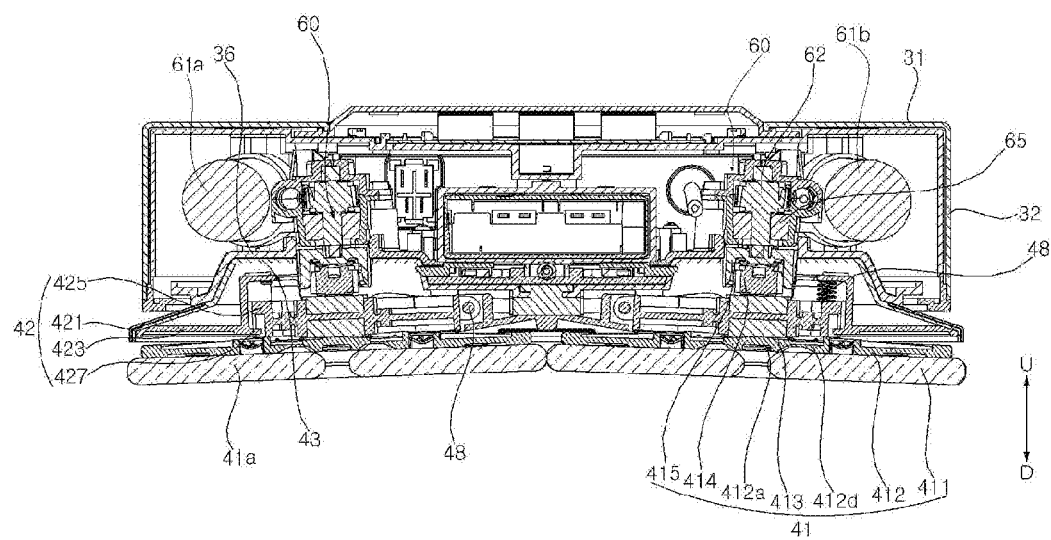
FIG. 22 is a cross-sectional view of the mobile robot taken along a line passing through rotation axes of left and right spin mops.

Referring to FIG. 22, the mop module 40 may include a left-mop driving unit 60*a* that provides power to rotate the left spin mop 41*a*, and a right-mop driving unit 60*b* that provides power to rotate the right spin mop 41*b*. The pair of mop driving units may be symmetrical at left and right sides with respect to a central longitudinal axis Po of the mobile robot. Hereinafter, description of the mop driving unit 60 may be understood as a description of each of the pair of mop driving units 60. The central longitudinal axis Po means a line parallel to a front-rear direction and passing through a geometric center Tc of a body. The central longitudinal axis Po may be defined as a line passing through the geometric center Tc of the body while being perpendicular to an imaginary line connecting a central axis of the left spin mop and a central axis of the right spin mop.

The mop driving unit 60 may include a mop motor 61 that provides rotational force. The left-mop driving unit 60 may include a left-mop motor 61*a*, and the right-mop driving unit 60 may include a right-mop motor 61*b*. A rotation axis of the mop motor 61 may extend in the up-down direction. The left-mop motor 61*a* and the right-mop motor 61*b* may be bisymmetrical or bilaterally symmetrical to each other based on or with respect to the central longitudinal axis Po. That is, the left-mop motor 61*a* and the right-mop motor 61*b* may be symmetrical to each other in a left-right direction or may be symmetrical to each other with respect to a vertical axis.

The mop driving unit 60 may include a drive transmission unit 62 that transmits rotational force of the mop motor 61 to a driving joint (a main joint) 65. The drive transmission unit 62 may include a gear and/or a belt, or the like, and may include a gear shaft that becomes a rotation axis of the gear.

The mobile robot 1 includes a water supply module 80 that supplies water required for mopping a floor. The water supply module 80 may supply water required for the mop module 40 or the sweep module 2000. In the present embodiment, the water supply module 80 may supply water to the mop module 40. The water supply module 80 may supply water to the pair of spin mops 41*a* and 41*b*.

The water supply module 80 may include a water tank 81 that stores water supplied to the mop module 40 or the sweep module 2000. In the present embodiment, the water tank 81 stores water supplied to the mop module 40. The mop module 40 is provided to perform wet mopping (mopping while supplying water).

Figure 26:
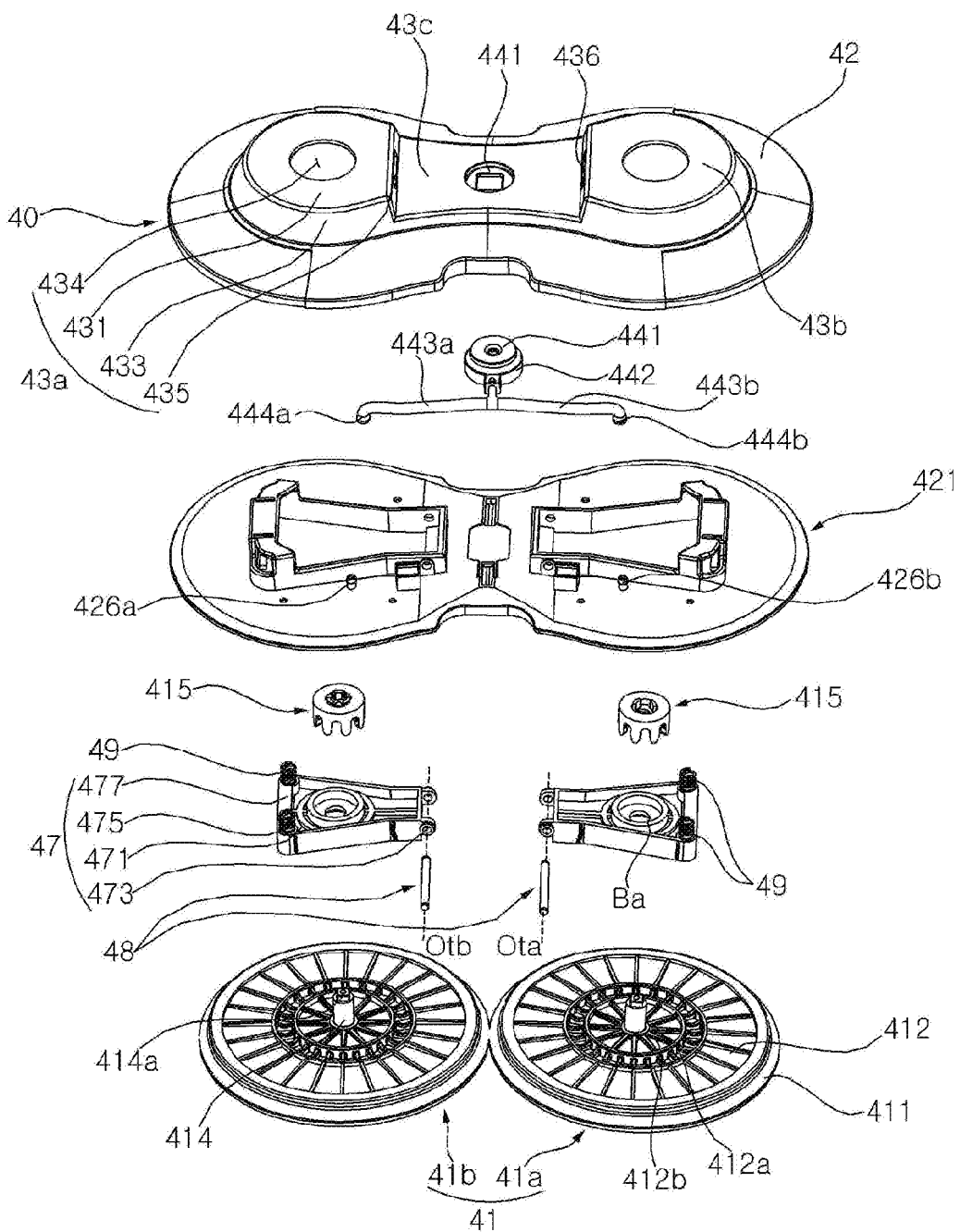
FIG. 26 is an exploded perspective view of the mop module shown in FIG. 24.
Figure 28:
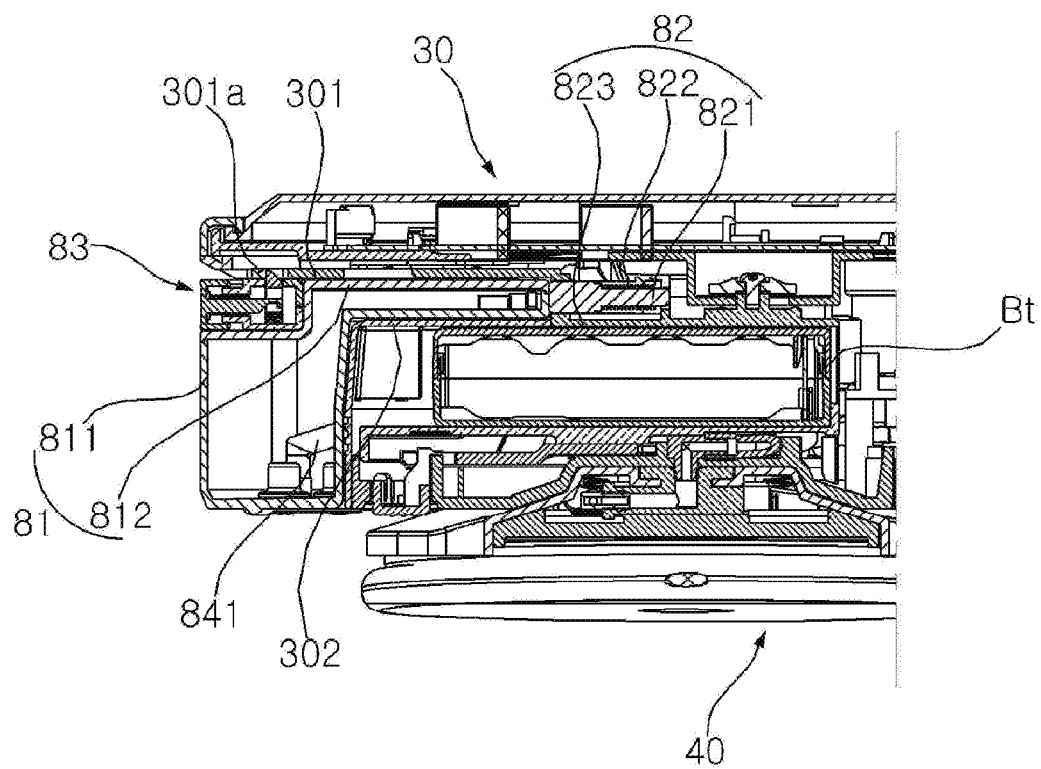
FIG. 28 is a cross-sectional view taken along line 28-28' in FIG. 20 to show a water tank and a water-tank detachable module.

Referring to FIG. 26 and FIG. 28, the water supply module 80 supplies water to the mop module 40. The water supply module 80 supplies water to the mop module 40. The water supply module 80 supplies water to a water distribution module 44. The water supply module 80 may be installed on the body 30.

The water supply module 80 may include a water tank 81 for storing water. A part of the water tank 81 may be disposed at an inside of the body 30. The water tank 81 may be disposed at a rear side of the body 30. Specifically, a partial area of the water tank 81 may be exposed to an outside of the body 30.

More specifically, the water tank 81 may include at least a water-bottle circumferential surface 811 and a water-bottle top surface 812 crossing the water-bottle circumferential surface 811. When the water tank 81 is coupled to the body 30, at least the water-bottle circumferential surface 811 of the water tank 81 may be exposed to the outside of the body 30, and the water-bottle top surface 812 may be positioned at an inside of the body 30.

The water-bottle circumferential surface 811 of the water tank 81 defines or forms an appearance of the body 30, together with a side surface of the body 30. When the water tank 81 is coupled to the body 30, the water-bottle circumferential surface 811 may form a surface that is exposed to an outside of the body and crosses a horizontal direction. The water-bottle top surface 812 may form a surface that crosses the water-bottle circumferential surface 811 (a surface parallel to the horizontal direction).

An inner water pipe 841 for a water tank may be disposed at the water tank 81. In order to efficiently supply water stored in the water tank 81 to the mop module, the other end of the inner water pipe 841 may be disposed close to a lower end of the water tank 81. One end of the inner water pipe 841 may be connected to a water-pipe coupler 88.

The water tank 81 may be provided to be drawn at an outside of the body 30. The water tank 81 may be provided to be drawn out at the outside of the body 30 in a horizontal direction. Specifically, the water tank 81 may be provided to be drawn out to a rear side of the body 30.

One side of the body 30 may be provided with a water-tank accommodating portion 303 for accommodating the water tank 81. The water-tank accommodating portion 303 may have a shape opened in a horizontal direction (in a rear direction). Specifically, the water-tank accommodating portion 303 may include at least two water-tank accommodating surfaces 301 and 302 disposed to face each other. A hook coupling portion 301*a* to which a hook 835 to be described later is coupled may be formed at any one of the water-tank accommodating surfaces 301 and 302. The hook coupling portion 301*a* may be a hole or a groove formed at an upper water-tank accommodating surface 301. The upper water-tank accommodating surface 301 vertically overlaps the water-bottle top surface 812 when the water tank 81 is coupled to the body 30. A body coupler 89 may be disposed at the water-tank accommodating portion 303.

The water supply module 80 may include a water-tank cap 814 for opening and closing the water tank 81. The water-tank cap 814 may be disposed at the water-bottle tope surface 812 of the water tank 81. In a state that the water tank 81 is drawn out from the body 30, a user may open the water-tank cap 814 and fill water in the water tank 81.

The water supply module 80 may include a water-level display unit (not shown) in which a water level of the water tank 81 is displayed. The water-level display unit may be disposed at the water-bottle circumferential surface 811 of the water tank 81. The water-level display unit may be formed of a transparent material, and may be provided so that a user can directly see the water level of the water tank 81.

The water supply module 80 may include a pump 85 that pressurizes the water W in the water tank 81 to move the water W to the mop module 40. The pump 85 may be disposed at an inside of the body 30.

Although it is not shown, in another embodiment, the water supply module 80 may include a valve. In this instance, when the valve is open without a pump, water in the water tank 81 may move to the mop module 40 by gravity of the water.

Although it is not shown, in yet another embodiment, the water supply module 80 may include a water-permeable stopper. The water-permeable stopper may be disposed in a supply pipe. The water can move through the water-permeable stopper, but a movement speed of the water may be decreased by the water-permeable stopper.

Hereinafter, an embodiment including a pump 85 will be described as an example, but is not necessarily limited thereto.

Figure 29:
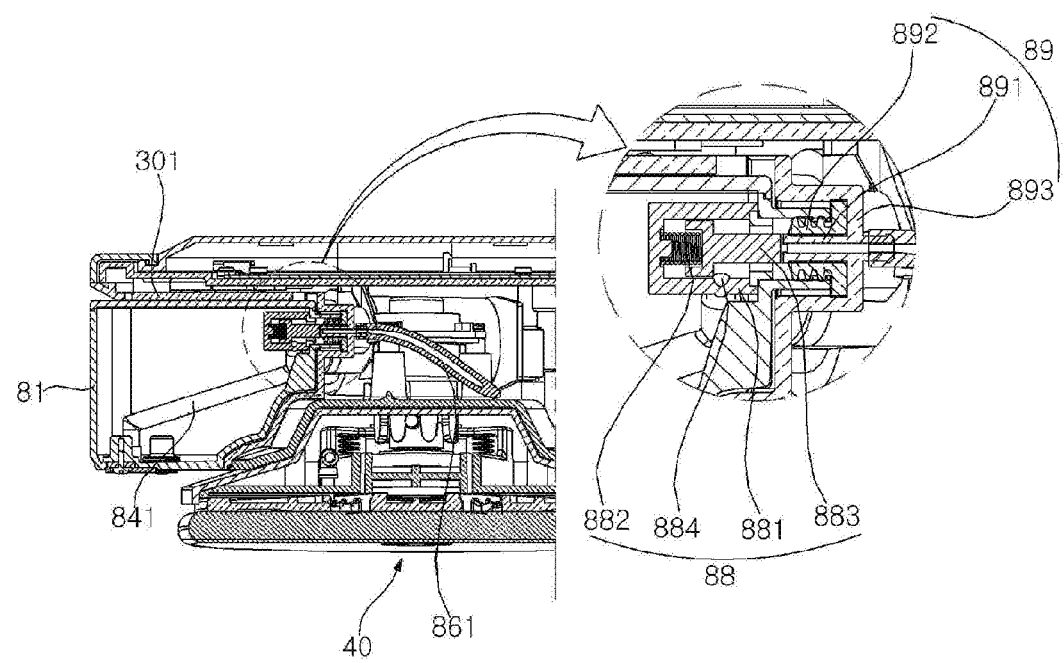
FIG. 29 is a cross-sectional view taken along line 29-29' in FIG. 20 to show the water tank and a water-pipe coupler.
Figure 30:
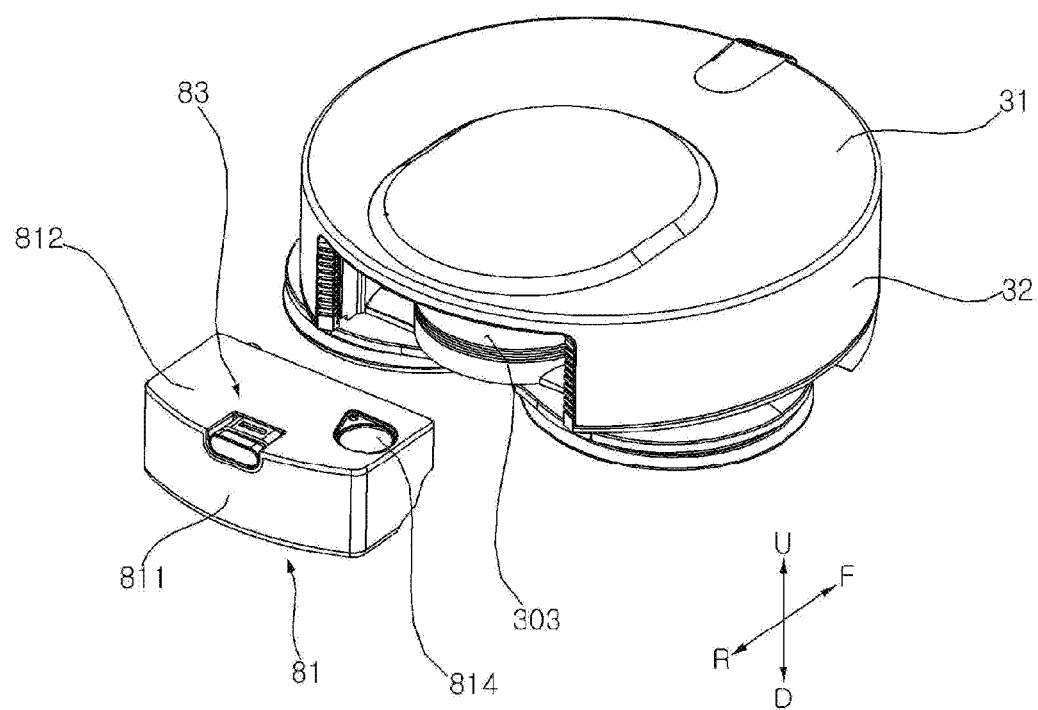
FIG. 30 is a view showing a state that the water tank is separated from the body.
Figure 31:
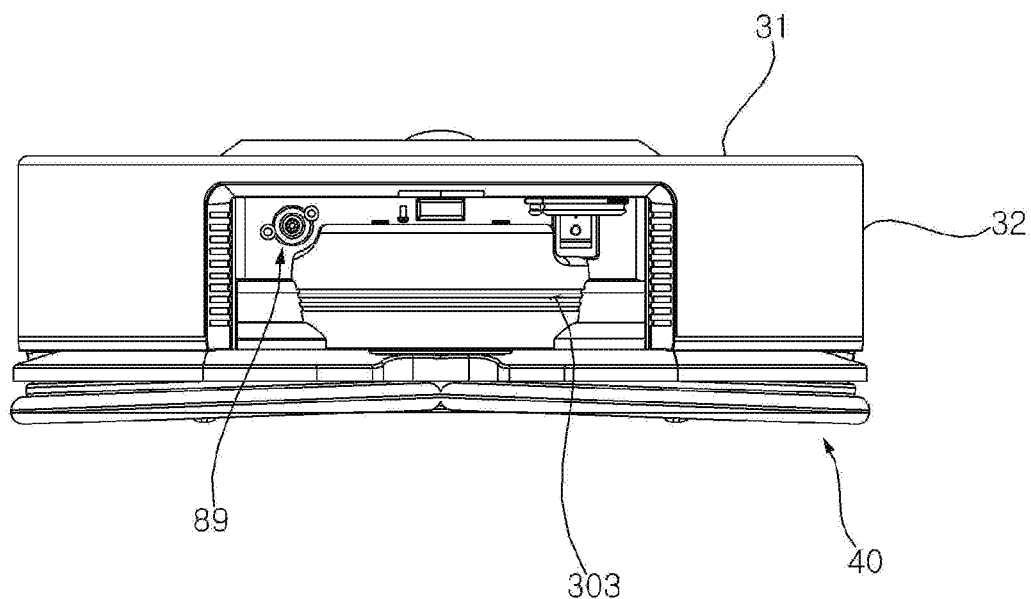
FIG. 31 is a view showing a state that the water tank is separated from the body.
Figure 32:
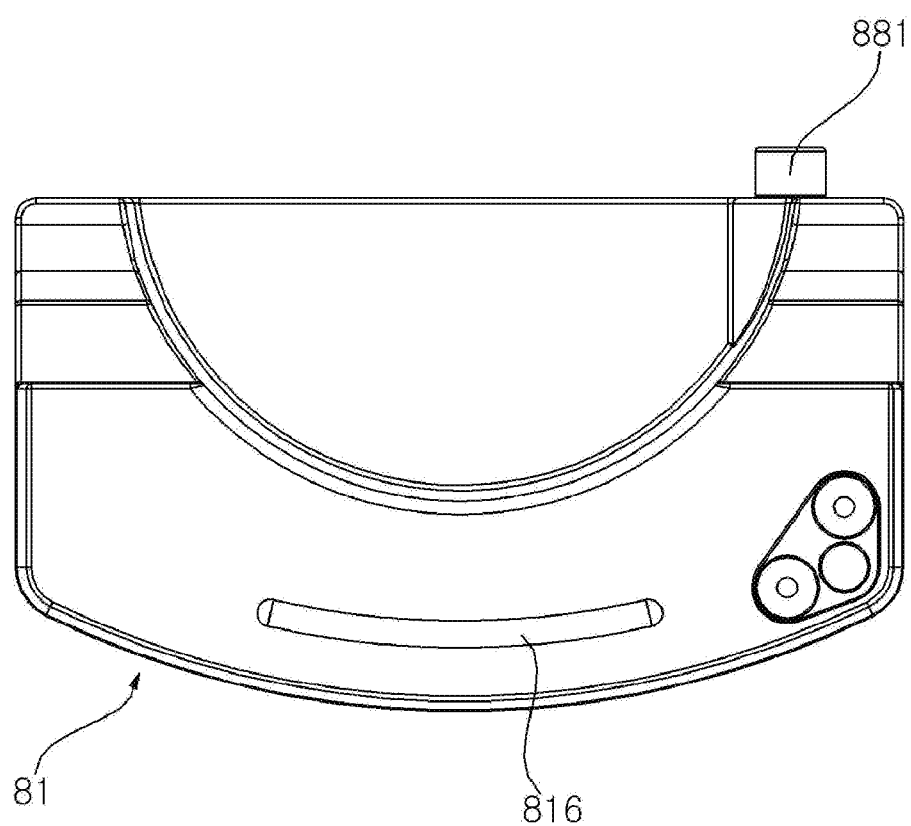
FIG. 32 is a bottom view of the water tank viewed from a lower side.
Figure 33:
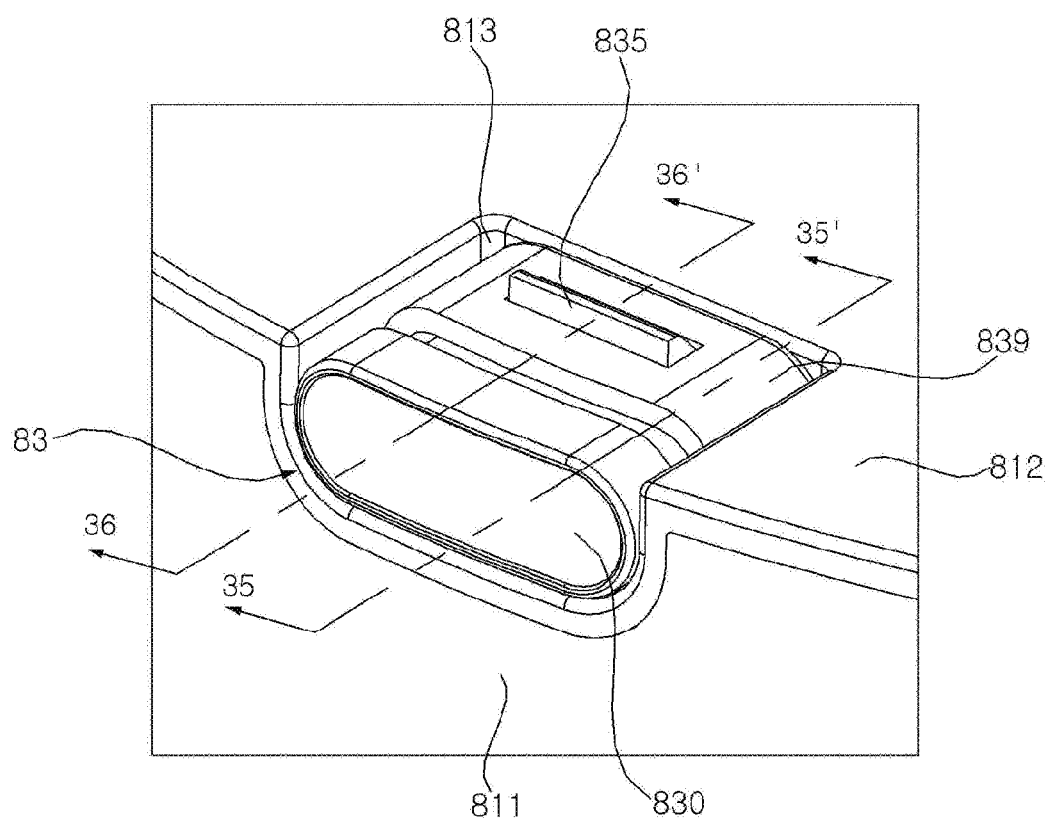
FIG. 33 is a view showing a portion where the water-tank detachable module is coupled to the water tank.
Figure 34:
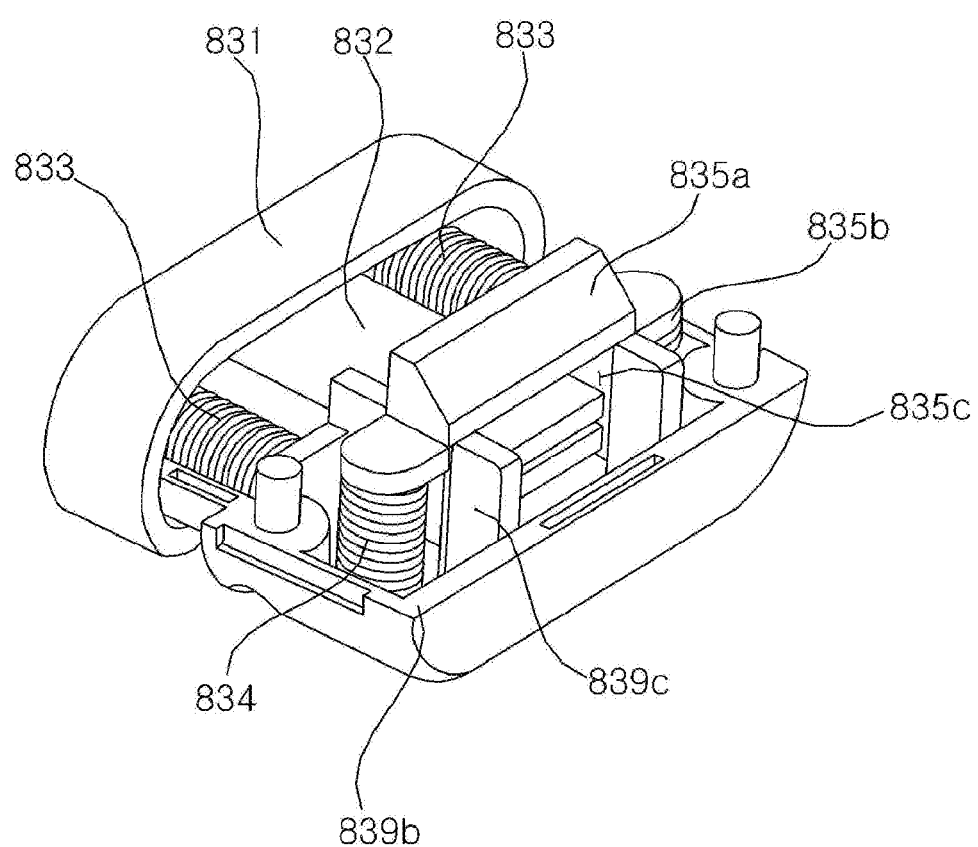
FIG. 34 is a perspective view showing the water-tank detachable module in a state that a housing upper cover is removed.
Figure 35:
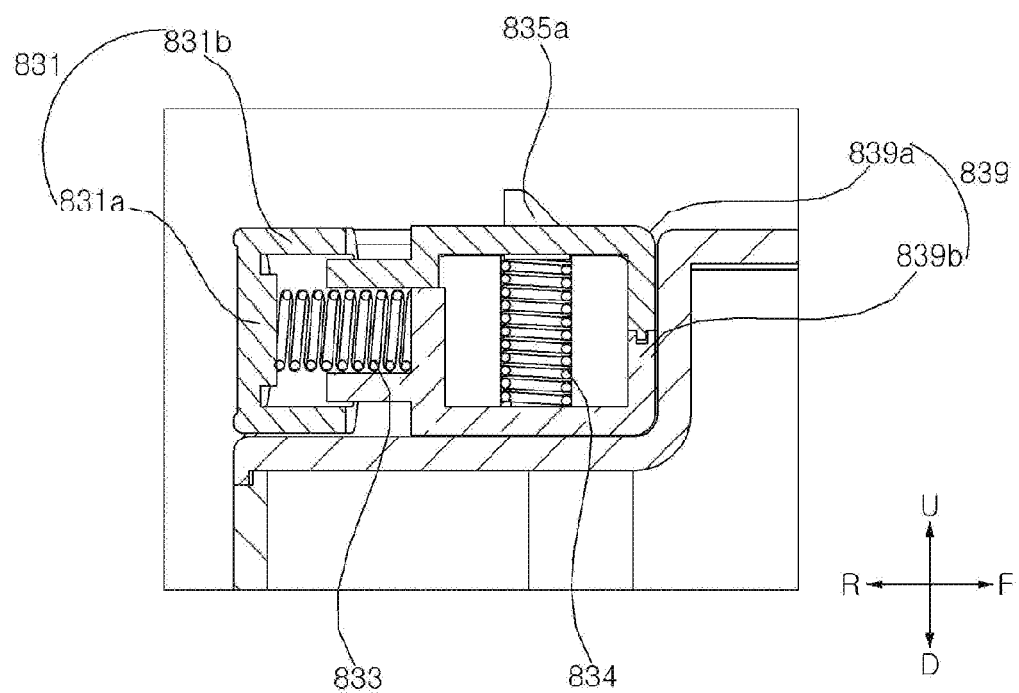
FIG. 35 is a cross-sectional view of the water-tank detachable module of FIG. 33 taken along line 35-35'.
Figure 36:
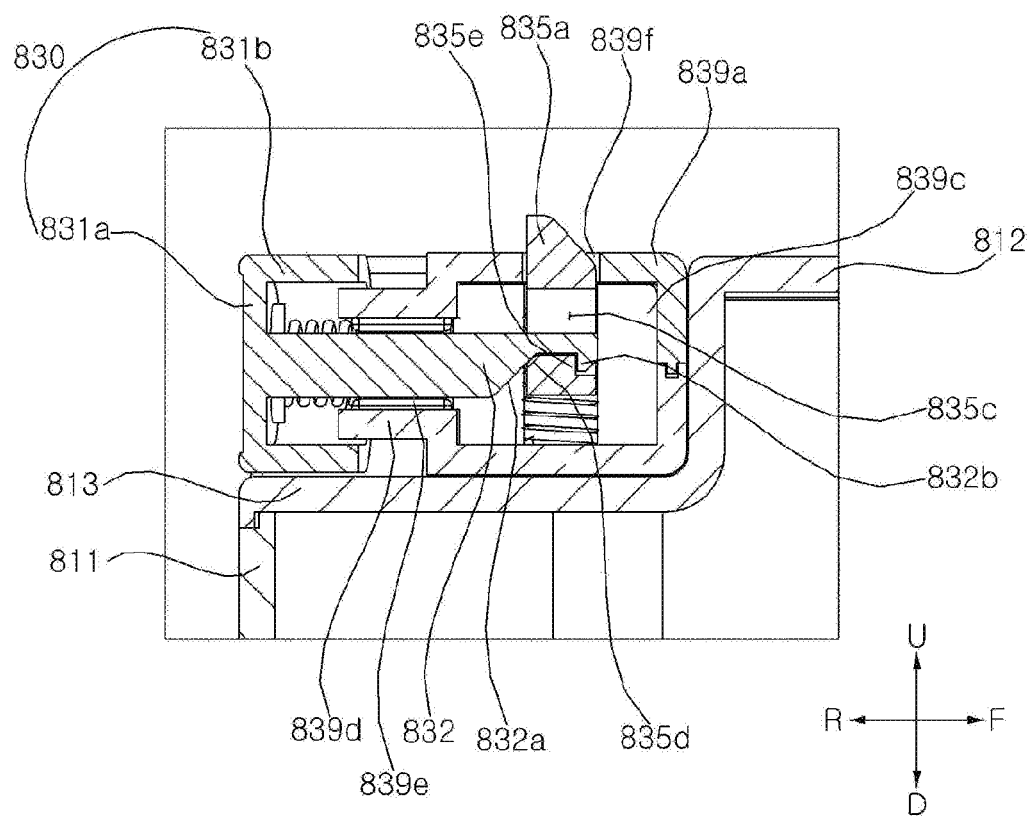
FIG. 36 is a cross-sectional view of the water-tank detachable module of FIG. 33 taken along line 36-36'.

Referring to FIG. 29, a water supply module 80 may further include a body coupler 89 that couples the water tank 81 and the supply pipe 86 positioned at the body 30. The body coupler 89 may be coupled to the water-pipe coupler 88 of the water tank 81, and water in the water tank 81 may be guided to the supply pipe 86 of the body through the water-pipe coupler 88 and the body coupler 89.

The body coupler 89 may include a coupling pipe 891. One end of the coupling pipe 891 may be connected to the supply pipe 86 and the other end of the coupling pipe 891 may be exposed to an outside of the body 30. The coupling pipe 891 may be inserted into a coupler pipe 881 and move a moving closure 883 by pushing the moving closure 883.

The body coupler 89 may include a coupling auxiliary portion 893. The coupling auxiliary portion 893 may be disposed to be spaced apart from the coupling pipe 891 and surround an outer circumference of the coupling pipe 891. The coupling auxiliary portion 893 may define a space in which the coupler pipe 881 is inserted between the coupling pipe 891 and the coupling auxiliary portion 893.

Depending on the embodiment, the coupling auxiliary portion 893 may be omitted, and the coupling pipe 891 may protrude to an outside of the body 30. The coupling auxiliary portion 893 protects the coupling pipe 891 and improves coupling force of the coupler pipe 881. The coupling auxiliary portion 893 may have a groove shape opened in a drawn-out direction (in a rear direction).

The body coupler 89 may further include a water-pipe gasket 892. The water-pipe gasket 892 may surround an outer circumferential surface of one end of the coupling pipe 891 in a state that the water tank 81 is inserted into the body 30. The water-pipe gasket 892 may be in contact with an inner circumferential surface of the coupler pipe 881 and to be surrounded by the coupler pipe 881. The water-pipe gasket 892 may have a ring shape with an outer diameter larger of an inner diameter of the coupler pipe 881.

The water-pipe gasket 892 may be formed of a material having a certain degree of elasticity. The water pipe gasket 892 may be formed of a silicone material. The body coupler 89 may be installed on the water-tank accommodating portion 303. The coupling pipe 891 of the body coupler 89 may protrude from one surface of the water-tank accommodating portion 303.

The water supply module may further include a water-pipe coupler 88. The water-pipe coupler 88 may be disposed at the water tank 81 and be coupled to the body 30 to deliver water in the water tank 81 to the mop module. The water-pipe coupler 88 may be coupled to the body coupler 89.

For example, the water-pipe coupler 88 may include a coupler pipe 881, a moving closure 883, and a coupler spring 882. The coupler pipe 881 has a space in which a water-pipe connection hole 884 communicating with an inside of the water tank 81 is formed and a part of the coupling pipe 891 of the body 30 is inserted. The water-pipe connection hole 884 may be connected to one end of the inner water pipe 841. A portion of the coupler pipe 881 may protrude to an outside of the water tank 81.

The moving closure 883 may open the water-pipe connection hole 884 by a pressure by the coupling pipe 891, and may block the water-pipe connection hole 884 by elastic force by the coupler spring 882. The moving closure 883 may be positioned at an inside of the coupler pipe 881 and reciprocate in a horizontal direction within the coupler pipe 881.

The coupler spring 882 may provide elastic restoring force to the moving closure 883 to a position where the moving closure 883 closes the water-pipe connection hole 884.

Referring to FIG. 33 to FIG. 36, in the present embodiment, a water-tank detachable module 83 for coupling the water tank 81 to the body 30 and releasing the water tank 81 from the body 30 may be included. By the water-tank detachable module 83, the water tank 81 and the body 30 may be hook-coupled by elastic force when the water tank 81 is coupled to the body 30, and the hooked-coupling of the water tank 81 and the body 30 may be released by external force.

The water-tank detachable module 83 may be exposed at the water-bottle top surface 812 and the water-bottle circumstantial surface 811. Specifically, a detachable seating portion 813 on which the water-tank detachable module 83 is seated or settled may formed at the water bottle. The detachable seating portion 813 may be formed at a point where the water-bottle circumferential surface 811 and the water-bottle top surface 812 meet. At the detachable seating portion 813, the water-bottle top surface 812 may be recessed to a down side and a part of the water-bottle circumferential surface 811 of the detachable seating portion 813 may be open.

For example, the water-tank detachable module 83 may include a hook 835 and an operation button 830. The water-tank detachable module 83 may further include a detachable housing 839, a return member, and an elastic-force providing portion. The water-tank detachable module 83 may be installed on the detachable seating portion 813 of the water tank 81.

The operation button 830 may be exposed to one surface of the water tank 81 so that the hook 835 is operated. When the operation button 830 may be pressed in a horizontal direction, the coupling between the hook 835 and the body 30 is released. When the pressure disappears from the operation button 830, the hook 835 and the body 30 is released by the elastic force of the return member.

The operation button 830 is slid with the hook 835 to transmit moving force of the operation button 830 to the hook 835. The operation button 830 and the hook 835 move in a direction intersecting each other. When the operation button 830 is pressed in a front direction, the operation button 830 and the sliding hook 835 move to a down direction. The operation button 830 may transmit the force applied in a horizontal direction to a vertical direction.

The operation button 830 may be disposed at the water-bottle circumferential surface. Specifically, one surface of the operation button 830 (a surface crossing a horizontal direction) may form a surface parallel to the water-bottle circumferential surface.

The operation button 830 may include a hook 835 and an inclined cam 832a that is slid. The inclined cam 832a may convert horizontal movement force of the operation button 830 to vertical movement force and transmit the vertical movement force to the hook 835. The inclined cam 832a may have a bar shape extending in a horizontal direction in which a slope is formed at a lower surface of a front end portion.

The inclined cam 832a may pass through a button hole 839e of the detachable housing 839, a rear end of the inclined cam 832a may be exposed to an outside of the detachable housing 839, and a front end of the inclined cam 832a may be positioned at an inside of the detachable housing 839. The inclined cam 832a may incline upward in a front direction.

The operation button 830 may include a restraining portion 832b for limiting or suppressing separation of the operation button 830. The restraining portion 832b may limit or suppress the operation button 830 from being separated from the detachable housing 839 by the elastic force, and may restrict the hook 835 from separated from the detachable housing 839 by the elastic force. The restraining portion 832b may be formed of a portion protruding from a front end of the inclined cam 832a to a down side.

The restraining portion 832b may be engaged with, be hook-coupled to, or be fastened with two surfaces of the hook 835 intersecting each other. The restraining portion 832b may be engaged with an upper surface and one side surface of a portion of the hook 835. As another example, the restraining portion 832b may be engaged with the detachable housing 839 to prevent the operation button 830 from being separated. The restraining portion 832b may be engaged at least in a horizontal direction. In this instance, the phrase that the restraining portion 832b may be engaged in the horizontal direction may mean that the restraining portion 832b has at least a surface crossing the horizontal direction and is engaged when the restraining portion 832b moves in the horizontal direction.

The operation button 830 may include an exposed portion 831a exposed to an outside of the detachable housing 839. The exposed portion 831a is exposed to the water-bottle circumferential surface 811. A surface of the exposed portion 831a may be arranged in parallel with the water-bottle circumferential surface 811. The exposed portion 831a may be slid in a horizontal direction to the detachable seating portion 813.

The operation button 830 may further include a button guide 831b for guiding a movement of the exposed portion 831a. The button guide 831b may extend from the exposed portion 831a in a rear direction. The button guide 831b may be slid to the detachable seating portion 813. The button guide 831b may have a shape that protrudes in a front direction from a border or an edge of the exposed portion 831a to surround at least a portion of the inclined cam 832a. The button guide 831b may be slid on the detachable housing 839. The exposed portion 831a may be connected to one end of the inclined cam 832a. The inclined cam 832a may be inclined upward in a direction away from the exposed portion 831a.

The exposed portion 831a may be in contact with the detachable housing 839 and thus limit or suppress a horizontal movement of the operation button 830, and the button guide 831b may be in contact with the detachable housing 839 and thus limit or suppress a vertical movement of the operation button 830. Specifically, the inclined cam 832a may be installed on the button hole 839e of the detachable housing 839 to be able to reciprocate in the front-rear direction. The exposed portion 831a may be horizontally overlapped with the button hole 839e at an outside of the detachable housing 839, and at least a portion of the button guide 831b may be positioned to be horizontally overlapped at an outside of the detachable housing 839. A part of the button guide 831b may be disposed to surround an outer periphery of the button hole 839e.

The hook 835 is engaged with the body 30 to fix or constrain the water bottle to the body 30. The hook 835 may be inserted into the hook coupling portion 301a of the body 30. The hook coupling portion 301a may be a hole penetrating the body 30 in a vertical direction, or a groove opened downward. The hook 835 may move in the vertical direction. The hook 835 may move in a direction crossing a movement direction of the operation button 830.

The coupling of the hook 835 is released when the operation button 830 is pressed in the horizontal direction, and the hook 835 is coupled to the hook coupling portion 301a by elastic force of a return member when the pressure disappears from the operation button 830. The hook 835 moves downward when the operation button 830 is pressed, and moves upward (returns to an initial position) by elastic force when pressure is not applied to the operation button 830, In this instance, the initial position of the hook 835 may mean a position of the hook 835 when no external pressure is applied.

The hook 835 may be located at the water-bottle top surface 812 of a water bottle. Specifically, the hook 835 may be exposed at the upper surface 812 of the water bottle. For example, the hook 835 may be installed on the upper surface 812 of the water tank, or may be installed on the water-tank detachable module 83 so that the hook 835 protrudes at one surface of the water-tank detachable module 83 parallel to the water-bottle top surface 812.

For example, the hook 835 may be engaged with the body 30 and pass through an upper surface of the detachable housing 839. A part of the hook 835 may be located at an outside of the detachable housing 839, and another part of the hook 835 may be located at an inside of the detachable housing 839.

The hook 835 may include a body-coupled portion 835a. The body-coupled portion 835a is movably positioned in an up-down direction at a hook hole 839f. The body-coupled portion 835a may pass through the hook hole 839f, a part of the body-coupled portion 835a may be located at an outside of the detachable housing 839, and another part of the body-coupled portion 835a may be located at an inside of the detachable housing 839.

An upper end of the body-coupled portion 835a does not interfere with coupling of the water tank 81 when the water tank 81 is inserted. The upper end of the body-coupled portion 835a limits that the coupling of the body 30 is easily released in a state that the water tank 81 is coupled to the body 30. The upper end of the body-coupled portion 835a may be inclined downward toward a front side.

The hook 835 may include a cam counterpart portion 835d. The cam counterpart portion 835d may be connected to the body-coupled portion 835a and may be slid with an inclined cam 832a. The cam counterpart portion 835d may be slid with the inclined cam 832a to convert horizontal movement force of the inclined cam 832a into vertical movement force and transmit the vertical movement force to the body-coupled portion 835a. The cam counterpart portion 835d may be an inclined surface or a horizontal surface.

The hook 835 may further include a cam hole 835c. The cam hole 835c defines a space in which the inclined cam 832a and/or a restraining portion 832b is located. The cam hole 835c is a space in which the inclined cam 832a and the restraining portion 832b move. An inner peripheral surface of the cam hole 835c and the inclined cam 832a are sliding, and the restraining portion 832b is engaged with an inner peripheral surface or an edge of the cam hole 835c. The cam hole 835c is a hole opened in a front-rear direction.

The hook 835 may further include a cam-engaged portion 835e where the restraining portion 832b is engaged, coupled, or hooked. The cam-engaged portion 835e may be defined as a surface that is engaged with the restraining portion 832b in a horizontal direction. The cam-engaged portion 835e may be formed at an inner circumferential surface of the cam hole 835c.

The detachable housing 839 may transmit the horizontal movement force of the operation button 830 to the hook 835 as vertical movement force in a state that the operation button 830 and the hook 835 are not separated. The detachable housing 839 may guide the movement of the hook 835 and the operation button 830. The detachable housing 839 prevents the hook 835 and the operation button 830 from being separated. The detachable housing 839 limits a movement path of the hook 835 and the operation button 830.

The detachable housing 839 may accommodate at least a part of the hook 835 and a part of the operation button 830, and expose a part of the hook 835 and a part of the operation button 830 to an outside.

The detachable housing 839 may be defined by coupling a housing upper cover 839a and a housing lower cover 839b.

The detachable housing 839 may include a hook hole 839f through which the hook 835 passes. The hook hole 839f may be defined by the coupling of the housing upper cover 839a and the housing lower cover 839b. The housing upper cover 839a defining a periphery or an edge of the hook hole 839f and the housing lower cover 839b may be extend in a horizontal direction.

The detachable housing 839 may include a button hole 839e through which the operation button 830 passes on the other surface crossing one surface. The button hole 839e may be formed at the housing upper cover 839a to open a part of the housing upper cover 839a in an up-down direction.

The detachable housing 839 may further include a housing guide 839c that guides a movement of the hook 835. The housing guide 839c may be disposed at an inner space formed by coupling the housing upper cover 839a and the housing lower cover 839b, and may extend in an up-down direction. Two housing guides 839c may extend in a front-rear direction to be spaced apart from each other in a front-rear direction. The hook 835 may be guided between the two housing guides 839c.

The return member may include a first return member 833 that returns the operation button 830 to an initial position. The first return member 833 may be disposed between the operation button 830 and the detachable housing 839 to provide elastic force to return the operation button 830 to a rear side.

Specifically, the first return member 833 may be positioned between the exposed portion 831a and the detachable housing 839. More specifically, one end of the first return member 833 may be coupled to a front surface of the exposed portion 831a, and the other end of the first return member 833 may be coupled to a rear surface of the detachable housing 839.

The return member may include a second return member 834 that returns the hook 835 to an initial position. The second return member 834 may be disposed between the hook 835 and the detachable housing 839 to provide elastic force to return the hook 835 in an upper direction.

Specifically, one end of the second return member 834 may be coupled to a lower surface of the housing lower cover 839b, and the other end of the second return member 834 may be coupled to a spring-installed portion 835b of the hook 835. The second return member 834 may be accommodated in the detachable housing 839.

Referring to FIG. 28, the mobile robot may further include an elastic-force providing portion 82 that provides elastic force in a direction in which the water tank 81 is drawn out.

The elastic-force providing portion 82 may be slidably disposed in a movement direction of the water tank 81 and may include a moving bar 821 having one end in contact with the water tank 81. The elastic-force providing portion 82 may include an elastic portion 822 that is provided to generate a deformation amount according to the movement of the moving bar 821 and provides constant elastic force regardless of the deformation amount.

The elastic-force providing portion 82 may include a moving-bar guide 823 that guides the movement of the moving bar 821.

The elastic-force providing portion 82 may provide force to push the water tank 81 in the direction in which the water tank 81 is drawn out, and thus, the water tank 81 may be automatically drawn out from the body 30 even if a user does not pull the tank 81.

In particular, even in a case that a size of the water tank 81 is limited, a position of the water tank 81 according to a design is limited to a rear side, and the exposed portion 831a of the operation button 830 is limited to be positioned at the water-bottle circumferential surface 811 of the water tank 81, the water tank 81 can be drawn out from the body 30 by the elastic-force providing portion 82a through using force applied from a rear side to a front side.

Figure 37:
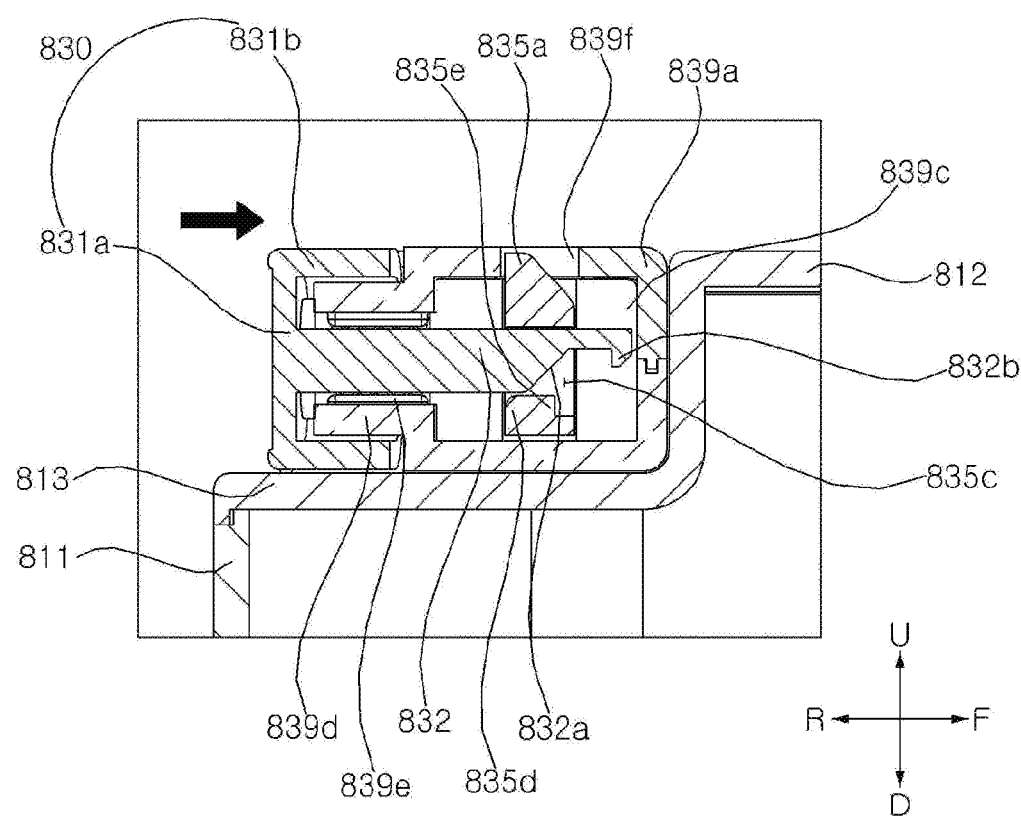
FIG. 37 is a view showing an operation of the water-tank detachable module according to the present disclosure.

Referring to FIG. 37, an operation of the water-tank detachable module 83 will be described. When a user presses the exposed portion 831a of the operation button 830 in a front direction, the hook 835 moves to a down side by sliding of the inclined cam 832a and the cam counterpart portion 835d, and the coupling of the hook 835 and the hook coupling portion 301a is released, and the water tank 81 is drawn out from the body 30 by the elastic force of the elastic-force providing portion 82.

The mobile robot 1 may include a water supply module 80 that supplies water required for mopping a floor. The water supply module 80 may supply water required for the mop module 40 or the sweep module 2000. In the present embodiment, the water supply module supplies water to the mop module 40. The water supply module supplies water to a pair of spin mops 41a and 41b.

The water supply module 80 may include a water supply tank 81 for storing water supplied to the mop module 40 or the sweep module 2000 and a supply member for supplying water from the water tank 81 to the mop module 40.

Figure 23:
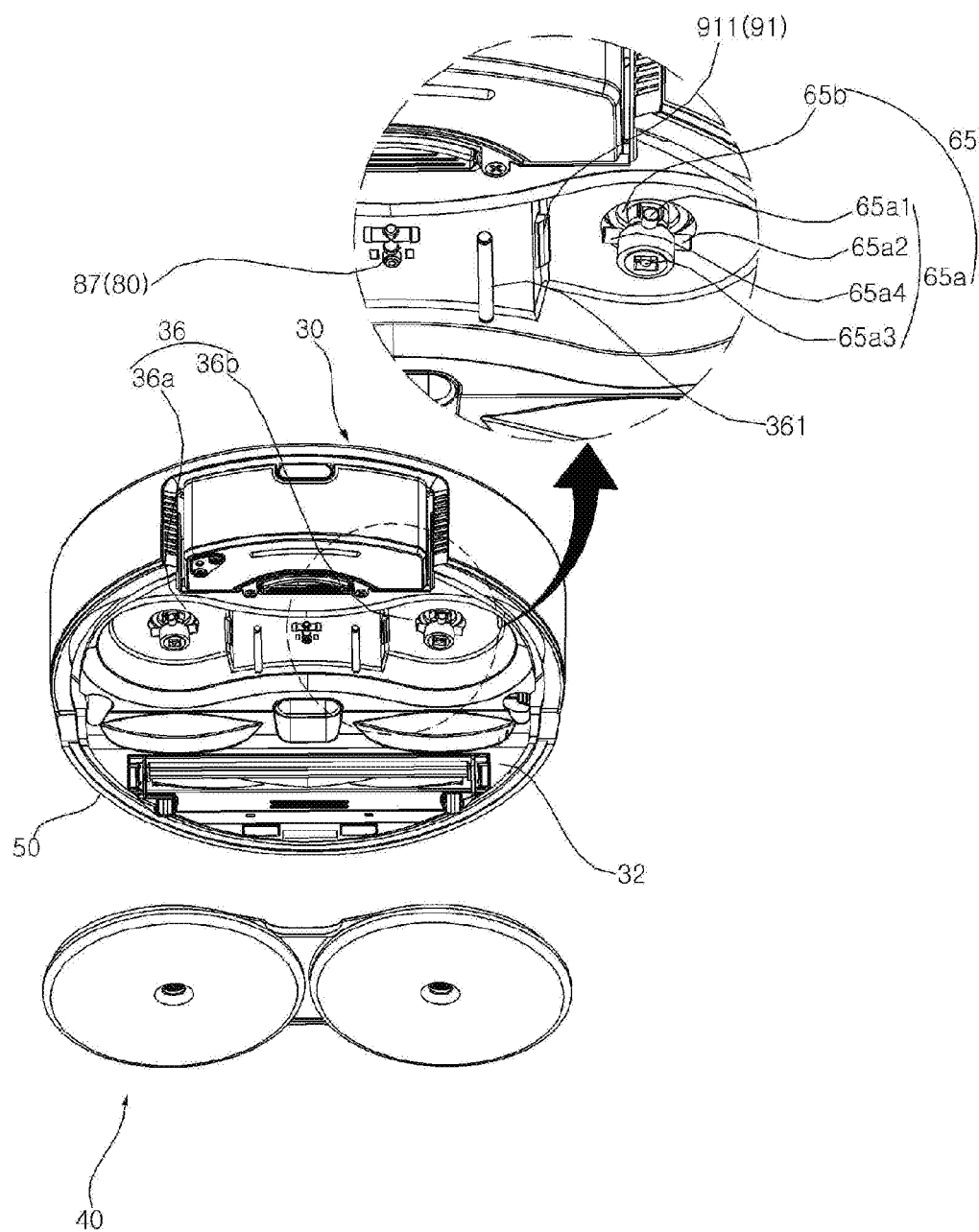
FIG. 23 is a perspective view showing a body of the mobile robot in a state that a mop module is separated.

Referring to FIG. 23, the water supply module may include a water-supply connection portion 87 for guiding water in the water tank 81 to the mop module 40. Water moves from the body 30 to the mop module 40 through the water-supply connection portion 87. The water-supply connection portion 87 may be disposed at a lower side of the body 30. The water-supply connection portion 87 may be disposed at a module seating portion 36. The water-supply connection portion 87 may be disposed on a lower surface of the module seating portion 36. The water-supply connection portion 87 may be disposed at a lower surface portion 361 of the module seating portion 36.

A pair of water-supply connection portion 87 corresponding to the pair of spin mops 41a and 41b may be provided. The pair of water-supply connection portions 87 may be bisymmetrical or bilaterally symmetrical to each other. That is, the pair of water-supply connection portions 87 may be symmetrical to each other in a left-right direction or may be symmetrical to each other with respect to a vertical axis.

The water-supply connection portion 87 may protrude from the module seating portion 36. The water-supply connection portion 87 may protrude to a lower side from the module seating portion 36. The water-supply connection portion 87 may be engaged with a water-supply counterpart portion 441 of the mop module 40 to be described later. The water-supply connection portion 87 may include a hole penetrating the module seating portion 36 in an up-down direction, and water in the body 30 may move to the mop module 40 through the hole of the water-supply connection portion 87. The water in the body 30 may move to the mop module 40 through the water-supply connection portion 87 and the water-supply counterpart portion 441.

Figure 25:
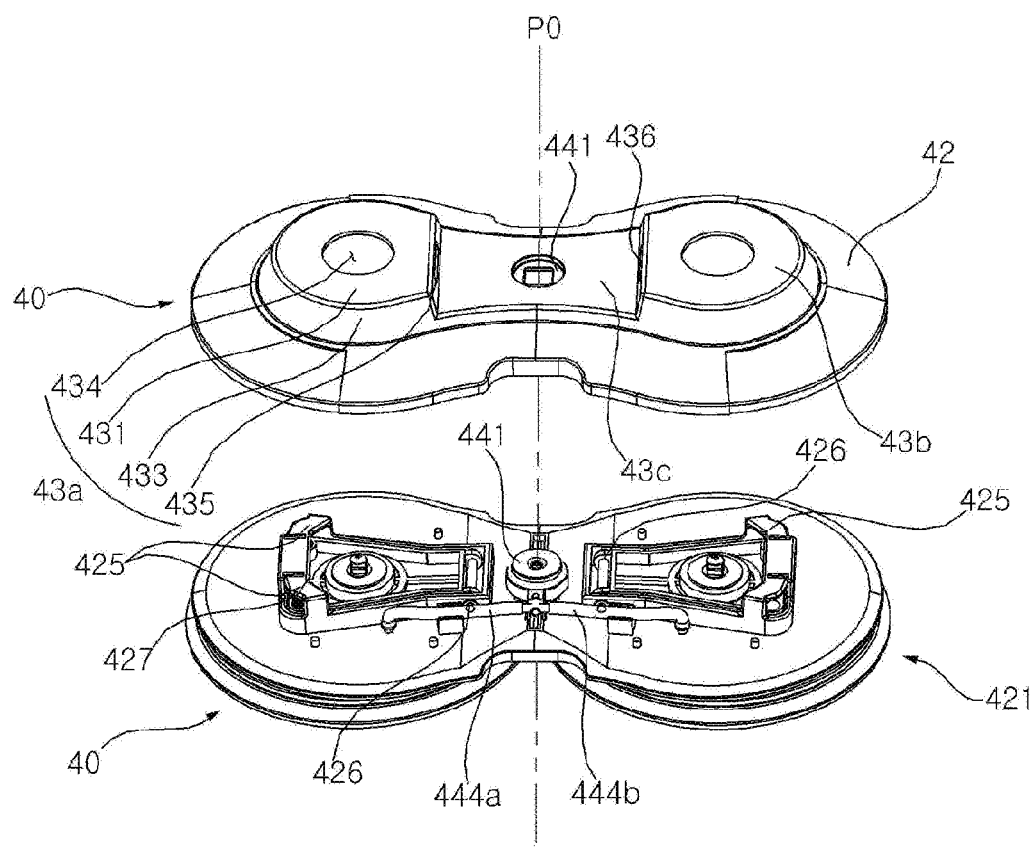
FIG. 25 is an exploded perspective view of the mop module shown in FIG. 24.

Referring to FIG. 25 and FIG. 26, the mop module 40 may include at least one mop portion 411 provided to mop a floor while rotating. The mop module 40 may include at least one spin mop 41 provided to be in contact with the floor while rotating in a clockwise direction or a counterclockwise direction when viewed from an upper side. The mop module 40 may include a pair of spin mops 41a and 41b. The pair of spin mops 41a and 41b may mop the floor by a clockwise or counterclockwise rotation when viewed from an upper side. The pair of spin mops 41a and 41b may include a left spin mop 41a and a right spin mop 41b. In the present embodiment, the spin mop 41 may rotate around rotational axes Osa and Osb extending substantially in an up-down direction.

The mop module 40 may be disposed at a lower side of the body 30. The mop module 40 may be disposed at a rear side of the sweep module 2000.

The left spin mop 41a and the right spin mop 41b may include a mop portion 411, a rotating plate 412, and a spin shaft 414, respectively. The left spin mop 41a and the right spin mop 41b each includes a water container 413. The left spin mop 41a and the right spin mop 41b each includes a driven joint 415. The descriptions of the mop portion 411, the rotating plate 412, the spin shaft 414, the water container 413, and the driven joint 415, which will be described later, may be understood as components or elements included in each of the left spin mop 41a and the right spin mop 41b.

The body 30 and the mop module 40 may be detachably coupled to each other. A state in which the body 30 and the mop module 40 are coupled to each other may be referred to as a 'coupled state'. In addition, a state in which the body 30 and the mop module 40 are separated from each other may be referred to as a 'separation state'. The mobile robot 1 may include a detachable module 90 that detachably hooks the mop module to the body. The detachable module 90 may release the coupling of the mop module 40 and the body 30 in the coupled state. The detachable module 90 operates such that the mop module 40 and the body 30 are detachably coupled to each other so that the mop module 40 is coupled to the body 30 and the mop module 40 is separated from the body 30 as necessary. The detachable module 90 may cause the mop module 40 to hang on or hooked to the body 30 in the separation state. The detachable module 90 may be disposed across the gap between the water tank 81 and the battery Bt.

The mobile robot 1 may include a base 32 forming a lower surface of the body 30. The base 32 may form a lower surface, a front surface, a rear surface, a left surface, and a right surface of the body 30. The mop module 40 may be coupled to the base 32. The sweep module 2000 may be coupled to the base 32. A controller Co and a battery Bt are disposed at an inner space formed by the case 31 and the base 32. The battery Bt supplies power to the mop motor 61 and the sweep motor 2330.

In addition, the mop driving unit 60 may be disposed at the body 30. A water supply module (not shown) may be disposed at the body 30. The detachable module 90 may be disposed at the body 30. The water supply module delivers the water in the water tank 81 to the mop module 40.

The mobile robot 1 may include a module housing 42 that forms an external appearance of the mop module 40. The module housing 42 may be disposed at a lower side of the body 30. The mobile robot 1 may include a module cabinet 52 that forms an external appearance of the sweep module 2000. The module cabinet 52 may be disposed at a lower side of the body 30. The module housing 42 and the module cabinet 52 may be spaced apart in a front-rear direction.

The mop module 40 may be detachably coupled to the body 30. The mop module 40 may be coupled to a lower side of the body 30. The body 30 may be coupled to an upper side of the mop module 40. The body 30 may include a module seating portion 36, and the mop module 40 may include a body seating portion 43. The body seating portion 43 may be detachably coupled to the module seating portion 36.

Referring to FIG. 22, the module seating portion 36 may be provided at a lower side of the body 30. The body seating portion 43 may be provided at an upper side of the mop module 40. The module seating portion 36 may be disposed at a lower surface of the base 32. The body seating portion 43 may be disposed at an upper surface of the module housing 42.

One of the module seating portion 36 and the body seating portion 43 may protrude in an up-down direction and the other of the module seating portion 36 and the body seating portion 43 may be recessed in the up-down direction to be engaged with the one of the module seating portion 36 and the body seating portion 43.

In the present embodiment, the body seating portion 43 may protrude to an upper side from the mop module 40. The module seating portion 36 in the body 30 may be recessed to an upper side to be engagement with the body seating portion 43.

When viewed from an upper side, a shape of the body seating portion 43 may be asymmetrical in the front-rear direction. Through this, when the mop module 40 is coupled to the body 30 in an inverted direction in the front-rear direction, the body seating portion 43 is not engaged with the module seating portion 36. Accordingly, the mop module 40 and the body 30 may be coupled to each other in a predetermined direction.

Referring to FIG. 23, the mop module 40 may include a pair of body seating portions 43a and 43b spaced apart from each other. The pair of body seating portions 43a and 43b correspond to the pair of spin mops 41a and 41b. The pair of body seating portions 43a and 43b correspond to a pair of module seating portions 36a and 36b.

The body 30 may include a pair of module seating portions 36a and 36b that are spaced apart from each other. The pair of module seating portions 36a and 36b correspond to the pair of body seating portions 43a and 43b.

The pair of body seating portions 43a and 43b may protrude to an upper side of the mop module 40. The pair of module seating portions 36a and 36b may be recessed to an upper side to be engaged with the pair of body seating portions 43a and 43b.

The module seating portion 36 includes a lower surface portion 361 forming a lower surface. The lower surface portion 361 may be in contact with an upper surface portion 431 of the body seating portion 43 in the coupled state. The lower surface portion 361 faces a lower side. The lower surface portion 361 may be formed horizontally. The lower surface portion 361 may be disposed at an upper side of a peripheral counterpart portion 363.

The module seating portion 36 includes a peripheral counterpart portion 363 disposed along a circumference of the lower surface portion 361. The peripheral counterpart portion 363 may be in contact with a peripheral portion 433 of the body seating portion 43 in the coupled state. The peripheral counterpart portion 363 may form an inclined surface connecting a lower surface of the base 32 and the lower surface portion 361. The peripheral counterpart portion 363 may be inclined such that a height increases as it goes from the lower surface of the base 32 toward the lower surface portion 361. The peripheral counterpart portion 363 may be disposed to surround the lower surface portion 361.

The pair of module seating portions 36 may include a pair of engaging surfaces 363a inserted between the pair of body seating portions 43. At the peripheral counterpart portion 363 of one of the module seating portions 36, the engaging surface 363a may be disposed at an area close to another adjacent module seating portion 36. The engaging surface 363a may be disposed at a region relatively close to the central longitudinal axis Po among the peripheral counterpart portion 363. The engaging surface 363a may constitute a part of the peripheral counterpart portion 363.

The module seating portion 36 may form a joint hole 364 to which at least a portion of a driving joint 65 is exposed. The joint hole 364 may be formed at the lower surface portion 361. The driving joint 65 may be disposed through the joint hole 364. The driving joint 65 is coupled to the driven joint 415 to transmit the driving force of the mom driving unit (not shown) to the spin mop.

Among the module seating portion 36 and the body seating portion 43, a surface of one may be provided with engaging portions 915 and 365, and a surface of the other counterpart portions may be provided with engaging counterpart portions 435 and 436 that are recessed to be engaged with the engaging portions 915 and 365 in the coupled state.

The body seating portion 43 may include an upper surface portion 431 forming an upper surface. The upper surface portion 431 may be in contact with the lower surface portion 361 of the module seating portion 36 in the coupled state. The upper surface portion 431 faces an upper side. The upper surface portion 431 may be formed horizontally. The upper surface portion 431 may be disposed at an upper side of the peripheral portion 433.

The body seating portion 43 may include a peripheral portion 433 disposed along a circumference of the upper surface portion 431. The peripheral portion 433 may be in contact with the peripheral counterpart portion 363 of the module seating portion 36 in the coupled state. The peripheral portion 433 may form an inclined surface connecting an upper surface of the module housing 42 and the upper surface portion 431. The peripheral portion 433 may be inclined such that a height increases as it goes from the upper surface of the module housing 42 toward the upper surface portion 431. The peripheral portion 43 may be disposed to surround the upper surface portion 431.

The body seating portion 43 may include an engaging counterpart surface 433a being in contact with the engaging surface 363a in the coupled state. The pair of body seating portions 43 may include a pair of engaging counterpart surfaces 433a. The pair of engaging counterpart surfaces 433a may be disposed to face each other at an angle in a left-right direction. The pair of engaging counterpart surfaces 433a may be formed between the pair of body seating portions 43. At the peripheral portions 433 of one of the body seating portions 43, the engaging counterpart surface 433a may be disposed at an area close to another adjacent body seating portion 43. The engaging counterpart surface 433a may be disposed at a region relatively close to the central longitudinal axis Po among the peripheral portion 433. The engaging counterpart surface 433a may constitute a part of the peripheral portion 433.

The body seating portion 43 may be provided with a driving hole 434 through which at least a portion of the driven joint 415 is exposed. The driving hole 434 may be formed at the upper surface portion 431. In the coupled state, the driving joint 65 may be inserted into the driving hole 434 and connected to the driven joint 415.

The engaging counterpart portions 435 and 436 may be holes or grooves formed at a surface of the body seating portion 43. The engaging counterpart portions 435 and 436 may be disposed at the peripheral portion 433. A plurality of engaging counterpart portions 435 and 436 corresponding to the plurality of engaging portions 915 and 365 may be provided.

The engaging counterpart portions 435 and 436 may include a first engaging counterpart portion 435 where a first engaging portion 915 is engaged. The first engaging counterpart portion 435 may be formed at the engaging counterpart surface 433a.

The engaging counterpart portions 435 and 436 may include a second engaging counterpart portion 436 where a second engaging portion 365 is engaged. The second engaging counterpart portion 436 may be formed at the peripheral portion 433.

Figure 24:
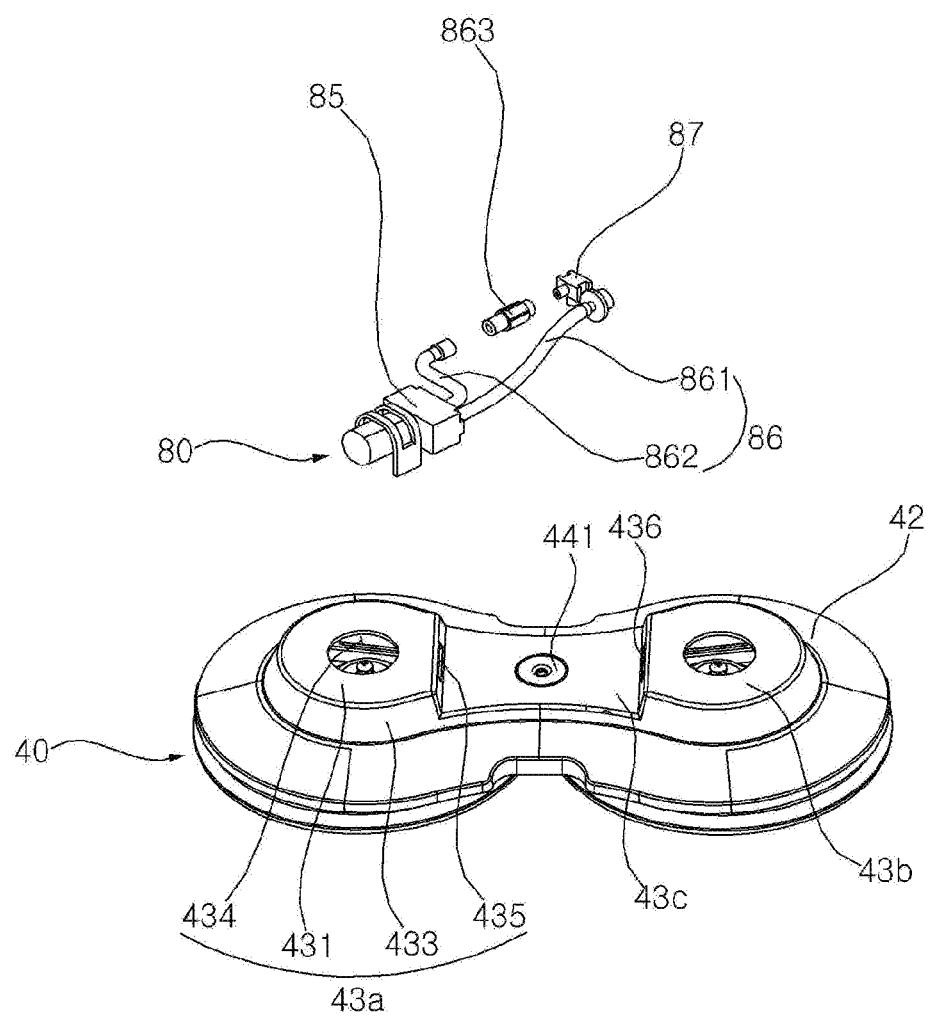
FIG. 24 is a perspective view of a water supply module and a mop module.

Referring to FIG. 22 and FIG. 24, the water supply module 80 may supply water required for the mop module 40 or the sweep module 2000. In the present embodiment, the water supply module 80 supplies water to the mop module 40. The water supply module 80 may supply water to a pair of spin mops 41a and 41b.

The water supply module 80 may include a water tank 81 that stores water supplied to the mop module 40 or the sweep module 2000. In the present embodiment, the water tank 81 stores water supplied to the mop module 40. The mop module 40 is provided to perform wet mopping (mopping while supplying water).

The water supply module 80 supplies water to the mop module 40. The water supply module 80 supplies water to the mop module 40. The water supply module 80 supplies water to a water distribution module 44. The water supply module 80 may be installed on the body 30.

The water supply module 80 may include a water tank 81 for storing water. A part of the water tank 81 may be disposed at an inside of the body 30. The water tank 81 may be disposed at a rear side of the body 30.

The water tank 81 may be provided to be drawn out at an outside of the body 30. The water tank 81 may be provided to be drawn out to a rear side of the body 30. In the state in which the water tank 81 is seated or settled inside the body 30, a water-tank engaging portion 84 that engages the water tank 81 to the body 30 is provided.

The water supply module 80 may include a water-tank cap 814 for opening and closing the water tank 81. The water-tank cap 814 may be disposed at an upper surface of the water tank 81. In a state that the water tank 81 is drawn out from the body 30, a user may open the water-tank cap 814 and fill water in the water tank 81.

The water supply module 80 may include a pump 85 that pressurizes the water W in the water tank 81 to move the water W to the mop module 40. The pump 85 may be disposed at an inside of the body 30. The pump 85 may be disposed at the central longitudinal axis Po.

Although it is not shown, in another embodiment, the water supply module 80 may include a valve. In this instance, when the valve is open without a pump, water in the water tank 81 may move to the mop module 40 by gravity of the water.

Although it is not shown, in yet another embodiment, the water supply module 80 may include a water-permeable stopper. The water-permeable stopper may be disposed in a supply pipe. The water can move through the water-permeable stopper, but a movement speed of the water may be decreased by the water-permeable stopper.

Hereinafter, an embodiment including a pump 85 will be described as an example, but the present disclosure is not necessarily limited thereto.

The water supply module 80 includes a body coupler (a water-tank connection portion) 89 that connects the water tank 81 and a supply pipe 86 when the water tank 81 is seated in the body 30. Water W in the water tank 81 may flow into an inside of the supply pipe 86 through the body coupler 89.

The water supply module 80 may include a supply pipe 86 that guides a movement of the water W from the water tank 81 to the mop module 40. The supply pipe 86 connects the water tank 81 and the water-supply connection portions 87 to guide the movement of water.

The supply pipe 86 may include a first supply pipe 861 that guides the movement of the water W from the water tank 81 to the pump 85, and a second supply pipe 862 that guides the movement of the water W from the pump 85 to the pop module 40. One end of the first supply pipe 861 may be connected to the body coupler 89 and the other end of the first supply pipe 86 may be connected to the pump 85. One end of the second supply pipe 862 may be connected to the pump 85 and the other end of the second supply pipe 862 may be connected to the water-supply connection portion 87.

In addition, the water supply module 80 may further include a check valve 863 to prevent residual water leakage of the water-supply connection portion 87. The check valve 863 may be installed on the second supply pipe 862 adjacent to the water-supply connection portion 87.

The water supply module 80 may include a water-supply connection portion 87 that guides the water in the water tank 81 to the mop module 40. The water W may move from the body 30 to the mop module 40 through the water supply connection 87. The water-supply connection portion 87 may be disposed at a lower side of the body 30. The water-supply connection portion 87 may be disposed at the module seating portion 36. The water-supply connection portions 87 may be disposed on the lower surface of the module seating portion 36. The water-supply connection portions 87 may be disposed at the lower surface portion 361 of the module seating portion 36.

One water-supply connection portion 87 may be provided to facilitate coupling and facilitate sealing while supplying water to the pair of spin mops 41a and 41b. Specifically, the water-supply connection portion 87 may be disposed between a rotational axis of the left spin mop 41a and 41b and a rotational axis of the right spin mop 41b. More preferably, the water-supply connection portions 87 may be disposed at a center between the rotational axis of the left spin mop 41a and the rotational axis of the right spin mop 41b. Further preferably, the water-supply connection portion 87 may be disposed at the central longitudinal axis Po.

When the water-supply connection portion 87 may be disposed at a center between the two spin mops 41a and 41b, the water-supply connection portion 87 may facilitate sealing and coupling, and may equally apply the water to the two mops.

The water-supply connection portion 87 may protrude from an outer surface of the body 30. Specifically, the water-supply connection portions 87 may protrude from the module seating portion 36. The water-supply connection portion 87 may have a tube shape protruding in a down side from the module seating portion 36.

The water-supply connection portion 87 is engaged with a water-supply counterpart portion 441 of the mop module 40 to be described later. The water-supply connection portion 87 may form a hole that communicates with the supply pipe 86 and penetrate the module seating portion 36 in an up-down direction, and the water in the body 30 may move to the mop module 40 through the hole of the water-supply connection portion 87. The water in the body 30 may move to the mop module 40 through the water-supply connection portion 87 and the water-supply counterpart portion 441.

A flow direction of water is as follows. The pump 85 may be driven to cause movement of the water W. The water W in the water tank 81 may flow into the water-supply connection portion 87 through the supply pipe 86. The water W in the water tank 81 may move through the first supply pipe 861 and the second supply pipe 862 sequentially. The water W in the water tank 81 may flow into the water-supply counterpart portion 441 of the mop module 40 through the supply pipe 86 and the water-supply connection portion 87 sequentially. The water flowing into the water-supply counterpart portion 441 may flow into the two water containers 413 through two water distribution pipes, and the water flowing into the water container 413 may flow into a central portion of a mop portion 411 by passing through the water supply hole 412a. The water flowing into the central portion of the mop portion 411 may move to an edge of the mop portion 411 by centrifugal force according to a rotation of the mop portion 411.

Referring to FIG. 22 to FIG. 26, each component or element of the mop module 40 and a relationship between the mop module 40 and the body 30 will be described in detail as follows.

The mop module 40 may be provided to perform wet mopping using water in the water tank 81. The pair of spin mops 41a and 41b may be provided to perform wet moping by rotating in a state that the pair of spin mops 41a and 41b is in contact with the floor.

Referring to FIG. 22 to FIG. 24, the mop module 40 may include a pair of spin mops 41a and 41b which are symmetrical to each other with respect to the central longitudinal axis Po. Hereinafter, the description of each component or element of the spin mops 41a and 41b or spin mops 41 may be understood as a description related to each of the pair of spin mops 41a and 41b.

The spin mops 41a and 41b may include a rotating plate 412 provided to rotate at a lower side of the body 30. The rotating plate 412 may be formed of a member having a shape of a circular plate. A mop portion 411 may be fixed to a lower surface of the rotating plate 412. The rotating plate 412 rotates the mop portion 411. The spin shaft 414 may be fixed to a center of the rotating plate 412.

The rotating plate 412 may include a mop fixing portion (not shown) for fixing the mop portion 411. The mop fixing portion may detachably fix the mop portion 411. The mop fixing portion may be a velcro or the like disposed at a lower side of the rotating plate 412. The mop fixing portion may be a hook or the like disposed at an edge of the rotating plate 412.

A water supply hole 412*a* penetrating the rotating plate 412 in an up-down direction may be formed. The water supply hole 412*a* may connect a water supply space Sw and a lower side of the rotating plate 412. Water in the water supply space Sw may move to a lower side of the rotating plate 412 through the water supply hole 412*a*. The water in the water supply space Sw may move to the mop portion 411 through the water supply hole 412*a*. The water supply hole 412*a* may be disposed at a center portion of the rotating plate 412. The water supply hole 412*a* may be disposed at a position where the spin shaft 414 is not formed.

The rotating plate 412 may be provided with a plurality of water supply holes 412*a*. A connection portion 412*b* may be disposed between the plurality of water supply holes 412*a*. The connection portion 412*b* may connect a centrifugal-direction XO portion and an opposite centrifugal-direction XI portion based on the water supply hole 412*a*. Here, the centrifugal-direction XO may mean a direction away from the spin shaft 414, and the opposite centrifugal-direction XI may mean a direction that approaches the spin shaft 414.

A plurality of water supply holes 412*a* may be spaced apart from each other along a circumferential direction of the spin shaft 414. The plurality of water supply holes 412*a* may be arranged to be spaced apart from each other at regular intervals. A plurality of connection portions 412*b* may be spaced apart from each other along the circumferential direction of the spin shaft 414. The water supply hole 412*a* may be disposed between the plurality of connection portions 412*b*.

The rotating plate 412 may include an inclined portion 412*d* disposed at a lower end of the spin shaft 414. The water in the water supply space Sw may flow down along the inclined portion 412*d* by gravity. The inclined portion 412*d* may be formed along a circumference of a lower end of the spin shaft 414. The inclined portion 412*d* may form a downward inclination in the opposite centrifugal-direction XI. The inclined portion 412*d* may form a lower surface of the water supply hole 412*a*.

The spin mops 41*a* and 41*b* may include a mop portion 411 that is coupled to a lower side of the rotating plate 412 to be in contact with the floor, respectively. The mop portion 411 may be fixed to the rotating plate 412 or may be disposed to be replaceable. The mop portion 411 may be fixed to the rotating plate 412 to be detachable by a Velcro or hook. The mop portion 411 may be formed only of a mop, or may include a mop and a spacer (not shown). The mop is a part that mop a floor while being in direct contact with the floor. The spacer may be disposed between the rotating plate 412 and the mop to adjust a position of the mop. The spacer may be detachably fixed to the rotating plate 412, and the mop may be detachably fixed to the spacer. As another example, a mop may directly detachable to the rotating plate 412 without a spacer.

The spin mop 41*a* and 41*b* may include a spin shaft 414 that rotates the rotating plate 412. The spin shaft 414 is fixed to the rotating plate 412 and transmits rotational force of the mop driving unit 60 to the rotating plate 412. The spin shaft 414 may be connected to an upper side of the rotating plate 412. The spin shaft 414 may be disposed at an upper center of the rotating plate 412. The spin shaft 414 may be fixed to the rotation center Osa or Osb of the rotating plate 412. The spin shaft 414 may include a joint fixing portion 414*a* for fixing the driven joint 415. The joint fixing portion 414*a* may be disposed at an upper end of the spin shaft 414.

The spin shaft 414 may extend to be perpendicular to the rotating plate 412. A left spin shaft 414 may be disposed to be perpendicular to a lower surface of the left spin mop 41*a* and a right spin shaft 414 may be disposed to be perpendicular to a lower surface of the right spin mop 41*b*. In an embodiment in which a lower surface of the spin mop 41*a* or 41*b* has an inclination with respect to a horizontal plane, the spin shaft 414 may be inclined with respect to an axis in an up-down direction. An upper end of the spin shaft 414 may be inclined to one side with respect to a lower end of the spin shaft 414.

An inclination angle between the axis of the spin shaft 414 in the up-down direction may be changed according to a rotation of a tilting frame 47 around a tilting shaft 48. The spin shaft 414 may be rotatably coupled to the tilting frame 47 and may be provided to be able to tilt integrally with the tilting frame 47. When the tilting frame 47 is tilted, the spin shaft 414, the rotating plate 412, the water container 413, the driven joint 415, and the mop portion 411 may be inclined integrally with the tilting frame 47.

The mop module 40 may include a water container 413 for accommodating water at an upper side of the rotating plate 412. The water container 413 may form a water supply space Sw in which water is accommodated. The water container 413 may surround a circumference of the spin shaft 414 and be spaced apart from the spin shaft 414 to form a water supply space Sw. The water container 413 allows water supplied to an upper side of the rotating plate 412 to be collected in the water supply space Sw before passing through the water supply hole 412*a*. The water supply space Sw may be disposed at an upper center portion of the rotating plate 412. The water supply space Sw may have a volume having a cylindrical shape as a whole. An upper side of the water supply space Sw may be opened. Water may be introduced into the water supply space Sw through the upper side of the water supply space Sw.

The water container 413 may protrude to an upper side of the rotating plate 412. The water container 413 may extend along a circumferential direction of the spin shaft 414. The water container 413 may have a shape of a ring-shaped rib. The water supply hole 412*a* is disposed at an inner lower surface of the water container 413. The water container 413 may be spaced apart from the spin shaft 414.

A lower end of the water container 413 may be fixed to the rotating plate 412. An upper end of the water container 413 may have a free end.

Referring to FIG. 23, a driving joint 65 and a driven joint 415 will be described in detail as follows. The mop driving unit 60 may include a driving joint 65 that rotates by the mop motor 61, and a driven joint 415 that rotate while being engaged with the driving joint 65 in the coupled state. The driving joint 65 may be exposed to an outside of the body 30. At least a portion of the driven joint 415 may be exposed to the outside of the mop module 40.

In the separation state, the driving joint 65 and the driven joint 415 are separated from each other. In the coupled state, the driving joint 65 and the driven joint 415 are engaged with each other.

Among the driving joint 65 and the driven joint 415, one may include a plurality of driving protrusions 65*a* disposed in a circumferential direction around its rotation axis, and the other may include a plurality of driving grooves 415*h* disposed in a circumferential direction around its rotation axis.

The driving protrusions 65*a* may be spaced apart from each other at regular intervals. The plurality of driving grooves 415*h* may be spaced apart from each other at regular intervals. In the coupled state, the driving protrusion 65*a* is inserted into the driving groove 415*h*. In the separation state, the driving protrusion 65*a* is separated from the driving groove 415*h*.

A number of the plurality of driving grooves 415*h* may be greater of a number of the plurality of driving protrusions 65*a*. The number of the plurality of driving protrusions 65*a* may be n, and the number of the plurality of driving grooves 415*h* may be n*m (a value of a multiply n by m). In this instance, n is a natural number of 2 or more, and m is a natural number of 2 or more. In the present embodiment, four drive protrusions 65*a*1, 65*a*2, 65*a*3, and 65*a*4 spaced apart from each other at regular intervals may be provided, and eight driving grooves 415*h*1, 415*h*2, 415*h*3, 415*h*4, 415*h*5, 415*h*6, 415*h*7, and 415*h*8 spaced apart from each other at regular intervals may be provided.

Among the driving joint 65 and the driven joint 415, one may include a plurality of driving protrusions 65*a* disposed in a circumferential direction around its rotation axis, and the other may include a plurality of opposing protrusions 415*a* disposed in a circumferential direction around its rotation axis. The plurality of opposing protrusions 415*a* may protrude in one direction.

The plurality of opposing protrusions 415*a* may be spaced apart from each other at regular intervals. In the coupled state, any one driving protrusion 65*a* is provided to be disposed between two adjacent opposing protrusions 415*a*. In the separation state, the driving protrusion 65*a* is separated from between two adjacent opposing protrusions 415*a*. In the coupled state, at least one opposing protrusion 415*a* is provided to be disposed between two adjacent driving protrusions 65*a*. In the present embodiment, in the coupled state, two opposing protrusions 415*a* are provided to be disposed between two adjacent driving protrusions 65*a*.

A protruding end of the opposing protrusion 415*a* may be rounded. The protruding end of the opposing protrusion 415*a* may be rounded according to an arrangement direction of the plurality of opposing protrusions 415*a*. The protruding end of the opposing protrusion 415*a* may be a rounded corner portion rounded to a direction of the adjacent opposing protrusion 415*a* with respect to a central axis of the protruding direction. Through this, when the separation state is changed to the coupled state, the driving protrusion 65*a* may move smoothly and be inserted into the driving groove 415*h* along the rounded protruding end of the opposing protrusion 415*a*.

A number of the plurality of opposing protrusions 415*a* may be greater than a number of the plurality of driving protrusions 65*a*. The number of the plurality of driving protrusions 65*a* may be n, and the number of the plurality of opposing protrusions 415*a* may be n*m (a value of a multiply n by m). In this instance, n is a natural number of 2 or more, and m is a natural number of 2 or more. In the present embodiment, four drive protrusions 65*a*1, 65*a*2, 65*a*3, and 65*a*4 spaced apart from each other at regular intervals may be provided, and eight opposing protrusions 415*a* spaced apart from each other at regular intervals may be provided.

In the present embodiment, the driving joint 65 includes a driving protrusion 65*a*, and the driven joint 415 includes a driving groove 415*h*. In the present embodiment, the driven joint 415 includes opposing protrusions 415*a*. Hereinafter, the present embodiment will be described.

The driving joint 65 may be fixed to a lower end of a main shaft 624. The driving joint 65 may include a driving-protrusion axis 65*b* fixed to the main shaft 624. The driving-protrusion axis 65*b* may have a cylindrical shape. The driving protrusion 65*a* may protrude from the driving-protrusion axis 65*b*. The driving protrusion 65*a* may protrude in a direction away from a rotational axis of the driving joint 65. A plurality of driving protrusions 65*a* are spaced apart from each other along a circumferential direction of the driving-protrusion axis 65*b*. The driving protrusion 65*a* may have a cross-section of a circular shape and protrude in a direction away from the rotation axis of the driving joint 65.

The driven joint 415 may be fixed to an upper end of the spin shaft 414. The driven joint 415 may include a driven axis portion 415*b* fixed to the spin shaft. The driven axis portion 415*b* may have a cylindrical shape. The driving groove 415*h* may be formed at a front side of a peripheral portion of the driven axis portion 415*b*. The driving groove 415*h* may be recessed in an up-down direction. A plurality of driving grooves 415*h* are spaced apart from each other along a circumference of the driven axis portion 415*b*. The driven joint 415 may including an opposing protrusion 415*a* protruding from the driven axis portion 415*b*. The opposing protrusion 415*a* may protrude from the driven axis portion 415*b* in a direction toward the driving joint 65 among the up-down direction. In the present embodiment, the opposing protrusion 415*a* may protrude to an upper side. The opposing protrusion 415*a* may have a protruding end at an upper side. The opposing protrusion 415*a* may have a rounded protruding end. When a surface of the driving protrusion 65*a* is in contact with the rounded protruding end of the opposing protrusion 415*a*, in a process of changing the separation state to the coupled state, the driving protrusion 65*a* may naturally or smoothly slid and be inserted into the driving groove 415*h*. The opposing protrusion 415*a* may be disposed at a front portion of the driven axis portion 415*b*. A plurality of opposing protrusions 415*a* and a plurality of driving grooves 415*h* may be alternately arranged along a circumference of the driven axis portion 415*b*.

In the coupled state, when suspension units 47, 48, and 49, which will be described later, move within a predetermined range, the driving protrusions 65*a* and the driving grooves 415*h* may be movable with each other, but are engaged with each other to transmit rotational force. Specifically, a depth of the driving groove 415*h* in an up-down direction may be greater than a width of the driving protrusion 65*a* in an up-down direction. Then, even if there is a movement of the driving protrusion 65*a* with respect to the driving groove 415*h* in the up-down direction in a predetermined range, the rotational force of the driving joint 65 may be transmitted to the driven joint 415.

The module housing 42 may connect a pair of spin mops 41*a* and 41*b*. By the module housing 42, a pair of spin mops 41*a* and 41*b* may be separated from the body 30 together and be coupled to the body 30 together. The body seating portion 43 may be disposed at an upper side of the module housing 42. The spin mops 41*a* and 41*b* may be rotatably supported by the module housing 42. The spin mops 41*a* and 41*b* may be disposed by penetrating through the module housing 42.

The module housing 42 may include an upper cover 423 forming an upper portion and a lower cover 421 forming a lower portion. The upper cover 423 and the lower cover 421 may be coupled to each other. The upper cover 423 and the lower cover 421 may form an inner space accommodating a part of the spin mops 41*a* and 41*b*.

The suspension units 47, 48, and 49 may be disposed in the module housing 42. The suspension units 47, 48, and 49 may be disposed in an inner space formed by the upper cover 423 and the lower cover 421. The suspension units 47, 48, 49 may support the spin shaft 414 to be movable up and down within a predetermined range. The suspension units 47, 48, 49 according to the present embodiment may include a tilting frame 47, a tilting shaft 48, and an elastic member 49.

The module housing 42 may include a limit that limits a rotation range of the tilting frame 47.

The limit may include a lower limit 427 that limits a rotation range of the tilting frame 47 in a down direction. The lower limit 427 may be disposed at the module housing 42. The lower limit 427 may be provided to be in contact with a lower-limit contacting portion 477 in a state in which the tilting frame 47 is rotated as far as possible to a down side. In a state in which the mobile robot 1 is normally disposed at an external horizontal surface, the lower-limit contacting portion 477 is spaced apart from the lower limit 427. In a state in which there is no force pushing from a lower side to an upper side of the spin mops 41*a* and 41*b*, the tilting frame 47 rotates to have a maximum angle, and the lower-limit contacting portion 477 and the lower limit 427 may become in contact with each other and an inclination angle become the largest.

The limit may include an upper limit (not shown) that limits a rotation range of the tilting frame 47 in an upper direction. In the present embodiment, a rotation range of the tilting frame 47 to an upper side may be limited by a close contact between the driving joint 65 and the driven joint 415. In a state in which the mobile robot 1 is normally disposed at an external horizontal surface, the driven joint 415 may be in close contact with the driving joint 65 to the maximum, and an inclination angle may become the smallest.

The module housing 42 may include a second support portion 425 that fixes an end of the elastic member 49. When the tilting frame 47 rotates, the elastic member 49 may be elastically deformed or restored by a first support portion 475 fixed to the tilting frame 47 and the second support portion 425 fixed to the module housing 42.

The module housing 42 may include a tilting-shaft support portion 426 that supports the tilting shaft 48. The tilting-shaft support portion 426 may support both ends of the tilting shaft 48.

The tilting frame 47 may be connected to the module housing 42 through the tilting shaft 48. The tilting frame 47 may support the spin shaft 414 to be rotatable.

The tilting frame 47 may be rotatable within a predetermined range around a tilting rotation axis Ota or Otb. The tilting rotation axes Ota and Otb may extend in a direction transverse to the rotation axes Osa and Osb of the spin shaft 414. The tilting shaft 48 may be disposed at the tilting rotation axes Ota and Otb. The tilting frame 47 at a left side may be provided to be rotatable within a predetermined range around the tilting rotation axis Ota. The tilting frame 47 at a right side may be provided to be rotatable within a predetermined range around the tilting rotation axis Otb.

The tilting frame 47 may be disposed to be tiltable within a predetermined angular range with respect to the mop module 40. An inclination angle of the tilting frame 47 may be changed according to a condition of a floor. The tilting frame 47 may function as a suspension (supporting weight and reducing vibration in an up-down direction at the same time) of the spin mops 41*a* and 41*b*.

The tilting frame 47 may include a frame base 471 forming a lower surface. The spin shaft 414 may penetrates a frame base 471 in an up-down direction. The frame base 471 may have a plate shape having a thickness in the up-down direction. The tilting shaft 48 may rotatably connect the module housing 42 and the frame base 471.

A bearing Ba may be provided between the rotation-axis support 473 and the spin shaft 414. The bearing Ba may include a first bearing B1 disposed at a lower side and a second bearing B2 disposed at an upper side.

A lower end of the rotation-axis support portion 473 may be inserted into the water supply space Sw of the water container 413. An inner circumferential surface of the rotation-axis support portion 473 may support the spin shaft 414.

The tilting frame 47 may include a first support portion 475 for supporting one end of the elastic member 49. The other end of the elastic member 49 may be supported by a second support portion 425 disposed in the module housing 42. When the tilting frame 47 is tilted around the tilting shaft 48, a position of the first support portion 475 is changed and a length of the elastic member 49 is changed.

The first support portion 475 may be fixed to the tilting frame 47. The first support portion 475 is disposed at a left side of the left tilting frame 47. The first support portion 475 may be disposed at a right side of the right tilting frame 47. The second support portion 425 may be disposed at a left region of the left spin mop 41*a*. The second support portion 425 may be disposed at a right region of the right spin mop 41*b*.

The first support portion 475 may be fixed to the tilting frame 47. The first support portion 475 may be tilted together with the tilting frame 47 during a tilting operation of the tilting frame 47. A distance between the first support portion 475 and the second support portion 425 may be closest when an inclination angle is minimized, and a distance between the first support portion 475 and the second support portion 425 may be farthest away when an inclination angle is maximized. The elastic member 49 may elastically deformed to provide a restoring force in a state where the inclination angle is minimized.

The tilting frame 47 may include a lower-limit contacting portion 477 provided to be in contact with the lower limit 427. A lower side of the lower-limit contacting portion 477 may be in contact with an upper side of the lower limit 427.

The tilting shaft 48 may be disposed at the module housing 42. The tilting shaft 48 may be a rotation axis of the tilting frame 47. The tilting shaft 48 may extend in a direction perpendicular to an inclined direction of the spin mops 41*a* and 41*b*. The tilting shaft 48 may extend in a horizontal direction. In the present embodiment, the tilting shaft 48 may extend in an inclined direction to having an acute angle with the front-rear direction.

The elastic member 49 may apply elastic force to the tilting frame 47. The elastic force is applied to the tilting frame 47 so that an inclination angle of a lower surface of the spin mops 41*a* and 41*b* with respect to a horizontal surface increases.

The elastic member 49 may be elongated when the tilting frame 47 rotates to a lower side and be shortened when the tilting frame 47 rotates to an upper side. The elastic member 49 allows the tilting frame 47 to operate to absorb shock (elastically). The elastic member 49 may apply moment force to the tilting frame 47 in a direction in which an inclination angle is increased.

The pair of spin mops 41*a* and 41*b* are connected to each other to form a set. When the coupled state is changed to the separation state, the pair of spin mops 41*a* and 41*b* connected by the mop module 40 are integrally separated from the body 30. In addition, when the separation state is changed to the coupled state, the pair of spin mops 41*a* and 41*b* connected by the mop module 40 are integrally coupled to the body 30.

The mop module 40 is detachably coupled to the body 30. The mop module 40 is coupled to a lower side of the body 30. The body 30 is coupled to an upper side of the mop module 40. The body 30 includes the module seating portion 36, and the mop module 40 includes the body seating portion 43. The body seating portion 43 is detachably coupled to the module seating portion 36.

The module seating portion 36 is provided at a lower side of the body 30. The body seating portion 43 is provided at an upper side of the mop module 40. The module seating portion 36 is disposed at a lower side of the base 32. The body seating portion 43 is disposed at an upper side of the module housing 42.

Among the module seating portion 36 and the body seating portion 43, one may protrude in an up-down direction and the other may be recessed in the up-down direction to be engaged with the one.

In the present embodiment, the body seating portion 43 protrudes to an upper side from the mop module 40. The module seating portion 36 is recessed to an upper side to be engaged with the body seating portion 43 in the body 30.

When viewed from an upper side, a shape of the body seating portion 43 may be asymmetrical in a front-rear direction. Through this, when the mop module 40 is coupled to the body 30 in an inverted direction in the front-rear direction, the body seating portion 43 is not engaged with the module seating portion 36. Accordingly, the mop module 40 and the body 30 may be coupled to each other in a predetermined direction.

When viewed from an upper side, the body seating portion 43 may have a shape as a whole that a length in a front-rear direction increase as it goes away from the central longitudinal axis Po. When viewed from the upper side, the body seating portion 43 may have generally an inclined shape such that a portion relatively away from the central longitudinal axis Po is closer to a front side.

The mop module 40 includes a pair of body seating portions 43a and 43b spaced apart from each other. The pair of body seating portions 43a and 43b correspond to the pair of spin mops 41a and 41b. The pair of body seating portions 43a and 43b correspond to the pair of module seating portions 36a and 36b.

The body 30 includes a pair of module seating portions 36a and 36b that are spaced apart from each other. The pair of module seating portions 36a and 36b correspond to the pair of body seating portions 43a and 43b.

The pair of body seating portions 43a and 43b protrude to an upper side of the mop module 40. The pair of module seating portions 36a and 36b are recessed to an upper side to be engaged with the pair of body seating portions 43a and 43b.

The pair of body seating portions 43a and 43b are spaced from each other in a left-right direction. The pair of module seating portions 36a and 36b are spaced from each other in a left-right direction. The pair of body seating portions 43a and 43b may be bisymmetrical with respect to the central longitudinal axis Po. The pair of module seating portions 36a and 36b may be bi symmetrical with respect to the central longitudinal axis Po. Hereinafter, the description of the body seating portion 43 may be understood as a description of each of the pair of body seating portions 43a and 43b, and the description of the module seating portion 36 may be understood as a description of each of the pair of module seating portions 36a and 36b.

The module seating portion 36 includes a lower surface portion 361 forming a lower surface. The lower surface portion 361 may be in contact with an upper surface portion 431 of the body seating portion 43 in the coupled state. The lower surface portion 361 faces a lower side. The lower surface portion 361 may be formed horizontally. The lower surface portion 361 may be disposed at an upper side of a peripheral counterpart portion 363.

The module seating portion 36 includes a peripheral counterpart portion 363 disposed along a circumference of the lower surface portion 361. The peripheral counterpart portion 363 may be in contact with a peripheral portion 433 of the body seating portion 43 in the coupled state. The peripheral counterpart portion 363 may form an inclined surface connecting a lower surface of the base 32 and the lower surface portion 361. The peripheral counterpart portion 363 may be inclined such that a height increases as it goes from the lower surface of the base 32 toward the lower surface portion 361. The peripheral counterpart portion 363 may be disposed to surround the lower surface portion 361.

The pair of module seating portions 36 may include a pair of engaging surfaces 363a inserted between the pair of body seating portions 43. At the peripheral counterpart portion 363 of one of the module seating portions 36, the engaging surface 363a may be disposed at an area close to another adjacent module seating portion 36. The engaging surface 363a may be disposed at a region relatively close to the central longitudinal axis Po among the peripheral counterpart portion 363. The engaging surface 363a may constitute a part of the peripheral counterpart portion 363.

The module seating portion 36 may form a joint hole 364 to which at least a portion of a driving joint 65 is exposed. The joint hole 364 may be formed at the lower surface portion 361. The driving joint 65 may be disposed to penetrate through the joint hole 364.

Among the module seating portion 36 and the body seating portion 43, a surface of one may be provided with engaging portions 911, and a surface of the other may be provided with engaging counterpart portions 435 and 436 that are recessed to be engaged with the engaging portions 911 in the coupled state. In the present embodiment, the engaging portion 911 may be provided at a surface of the module seating portion 36, and the engaging counterpart portions 435 and 436 may be provided at a surface of the body seating portion 43.

The engaging portion 911 may have a hook shape. The engaging portion 911 may be disposed at the peripheral counterpart portion 363. A lower surface of a protruding end portion of the engaging portion 911 may have an inclination that approaches an upper side toward a distal end. A plurality of engaging portions 911 may be provided in one module seating portion 36.

The body seating portion 43 may include an upper surface portion 431 forming an upper surface. The upper surface portion 431 may be in contact with the lower surface portion 361 of the module seating portion 36 in the coupled state. The upper surface portion 431 faces an upper side. The upper surface portion 431 may be formed horizontally. The upper surface portion 431 may be disposed at an upper side of the peripheral portion 433.

The body seating portion 43 may include a peripheral portion 433 disposed along a circumference of an upper surface portion 431. The peripheral portion 433 may be in contact with the peripheral counterpart portion 363 of the module seating portion 36 in the coupled state. The peripheral portion 433 may form an inclined surface connecting an upper surface of the module housing 42 and the upper surface portion 431. The peripheral counterpart portion 363 may be inclined such that a height increases as it goes from the upper surface of the module housing 42 toward the upper surface portion 431. The peripheral portion 43 may be disposed to surround the upper surface portion 431.

The body seating portion 43 may include an engaging counterpart surface 433a being in contact with the engaging surface 363a in the coupled state. The pair of body seating portions 43 may include a pair of engaging counterpart surfaces 433a. The pair of engaging counterpart surfaces 433a may be disposed to face each other at an angle in a left-right direction. The pair of engaging counterpart surfaces 433a may be positioned between the pair of body seating portions 43. At the peripheral portions 433 of one of the body seating portions 43, the engaging counterpart surface 433a may be disposed at an area close to another adjacent body seating portion 43. The engaging counterpart surface 433a may be disposed at a region relatively close to a central longitudinal axis Po among the peripheral portion 433. The engaging counterpart surface 433a may constitute a part of the peripheral portion 433.

The body seating portion 43 may be provided with a driving hole 434 through which at least a portion of the driven joint 415 is exposed. The driving hole 434 may be formed at the upper surface portion 431. In the coupled state, the driving joint 65 may be inserted into the driving hole 434 and connected to the driven joint 415.

The engaging counterpart portions 435 and 436 may be holes or grooves formed at a surface of the body seating portion 43. The engaging counterpart portions 435 and 436 may be disposed at the peripheral portion 433. A plurality of engaging counterpart portions 435 and 436 corresponding to the plurality of engaging portions 911 may be provided.

The body seating portion may include a left body seating portion 43a, a right body seating portion 43b, and a central seating portion 43c. A left driving hole 434 is formed at the left body seating portion 43a, and a right driving hole 434 is formed at the right body seating portion 43b. The left body seating portion 43a may be spaced apart from the right body seating portion 43b. The central seating portion 43c is positioned between the left body seating portion 43a and the right body seating portion 43b.

An upper surface portion 431 of the left body seating portion 43a, the right body seating portion 43b, and the central seating portion 43c may be positioned at the same height. As another example, an upper surface portion 431 of the central seating portion 43c may be positioned at a lower side of upper surface portions 432 of the left body seating portion 43a and the right body seating portion 43b so that engaging counterpart portions 435 and 436 are arranged to be disposed at a center portion not visible. At the center of the upper surface portion 431 of the central seating portion 43c, a water-supply counterpart 441, which will be described later, may be disposed.

The mop module 40 may include a water distribution module 44 that guides the water introduced from the water-supply connection portion 87 to two spin mops 41a and 41b in a coupled state. The water distribution module 44 guides water from an upper side to a lower side. The water W in the water tank 81 is supplied to the spin mops 41a and 41b via the water distribution module 44. The water W in the water tank 81 flows into the water distribution module 44 through the water-supply connection portion 87. At least a part of the water distribution module may be accommodated inside the module housing 42.

Figure 27:
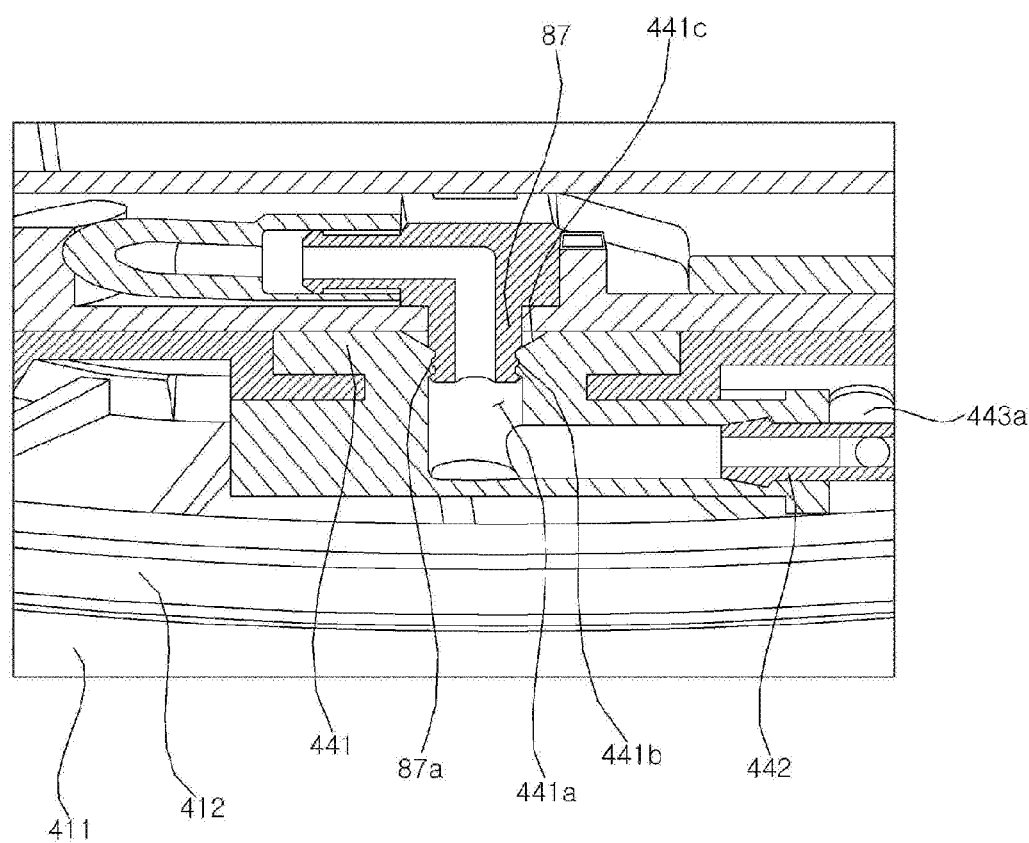
FIG. 27 is a partial cross-sectional view showing a state that a water-supply counterpart portion and a water-supply connection portion are coupled.

In particular, referring to FIG. 27, the water distribution module 44 may include one water-supply counterpart portion 441 that receives water from the water supply module 80, a left water distribution pipe 443a, and a right water distribution pipe 443b. The water-supply counterpart portion 441 may be connected to the water-supply connection portion 87. The water-supply counterpart 441 may have a structure coupled to the water-supply connection portion 87 by fit or tight fit (interference fit).

The water-supply counterpart 441 may be provided with a press-in hole 441a into which one end of the water-supply connection portion 87 is inserted. The water-supply connection portion 87 may be tight-fitted (interference-fitted) or press-fitted into the press-in hole 441a. At an inner surface of the press-in hole 441a, a release preventing groove 441b for preventing the water supply connection portion 87 from being separated may be formed. The press-in hole 441a may extend in an up-down direction. Then, the press-in hole 441a extends in the up-down direction and is coupled when the body 30 and the mop module 40 are coupled to each other.

An upper end of the press-in hole 441a may have an expansion portion 441c having an expanded width of the press-in hole 441a and communicating with the press-in hole 441a. The expansion portion 441c may be a hole whose width is increased in a direction away from the press-in hole 441a. The expansion portion 441c may guide the water-supply connection portion 87 to be easily inserted into the press-in hole 441a.

In the coupled state, the water-supply counterpart portion 441 is formed at a position corresponding to the water-supply connection portion 87. In the coupled state, the water-supply connection portion 87 and the water-supply counterpart portion 441 are engaged with and connected to each other. In the coupled state, the water-supply connection portion 87 is inserted to the water-supply counterpart portion 441 to a down side. In the separation state, the water-supply connection portion 87 and the water-supply counterpart portion 441 are separated from each other.

The water-supply counterpart portion 441 may be disposed at a position corresponding to the water-supply connection portion 87. The water-supply counterpart portion 441 may be disposed at an imaginary central longitudinal axis. The water-supply counterpart portion 441 may be disposed at the body seating portion 43. Specifically, the water-supply counterpart portion 441 may be disposed at a center of the upper surface portion 431 of the central seating portion 43c.

An upper surface of the water-supply counterpart portion 441 may penetrate an upper surface of the module seating portion and be exposed to an outside of the module seating portion. An upper end of the water-supply counterpart portion 441 (an upper end of the expansion portion 441c) may be exposed at the upper surface portion 431 of the body seating portion 43. An upper end of the water-supply counterpart portion 441 (an upper end of the expansion portion 441c) may have a height same as or lower of a height of an upper surface portion 431 of the body seating portion 43.

The water-supply counterpart portion 441 may be a material having elasticity. For example, the water-supply counterpart portion 441 may include a rubber material or a resin material.

As another example, the upper end of the water-supply counterpart portion 441 (the expansion portion 441c) may formed by a recessed portion of a surface of the body seating portion 43 to a lower side.

A left water distribution pipe 443a is connected to the water-supply counterpart portion 441 to supply water from the water-supply counterpart portion 441 to a water supply space Sw of a left rotating plate. One end of the left water distribution pipe 443a is connected to the press-in hole 441a of the water-supply counterpart portion 441, and the other end (an outlet or an exhaust nozzle) 444a of the left water distribution pipe 443a is positioned on or at the water supply space Sw. Water jetted or spouted from the outlet 444a of the left water distribution pipe 443a falls into the water supply space Sw. The outlet 444a of the left water distribution pipe 443a may be positioned to be vertically overlapped with the water supply space Sw of the left rotating plate 412.

A right water distribution pipe 443b is connected to the water-supply counterpart portion 441 to supply water from the water-supply counterpart portion 441 to a water supply space Sw of a right rotating plate. One end of the right water distribution pipe 443b is connected to the press-in hole 441a of the water-supply counterpart portion 441, and the other end (an outlet or an exhaust nozzle) 444b of the right water distribution pipe 443b is positioned on or at the water supply space Sw. Water jetted or spouted from the outlet 444b of the right water distribution pipe 443b falls into the water supply space Sw. The outlet 444b of the right water distribution pipe 443b may be positioned to be vertically overlapped with the water supply space Sw of the right rotating plate 412.

Specifically, the outlet 444a of the left water distribution pipe 443a and the outlet 444b of the right water distribution pipe 443b are respectively coupled to fixing holes 426a and 426b formed at the tilting-shaft support portion 426. The outlet 444a of the left water distribution pipe 443a and the outlet 444b of the right water distribution pipe 443b communicate with a lower portion of the tilting-shaft support portion 426 through fixing holes 426a and 426b, respectively.

The left water distribution pipe 443a and the right water distribution pipe 443b may be directly connected to the water-supply counterpart portion 441, or may be connected to the water-supply counterpart portion 441 through a branch pipe 442. The branch pipe 442 may be a T-shaped pipe connected to the press-in hole 441a, the left water distribution pipe 443a, and the right water distribution pipe 443b.

The left water distribution pipe 443a and the right water distribution pipe 443b may be accommodated in the module housing 42.

In order to supply water equally to the left and right mops, a length of the left water distribution pipe 443a may be the same as a length of the right water distribution pipe 443b. In this instance, the same does not only mean the exact same in a mathematical sense, but also means similarity in a range including an error to some extent. The range of the error may be preferably 0% to 2%.

For a uniform water distribution, an inner diameter of the left water distribution pipe 443a may be the same as an inner diameter of the right water distribution pipe 443b. Preferably, the length of the left water distribution pipe 443a may be the same as the length of the right water distribution pipe 443b, and the inner diameter of the left water distribution pipe 443a may be the same as the inner diameter of the right water distribution pipe 443b.

In addition, the left water distribution pipe 443a and the right water distribution pipe 443b may have a symmetrical arrangement. The left water distribution pipe 443a and the right water distribution pipe 443b may be symmetrical to each other with respect to an imaginary central longitudinal axis. Preferably, an inner diameter of the left water distribution pipe 443a may be the same as an inner diameter of the right water distribution pipe 443b, and the left water distribution pipe 443a and the right water distribution pipe 443b may be symmetrical to each other with respect to the imaginary central longitudinal axis.

When bottoms of the pair of spin mops 41a and 41b provided to be symmetrical to each other with respect to the central longitudinal axis Po are parallel to a horizontal plane, a robot cleaner may not stably drive and a driving control may be difficult. Therefore, according to the present disclosure, each spin mop 41 is inclined downward toward an outside front side. Hereinafter, an inclination and a motion of a spin mop 41 will be described.

Figure 38:
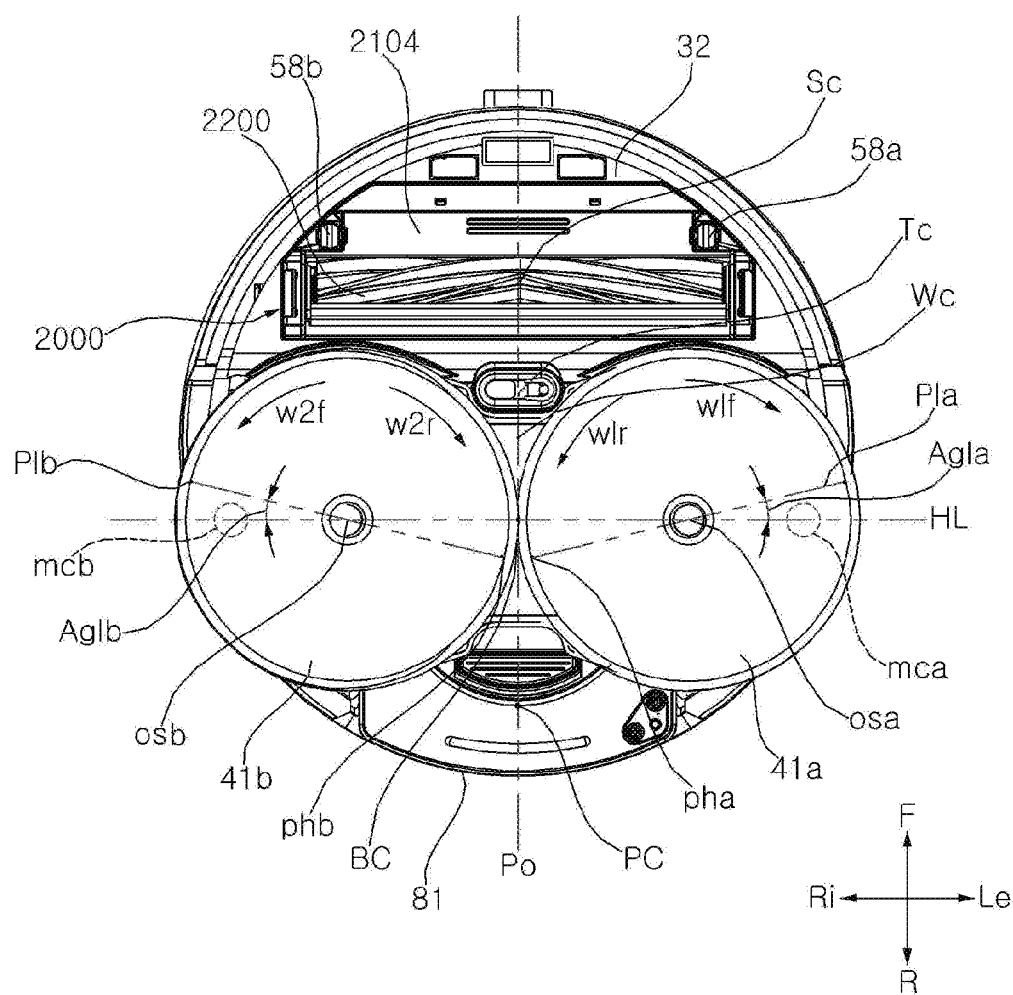
FIG. 38 is a bottom view showing the mobile robot of FIG. 1 for illustrating a center of gravity and lowest ends of spin mops according to the present disclosure.

Referring to FIG. 38, a point where the spin rotation axis Osa of the left spin mop 41a and a lower surface of the left spin mop 41a cross is shown, and a point where the spin rotation axis Osb of the right spin mop 41b and a lower surface of the right spin mop 41b intersect is shown. When viewed from a lower side, among rotational directions of the left spin mop 41a, a clockwise direction is defined as a first normal direction w1f and a counterclockwise direction is defined as a first reverse direction w1r. When viewed from a lower side, among rotational directions of the right spin mop 41b, a clockwise direction is defined as a second normal direction w2f and a counterclockwise direction is defined as a second reverse direction w2r. In addition, when viewed from a lower side, 'an acute angle between an inclined direction of a lower surface of the left spin mop 41a and a left-right direction axis' and 'an acute angle between an inclined direction of a lower surface of the right spin mop 41a and a left-right direction axis' are defined as inclination-direction angles Ag1a and Ag1b, respectively. The inclination-direction angle Ag1a of the left spin mop 41a and the inclination-direction angle Ag1b of the right spin mop 41b may be the same. Further, 'an angle between a lower surface I of the left spin mop 41a and an imaginary horizontal surface H' and 'an angle between a lower surface I of the right spin mop 41b and an imaginary horizontal surface H' are defined as inclination angles Ag2a and Ag2b.

A right end of the left spin mop 41a and a left end of the right spin mop 41b may be in contact with each other or adjacent or close to each other. Therefore, an area where mopping or wiping is not performed between the left spin mop 41a and the right spin mop 41b can be reduced.

When the left spin mop 41a rotates, a point Pla that receives the greatest friction force from a floor or a ground at a lower surface of the left spin mop 41a may be positioned at a left side of a rotation center Osa of the left spin mop 41a. Among the lower surface of the left spin mop 41a, a greater load may be transmitted to the floor or the ground at the point Pla than the other point. Thus, the greatest friction force may be generated at the point Pla. In the present embodiment, the point Pla is disposed at a left front side of the rotation center Osa. In another embodiment, the point Pla may be disposed at an exact left side or at a left rear side based on the rotation center Osa.

When the right spin mop 41b rotates, a point Plb that receives the greatest friction force from a floor or a ground at a lower surface of the right spin mop 41b may be positioned at a right side of a rotation center Osb of the right spin mop 41b. Among the lower surface of the right spin mop 41b, a greater load may be transmitted to the floor or the ground at the point Plb than the other point. Thus, the greatest friction force may be generated at the point Plb. In the present embodiment, the point Plb is disposed at a right front side of the rotation center Osb. In another embodiment, the point Pla may be disposed at an exact right side or at a right rear side based on the rotation center Osb.

The lower surface of the left spin mop 41a and the lower surface of the right spin mop 41b may be inclined, respectively. The inclination angle Ag2a of the left spin mop 41a and the inclination angle Ag2b of the right spin mop 41b may be an acute angle. The inclination angles Ag2a and Ag2b may be small so that points having the greatest friction force are positioned at the points P1a and P1b and entire portions of lower surfaces of the mop portions 411 are in contact with or touch the floor according to rotational motion of the left spin mop 41a and the right spin mop 41b.

The lower surface of the left spin mop 41a forms a downward slope as a whole in a left direction. The lower surface of the right spin mop 41b forms a downward slope as a whole in a right direction. Referring to FIG. 38, the lowest point P1a at the lower surface of the left spin mop 41a is positioned at a left side portion. The highest point Pha at the lower surface of the left spin mop 41a is positioned at a right side portion. The lowest point P1b at the lower surface of the right spin mop 41b is positioned at a right side portion. The highest point Phb at the lower surface of the right spin mop 41b is positioned at a right side portion.

According to the embodiment, an inclination-direction angles Ag1a and Ag1b may be 0 degrees. Further, according to the embodiment, when viewed from a lower side, a lower surface of the left spin mop 41a may be inclined to have an inclined-direction angle Ag1a in a clockwise direction with respect to a left-right direction axis, and a lower surface of the right spin mop 41b may be inclined to have an inclined-direction angle Ag1b in a counterclockwise direction with respect to the left-right direction axis. In the present embodiment, when viewed from a lower side, a lower surface of the left spin mop 41a is inclined to have an inclined-direction angle Ag1a in a counterclockwise direction with respect to the left-right direction axis, and a lower surface of the right spin mop 41b is inclined to have an inclined-direction angle Ag1b in a clockwise direction with respect to the left-right direction axis.

The movement of the cleaner 1 is achieved by friction force with the floor or the ground generated by the mop module 40.

The mop module 40 may generate 'a forward-moving friction force' for moving the body 30 in a front direction, or 'a rearward-moving friction force' for moving the body 30 in a rear direction. The mop module 40 may generate 'a left-moment friction force' to rotate or turn the body 30 left, or 'a right-moment friction force' to rotate or turn the body 30 right. The mop module 40 may generate friction force in which any one of the forward-moving friction force and the rearward-moving friction force is combined with any one of the left moment friction force and the right moment friction force.

In order for the mop module 40 to generate the forward-moving friction force, the left spin mop 41a may rotate at a predetermined rpm R1 in the first normal direction w1f and the right spin mop 41b may rotate at the predetermined rpm R1 in the second normal direction w2f.

In order for the mop module 40 to generate the rearward-moving friction force, the left spin mop 41a may rotate at a predetermined rpm R2 in the first reverse direction w1r and the right spin mop 41b may rotate at the predetermined rpm R2 in the second reverse direction w2r.

In order for the mop module 40 to generate the right-moment friction force, the left spin mop 41a may rotate at a predetermined rpm R3 in the first normal direction w1f, and the right spin mop 41b may rotate in the second reverse direction w2r, may stop without rotation, or may rotate at a rpm R4 smaller the rpm R3 in the second normal direction w2f.

In order for the mop module 40 to generate the left-moment friction force, the right spin mop 41b may rotate at a predetermined rpm R5 in the second normal direction w2f, and the left spin mop 40b may rotate in the first reverse direction w1r, may stop without rotation, or may rotate at a rpm R6 smaller the rpm R5 in the second normal direction w1f.

Hereinafter, an arrangement of components or elements for improving friction force of the spin mops 41 arranged at a left side and a right side, improving stability in a left-right direction and a front-rear direction, and achieving stable driving regardless of a water level in a water tank 81.

Figure 39:
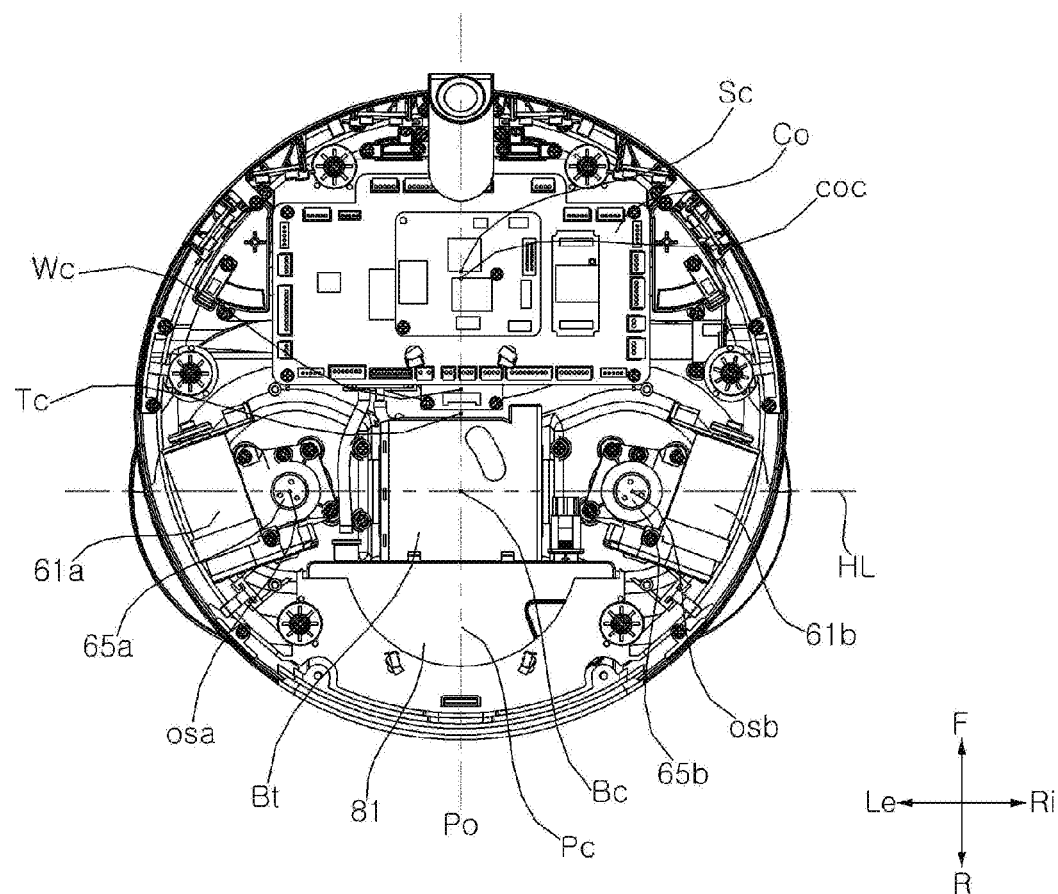
FIG. 39 is a plan view of the mobile robot of FIG. 1 viewed from an upper side in a state that a case is removed from the body for illustrating the center of gravity according to the present disclosure.

Referring to FIGS. 38 and 39, so as to increase the friction force by a spin mop 41 and limit occurrence of eccentricity in one direction when the mobile robot rotates, a mop motor 61 and a battery Bt that are relatively heavy may be disposed on an upper portion of a spin mop 41.

Specifically, a left-mop motor 61a may be disposed on a left spin mop 41a (at an upper side of the left spin mop 41a), and a right-mop motor 61b may be disposed on a right spin mop 41b (at an upper side of the right spin mop 41b). That is, at least a part of the left-mop motor 61a may be vertically overlapped with the left spin mop 41a. Preferably, an entire portion of the left-mop motor 61a may be vertically overlapped with the left spin mop 41a. At least a part of the right-mop motor 61b may be vertically overlapped with the right spin mop 41b. Preferably, an entire portion of the right-mop motor 61b may be vertically overlapped with the right spin mop 41b.

More specifically, the left-mop motor 61a and the right-mop motor 61b may be vertically overlapped with an imaginary central horizontal line HL connecting a spin rotation axis Osa of the left spin mop 41a and a spin rotation axis Osb of the right spin mop 41b. Preferably, a center of gravity (a center of gravity) MCa of the left-mop motor 61a and a center of gravity (a center of gravity) MCb of the right-mop motor 61b may be vertically overlapped with the imaginary central horizontal line HL connecting the spin rotation axis Osa of the left spin mop 41a and the spin rotation axis Osb of the right spin mop 41b. Alternatively, a geometric center of the left-mop motor 61a and a geometric center of the right-mop motor 61b may be vertically overlapped with the imaginary central horizontal line HL connecting the spin rotation axis Osa of the left spin mop 41a and the spin rotation axis Osb of the right spin mop 41b. The left-mop motor 61a and the right-mop motor 61b may be symmetrical with respect to a central longitudinal axis Po.

Since the center of gravity MCa of the left-mop motor 61a and the center of gravity MCb of the right-mop motor 61b do not deviate from the spin mop 41, and the left-mop motor 61a and the right-mop motor 61b are symmetrical to each other. Accordingly, the friction force of the spin mop 41 can be enhanced and running performance and a left-right balance can be maintained.

Hereinafter, the spin rotation axis Osa of the left spin mop 41a is referred to as a left spin rotation axis Osa, and the spin rotation axis Osb of the right spin mop 41b is referred to as a right spin rotation axis Osb.

The water tank 81 is disposed at a rear side of the central horizontal line HL, and an amount of water in the water tank 81 is variable. In order to maintain a stable front-rear balance regardless of a water level of the water tank 81, the left-mop motor 61a may be deviated to a left side from the left spin rotation axis Osa. The left-mop motor 61a may be deviated to a left front side from the left spin rotation axis Osa. Preferably, the geometric center of the left-mop motor 61a or the center of gravity MCa of the left-mop motor 61a may be deviated to the left side from the left spin rotation axis Osa, or the geometric center of the left-mop motor 61a or the center of gravity MCa of the left-mop motor 61*a* may be deviated to the left front side from the left spin rotation axis Osa.

The right-mop motor 61*b* may be deviated to a right direction from the right spin rotation axis Osb. The right-mop motor 61*b* may be deviated to a right front side from the right spin rotation axis Osb. Preferably, the geometric center of the right-mop motor 61*b* or the center of gravity MCb of the right-mop motor 61*b* may be deviated to the right side from the right spin rotation axis Osb, or the geometric center of the right-mop motor 61*b* or the center of gravity MCb of the right-mop motor 61*b* may be deviated to the right front side from the right spin rotation axis Osb.

Since the left-mop motor 61*a* and the right-mop motor 61*b* apply pressure at a position deviated from an outer front side from a center of each spin mop 41, pressure is concentrated on the outer front side of each spin mop 41. Therefore, running performance can be improved by the rotational force of the spin mop 41.

The left spin rotation axis Osa and the right spin rotation axis Osb are disposed at a rear side of the center of the body 30. The central horizontal line HL may be disposed at a rear side of the geometric center Tc of the body 30 and a center of gravity (a center of gravity) WC of the mobile robot. The left spin rotation axis Osa and the right spin rotation axis Osb are spaced apart at the same distance from the central longitudinal axis Po.

A left driving joint 65*a* may be disposed on the left spin mop 41*a* (at an upper side of the left spin mop 41*a*), and a right driving joint 65*a* may be disposed on the right spin mop 41*b* (at an upper side of the right spin mop 41*b*).

In the present embodiment, one battery Bt may be installed. At least a part of the battery Bt may be disposed on the left spin mop 41*a* and the right spin mop 41*b* (at upper sides of the left spin mop 41*a* and the right spin mop 41*b*). The battery Bt that is relative heavy is disposed on the spin mop 41 (at the supper side of the spin mop 41) to improve friction force by the spin mop 41 and reduce eccentricity caused by the rotation of the mobile robot.

Specifically, a part of a left portion of the battery Bt may be vertically overlapped with the left spin mop 41*a*, and a part of a right portion of the battery Bt may be vertically overlapped with the right spin mop 41*b*. The battery Bt may be vertically overlapped with the central horizontal line HL and may be vertically overlapped with the central longitudinal axis Po.

More specifically, a center of gravity (a center of gravity) BC of the battery Bt or a geometric center of the battery Bt may be disposed at the central longitudinal axis Po and may be disposed at the central horizontal line HL. The center of gravity BC of the battery Bt or the geometric center of the battery Bt may be disposed at the central longitudinal axis Po, may be disposed at a front side of the central horizontal line HL, and may be disposed at a rear side of the geometric center Tc of the body 30.

The center of gravity of the battery Bt or the geometric center of the battery Bt may be disposed at a front side of the water tank 81 or a center of gravity PC of the water tank 81. The center of gravity BC of the battery Bt or the geometric center Tc of the battery Bt may be disposed at a rear side of a center of gravity (a center of gravity) SC of the sweep module 2000.

One battery Bt is disposed at a middle portion between the left spin mop 41*a* and the right spin mop 41*b* and is disposed at the central horizontal line HL and the central longitudinal axis Po. The battery Bt that is heavy holds centers during rotation of the spin mops 41 and provides weight on the spin mop 41, thereby improving friction force by the spin mop 41.

A height of the battery Bt (a height of a lower end of the battery Bt) may be the same as heights of the left-mop motor 61*a* and the right-mop motor 61*b* (heights of lower ends of the left-mop motor 61*a* and the right-mop motor 61*b*). Alternatively, the battery Bt may be disposed on the same plane as the left-mop motor 61*a* and the right-mop motor 61*b*. The battery Bt may be disposed between the left-mop motor 61*a* and the right-mop motor 61*b*. The battery Bt may be disposed at an empty space between the left-mop motor 61*a* and the right-mop motor 61*b*.

At least a part of the water tank 81 may be disposed on the left spin mop 41*a* and the right spin mop 41*b* (at upper sides of the left spin mob 41*a* and the right spin mop 41*b*). The water tank 81 may be disposed at a rear side of the central horizontal line HL and may be vertically overlapped with the central longitudinal axis Po.

More specifically, a center of gravity (a center of gravity) PC of the water tank 81 or a geometric center of the water tank 81 may be disposed at the central longitudinal axis Po and may be positioned at a front side of the central horizontal line HL. As another example, the center of gravity PC of the water tank 81 or the geometric center of the water tank 81 may be disposed at the central longitudinal axis Po and may be positioned at a rear side of the central horizontal line HL. In this instance, the phrase that the center of gravity PC of the water tank 81 or the geometric center of the water tank 81 is disposed at the rear side of the central horizontal line HL may mean that center of gravity PC of the water tank 81 or the geometric center of the water tank 81 is vertically overlapped with a region deviated rearward from the central horizontal line HL. The center of gravity PC of the water tank 81 or the geometric center of the water tank 81 may be vertically overlapped with the body 30 without going beyond the body 30.

The center of gravity PC of the water tank 81 or the geometric center of the water tank 81 may be disposed at a rear side of the center of gravity BC of the battery Bt. The center of gravity of the water tank 81 PC or the geometric center of the water tank 81 may be disposed at a rear side of the center of gravity SC of the sweep module 2000.

A height of the water tank 81 (a height of a lower end of the water tank 81) may be the same as heights of the left-mop motor 61*a* and the right-mop motor 61*b* (heights of lower ends of the left-mop motor 61*a* and the right-mop motor 61*b*). Alternatively, the water tank 81 may be disposed on the same plane as the left-mop motor 61*a* and the right-mop motor 61*b*. The water tank 81 may be disposed at an empty space between the left-mop motor 61*a* and the right-mop motor 61*b*.

The sweep module 2000 may be disposed at a front side of the spin mops 41, the battery Bt, the water tank 81, the mop driving unit 60, the right-mop motor 61*b*, and the left-mop motor 61*a* at the body.

The center of gravity SC of the sweep module 2000 or a geometric center of the sweep module 2000 may be disposed at the central longitudinal axis Po and may be disposed at a front side of the geometric center Tc of the body 30. When viewed from an upper side, the body 30 may have a circular shape and the base 32 may have a circular shape. The geometrical center Tc of the body 30 may means a center of the body 30 when the body 30 has the circular shape. Specifically, when viewed from an upper side, the body 30 may have a circular shape with a half-diameter error of less of 3%.

Specifically, the center of gravity SC of the sweep module 2000 or the geometric center of the sweep module 2000 may be disposed at the central longitudinal axis Po, and may be disposed at a front side of the center of gravity BC of the battery Bt, the center of gravity PC of the water tank 81, the center of gravity MCa of the left-mop motor 61a, the center of gravity MCb of the right-mop motor 61b, and the center of gravity WC of the mobile robot.

Preferably, the center of gravity SC of the sweep module 2000 or the geometric center of the sweep module 2000 may be disposed at a front side of the central horizontal line HL and a front end of the spin mops 41.

The sweep module 2000 may include a dust housing 2100 having a storage space 2104, an agitator 2200, and a sweep motor 2330 as described above.

The agitator 2200 may be rotatably installed on the dust housing 2100 and may be disposed at a rear side of the storage space 2104. Therefore, the agitator 2200 may have an appropriate length to cover the left and right spin mops 41a and 41b and not to protrude to an outside of the body.

A rotation axis of the agitator 2200 may be parallel to the central horizontal line HL, and a center of the agitator 2200 may be positioned at the imaginary central longitudinal axis Po. Therefore, a large foreign material flowing into the spin mops 41 can be effectively removed by the agitator 2200. The rotation axis of the agitator 2200 may be disposed at a front side of the geometric center Tc of the body 30. A length of the agitator 2200 may be preferably longer than a distance between the left spin rotation axis Osa and the right spin rotation axis Osb. The rotation axis of the agitator 2200 may be disposed to be adjacent to a front end of the spin mop 41.

A left caster 58a and a right caster 58b being in contact with the floor may be further provided at both ends of the dust housing 2100. The left caster 58a and the right caster 58b are rolled while being in contact with the floor and may move up and down by elastic force. The left caster 58a and the right caster 58b may support the sweep module 2000 and a part of the body. The left caster 58a and the right caster 58b may protrude from a lower end of the dust housing 2100 to a lower side.

The left caster 58a and the right caster 58b are disposed at a line parallel to the central horizontal line HL, and may be disposed at a front side of the central horizontal line HL and the agitator 2200. An imaginary line connecting the left caster 58a and the right caster 58b may be disposed at a front side of the central horizontal line HL, the agitator 2200, and the geometric center Tc of the body 30. The left caster 58a and the right caster 58b may be bisymmetrical to each other with respect to the central longitudinal axis Po. The left caster 58a and the right caster 58b may be spaced apart at the same distance from the central longitudinal axis Po.

The geometric center Tc of the body 30, the center of gravity WC of the mobile robot, the center of gravity SC of the sweep module 2000, and the center of gravity BC of the battery Bt may be disposed in an imaginary quadrangle formed by sequentially connecting the left caster 58a, the right caster 58b, the right spin rotation axis Osb, and the left spin rotation axis Osa. The battery Bt, which is relatively heavy, the left spin rotation axis Osa, and the right spin rotation axis Osb may be disposed to be adjacent to the central horizontal line HL. Then, a main load of the mobile robot may be applied to the spin mops 41 and a remaining sub-load may be the left caster 58a and the right caster 58b.

Figure 19:
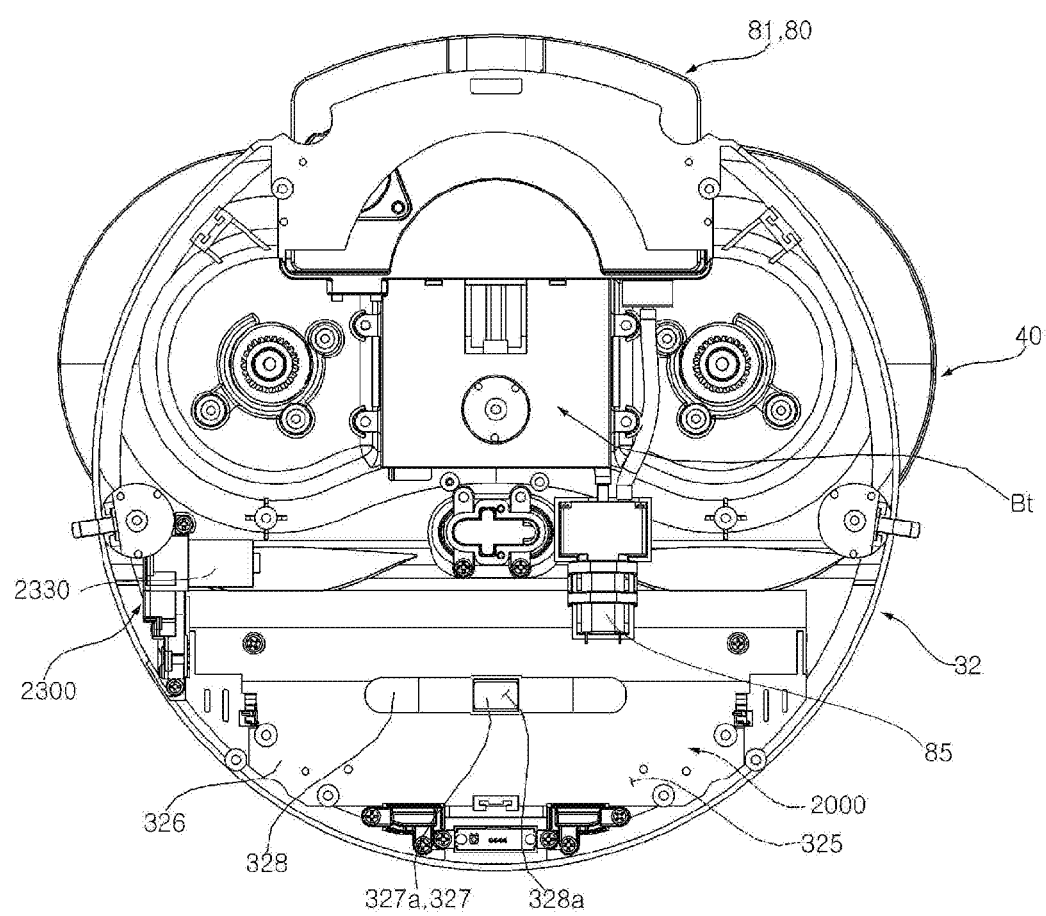
FIG. 19 is a plan view of the mobile robot of FIG. 1 in a state that a case is removed.
Figure 20:
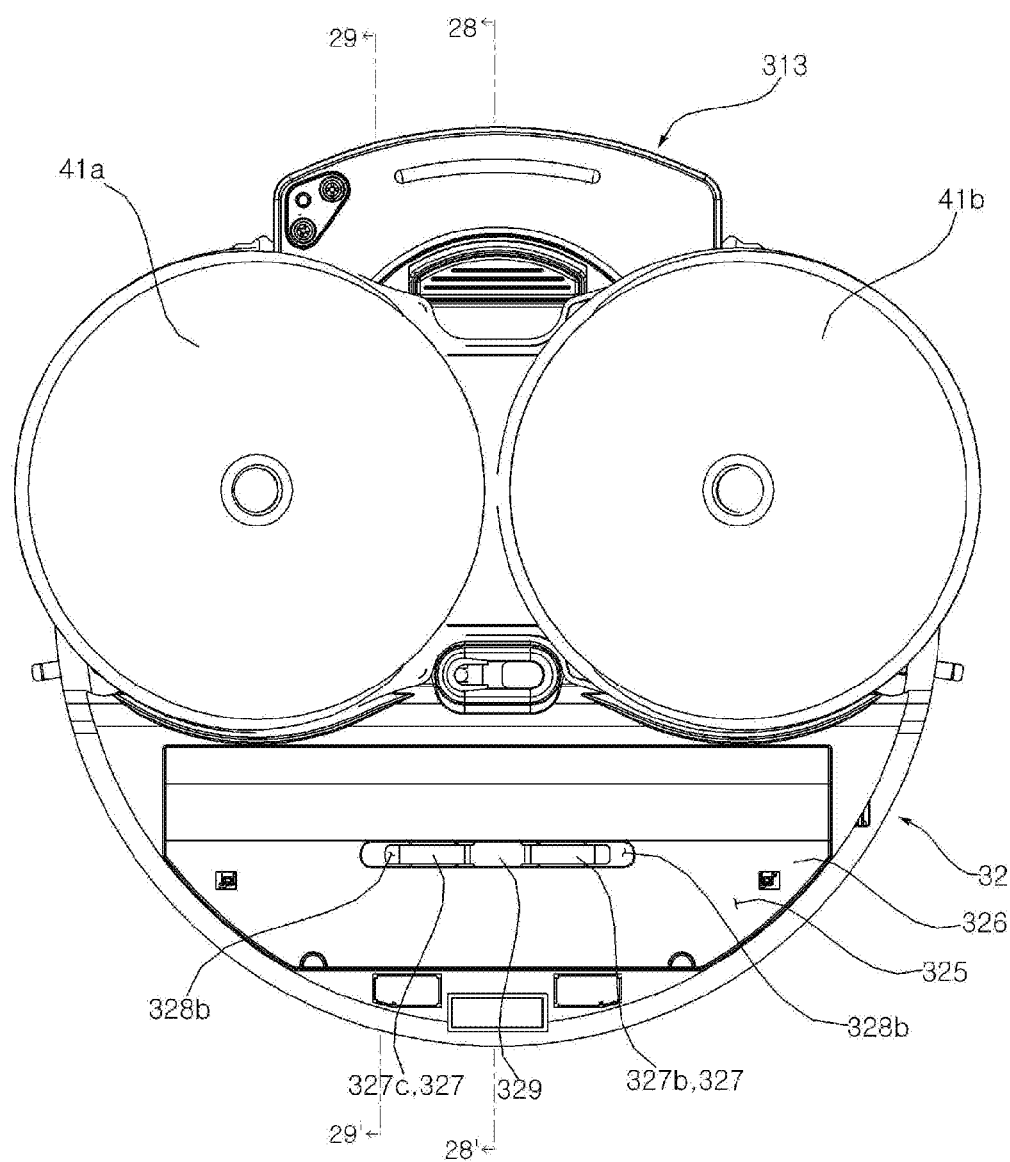
FIG. 20 is a bottom view of the mobile robot shown in FIG. 19.
Figure 21:
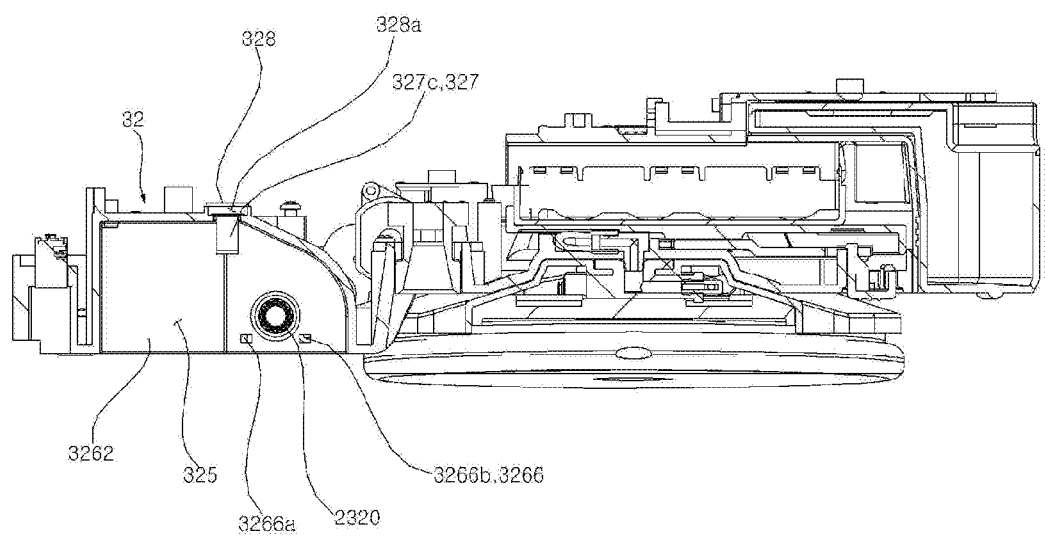
FIG. 21 is a right cross-sectional view of the mobile robot shown in FIG. 19.

The sweep motor 2330 may disposed at the central longitudinal axis Po. When the sweep motor 2330 is disposed at one side based on the central longitudinal axis Po, the pump 85 is disposed at the other side based on the central longitudinal axis Po (refer to FIG. 19) so that a sum center of gravity of the sweep motor 2330 and the pump 85 may be disposed on the central longitudinal axis Po.

Therefore, the center of gravity of the mobile robot at a relatively front side is maintained regardless of the water level of the water tank 81 disposed at a rear side, thereby increasing friction force by the spin mop 41. Also, the center of gravity WC of the mobile robot is disposed to be adjacent to the geometric center Tc of the body 30 and thus stable driving can be achieved.

A center of gravity (a center of gravity) COC of a controller Co or a geometric center of the controller Co may be disposed at a front side of the geometric center Tc of the body 30 and the central horizontal line HL. At least a 50% or more portion of the controller Co may be vertically overlapped with the sweep module 2000.

The center of gravity WC of the mobile robot may be disposed at the central longitudinal axis Po, may be disposed at a front side of the central horizontal line HL, may be disposed at a front side of the center of gravity BC of the battery Bt, and may be disposed at a front side of the center of gravity PC of the water tank 81, may be disposed at a rear side of the center of gravity SC of the sweep module 2000, and may be disposed at a rear side of the left caster 58a and the right caster 58b.

By disposing components or elements symmetrically with respect to the central longitudinal axis Po or considering weights of the components or elements, the center of gravity WC of the mobile robot is disposed at the central longitudinal axis Po. Accordingly, stability in a left-right direction can be improved.

Figure 40:
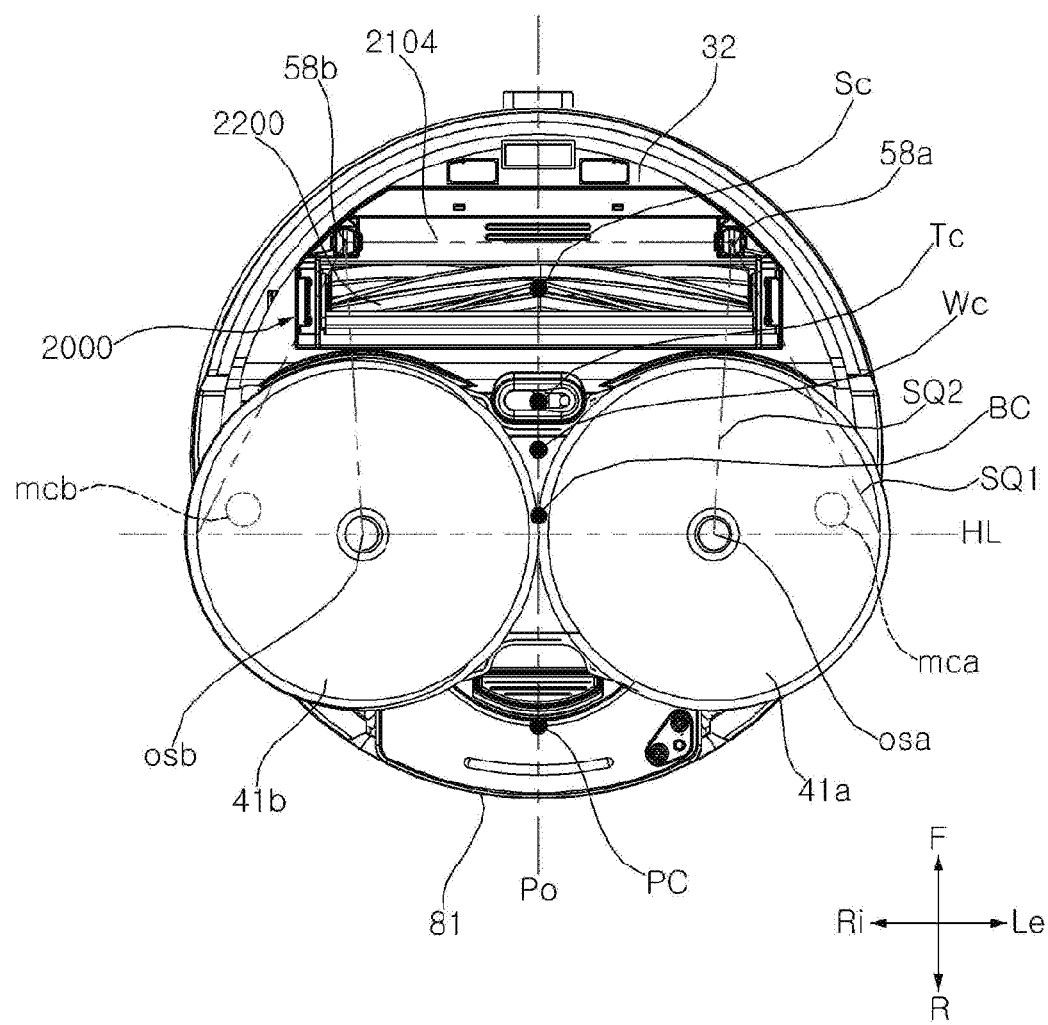
FIG. 40 is a bottom view of a mobile robot according to another embodiment of the present disclosure for illustrating a relationship between a center of gravity and other components.

FIG. 40 is a bottom view of a mobile robot according to another embodiment of the present disclosure for explaining a relationship between a center of gravity and other components.

Referring to FIG. 40, an embodiment will be described. A difference compared to the embodiment described with reference to FIG. 38 will be mainly described. A component or an element that is not described with respect to FIG. 40 may be regarded as the same as that of the embodiment described with reference to FIG. 38.

A center of gravity WC of a mobile robot and a geometric center Tc of a body 30 may be disposed in an imaginary second quadrangle SQ2 formed by sequentially connecting a left caster 58a, a right caster 58b, a right spin rotation axis Osb, and a left spin rotation axis Osa. A center of gravity MCa of a left-mop motor, a center of gravity MCb of a right-mop motor, and a center of gravity PC of a water tank may be disposed at an outside of the imaginary second quadrangle SQ2.

Also, a center of gravity WC of a mobile robot, a geometric center Tc of a body 30, a center of gravity BC of a battery Bt may be disposed in an imaginary second quadrangle SQ2 formed by sequentially connecting a left caster 58a, a right caster 58b, a right spin rotation axis Osb, and a left spin rotation axis Osa.

In addition, a center of gravity WC of a mobile robot, a geometric center Tc of a body 30, and a center of gravity SC of a sweep module 2000, may be disposed in an imaginary second quadrangle SQ2 formed by sequentially connecting a left caster 58a, a right caster 58b, a right spin rotation axis Osb, and a left spin rotation axis Osa.

Further, a center of gravity WC of a mobile robot, a geometric center Tc of a body 30, a center of gravity SC of a sweep module 2000, and a center of gravity BC of a battery Bt may be disposed in an imaginary second quadrangle SQ2 formed by sequentially connecting a left caster 58*a*, a right caster 58*b*, a right spin rotation axis Osb, and a left spin rotation axis Osa.

The center of gravity WC of the mobile robot, the geometric center TC of the body, the center of gravity SC of the sweep module 2000, and the center of gravity BC of the battery Bt may be disposed in the second quadrangle SQ2, and the center of gravity MCa of the left-mop motor and the center of gravity MCb of the right-mop motor may be disposed at an outside of the second quadrangle SQ2. Then, the mobile robot can apply appropriate friction force to the mop portion while stably travelling.

The center of gravity WC of the mobile robot and the geometric center TC of the body may be disposed in the second quadrangle SQ2, and the center of gravity MCa of the left-mop motor and the center of gravity MCb of the right-mop motor may be disposed at an outside of the second quadrangle SQ2. Then, the mobile robot can apply appropriate friction force to the mop portion while stably travelling.

The center of gravity WC of the mobile robot and the geometric center TC of the body may be disposed in an imaginary first quadrangle SQ1 formed by sequentially connecting the left caster 58*a*, the right caster 58*b*, the lowest point at a lower surface of the right spin mop 41*b*, and the lowest point at a lower surface of the left spin mop 41*a*. The center of gravity MCa of the left-mop motor and the center of gravity MCb of the right-mop motor may be disposed at an outside of the first quadrangle SQ1.

Figure 41:
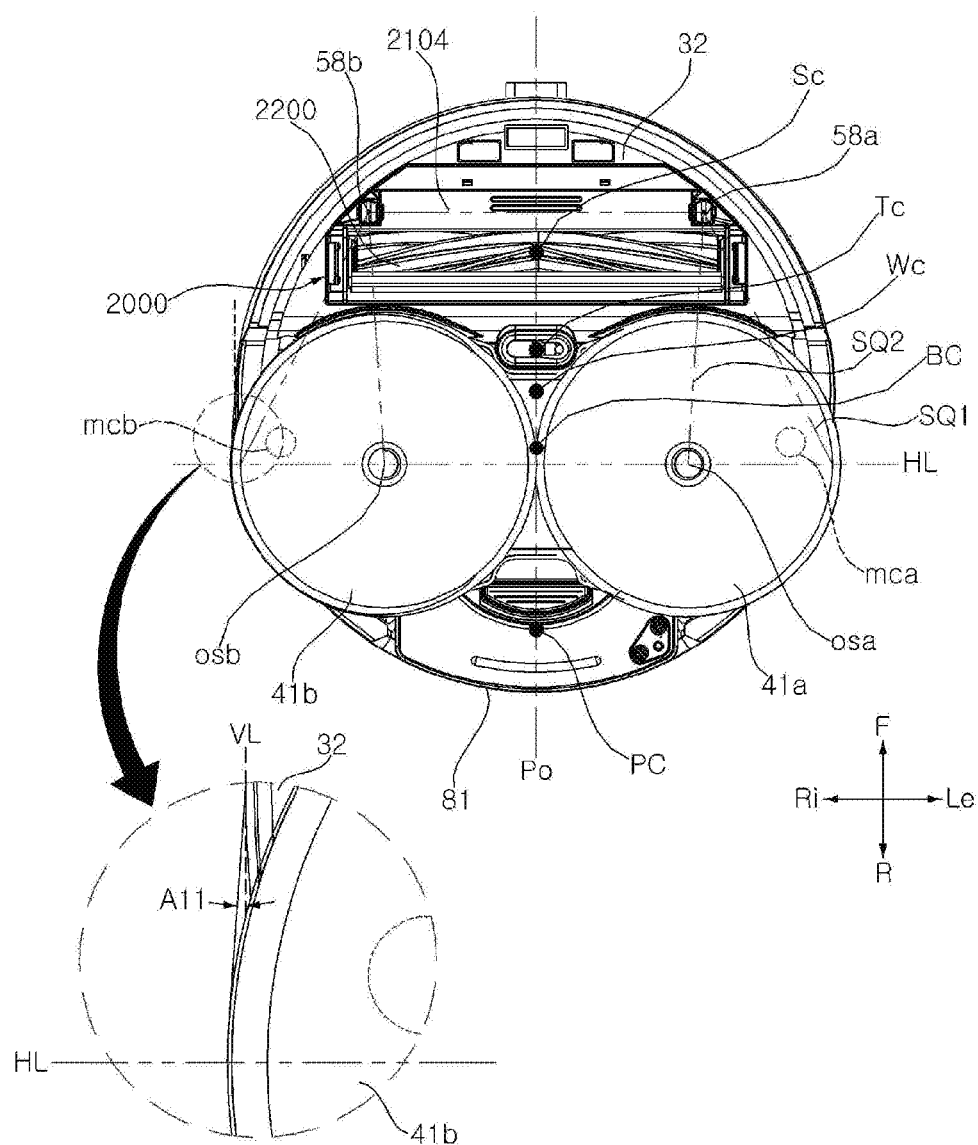
FIG. 41 is a bottom view of a mobile robot according to still another embodiment of the present disclosure for illustrating a relationship between a center of gravity and other components.

FIG. 41 is a bottom view of a mobile robot according to still another embodiment of the present disclosure for explaining a relationship between a center of gravity and other components.

A difference of an embodiment with reference to FIG. 41 compared to the embodiment described with reference to FIG. 38 will be mainly described. A component or an element that is not described with respect to FIG. 41 may be regarded as the same as that of the embodiment described with reference to FIG. 38.

Referring to FIG. 41, a center of gravity MCa of a left-mop motor 61*a* and a center of gravity MCb of a right-mop motor 61*b* may be disposed at a front side of an imaginary central horizontal line HL connecting a spin rotation axis Osa of a left spin mop 41*b* and a spin rotation axis Osb of a right spin mop 41*b*. In this instance, the center of gravity MCa of the left-mop motor 61*a* and the center of gravity MCb of the right-mop motor 61*b* are disposed at an upper side of the each spin mop 41 without going beyond the each spin mop 41, and are bisymmetrical to each other based on a central longitudinal axis Po. Thereby, running performance and a left-right balance can be maintained while improving friction force by the spin mop 41.

In addition, the left-mop motor 61*a* may be deviated to a left side from the left spin rotation axis Osa. Moreover specifically, the left-mop motor 61*a* may be disposed to be deviated to a left front side from the left spin rotation axis Osa.

The right-mop motor 61*b* may be deviated to a right side from the right spin rotation axis Osb. Moreover specifically, the right-mop motor 61*b* may be deviated to a right front side from the right spin rotation axis Osb.

Since the left-mop motor 61*a* and the right-mop motor 61*b* apply pressure to a position deviated to an outer front side from a center of each spin mop 41, the pressure is concentrated on the outer front side of each spin mop 41. Therefore, running performance can be improved by the rotational force of the spin mop 41.

A ratio of an area where the left spin mop 41*a* or the right spin mop 41*b* is vertically overlapped with the body 30 may be preferably 85% to 95% of each spin mop. Specifically, an angle A11 between a line L11 connecting a right end of the right spin mop 41*b* and a vertical line VL parallel to the central longitudinal axis Po at the right end of the body may be 0 to 5 degrees.

A length of a portion of each spin mop 41 exposed to an outside of the body may be preferably ⅐ to ½ of a radius of each spin mop 41. The length of the portion of each spin mop 41 exposed to the outside of the body may mean a distance from one end of each spin mop 41 exposed to the outside of the body to an end of the body in a radial axis.

A distance between a geometric center TC and one end of the portion of each spin mop 41 exposed to the outside of the body may be greater than an average radius of the body.

Considering a relationship with a sweep module, a portion of each spin mop exposed to the outside may be located between a lateral side of the body 30 and a rear side of the body 30. That is, quadrants are sequentially positioned in a clockwise direction when viewed from a lower side of the body, the portion of each spin mop exposed to the outside may be a ⅔ quadrant or a ¾ quadrant of the body 30.

Figure 42:
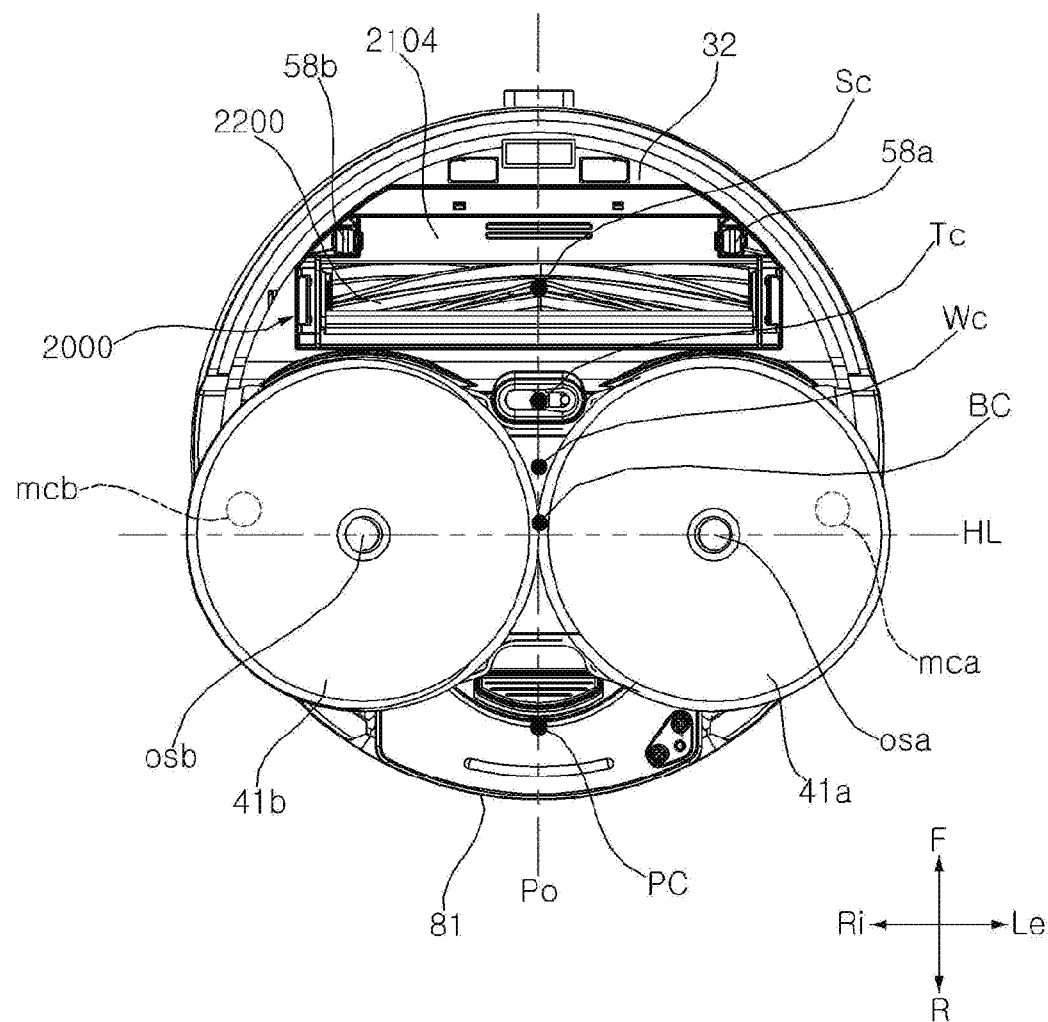
FIG. 42 is a bottom view for illustrating a relationship between a center of gravity and other components when water is full in a water tank of a mobile robot of FIG. 1.
Figure 43:
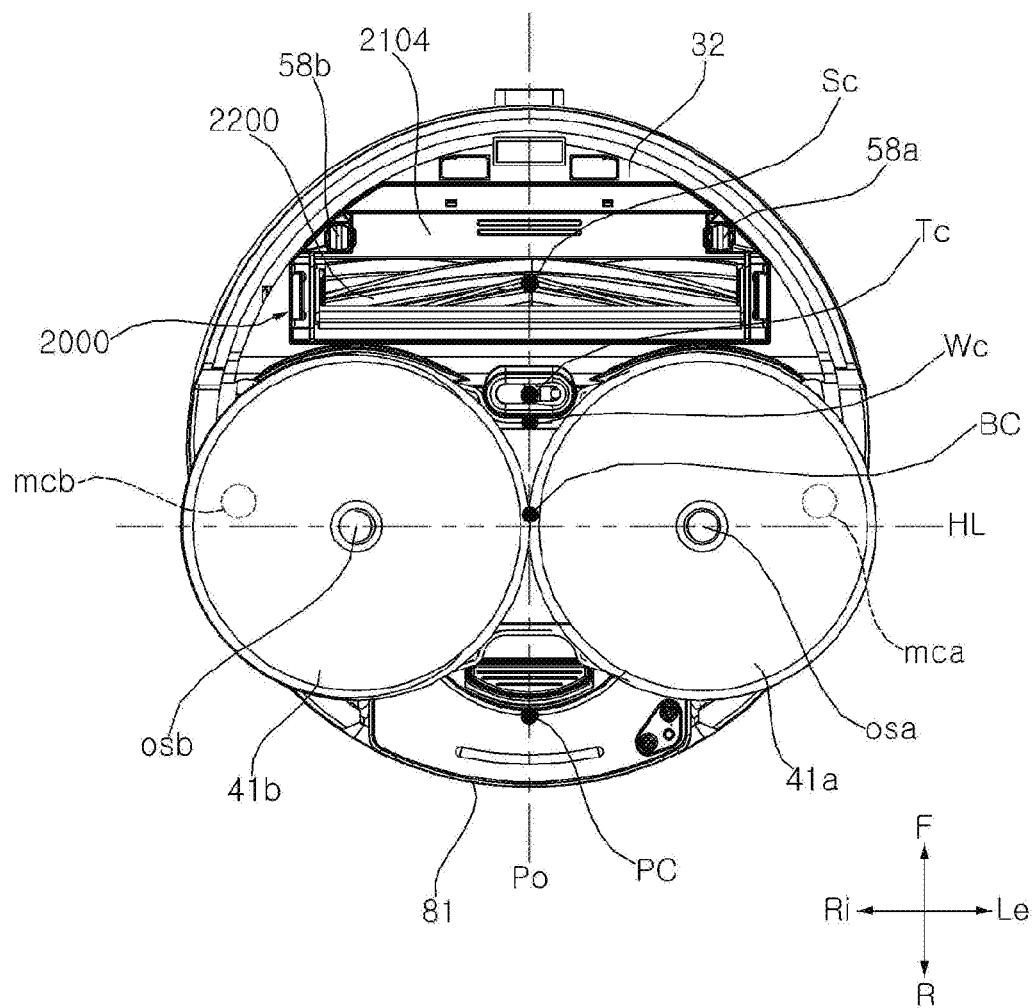
FIG. 43 is a bottom view for illustrating the relationship between the center of gravity and other components when the water is absent in the water tank of the mobile robot of FIG. 42.

FIG. 42 is a bottom view for explaining a relationship between a center of gravity and other components when water is full in a water tank of a mobile robot of FIG. 1. FIG. 43 is a bottom view for explaining the relationship between the center of gravity and other components when the water is absent in the water tank of the mobile robot of FIG. 42.

Referring to FIG. 42 and FIG. 43, an embodiment will be described. A difference compared to the embodiment described with reference to FIG. 38 will be mainly described. A component or an element that is not described with respect to FIG. 42 and FIG. 43 may be regarded as the same as that of the embodiment described with reference to FIG. 38.

A center of gravity WC of a mobile robot may move along a central longitudinal axis Po according to an amount of water in a water tank 81. Specifically, the center of gravity WC of the mobile robot gradually moves toward a front side of the mobile robot as the amount of water in the water tank 81 decreases. The center of gravity WC of the mobile robot is located at a rear side of a geometric center Tc of the body 30 even when there is no water in the water tank 81.

That is, the center of gravity WC of the mobile robot moves along the central longitudinal axis Po according to the amount of water in the water tank 81, and a movement range of the center of gravity WC of the mobile robot is between the geometric center Tc of the body 30 and the central horizontal line HL.

If it is not considered that the center of gravity WC of the mobile robot varies according to the amount of water in the water tank 81, when there is no water in the water tank 81 or the water is full in the water tank 81, the center of gravity of the mobile robot WC may be at a front side of a front end of the spin mop 41 or at a rear side of a rear end of the spin mop 41. Then, movement of the mobile robot may become unstable and load cannot be properly applied to the mop.

Therefore, in the present disclosure, even if the water of the water tank 81 is used, the center of gravity WC of the mobile robot does not deviate between the front end and the rear end of the spin mop 41, thereby properly applying friction force to the mop and achieving stable driving.

Figure 44:
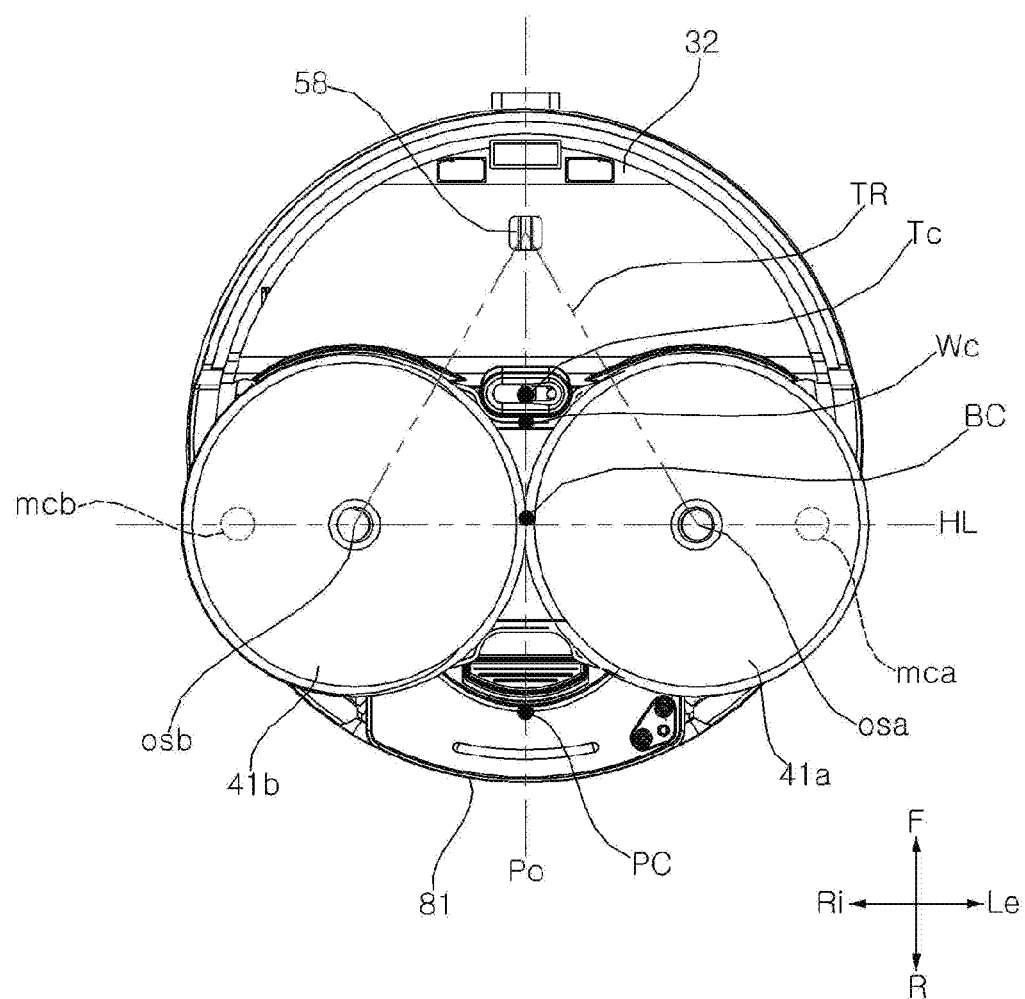
FIG. 44 is a bottom view of a mobile robot according to yet another embodiment of the present disclosure for illustrating a relationship between a center of gravity and other components.

FIG. 44 is a bottom view of a mobile robot according to yet another embodiment of the present disclosure for explaining a relationship between a center of gravity and other components.

Referring to FIG. 44, an embodiment will be described. A difference compared to the embodiment described with reference to FIG. 38 will be mainly described. A component or an element that is not described with respect to FIG. 44 may be regarded as the same as that of the embodiment described with reference to FIG. 38.

In the present embodiment, a sweep module 20 is omitted in the embodiment with reference to FIG. 38. One caster 58 may be disposed at a central longitudinal axis Po, and may be disposed at a front side of a center of gravity of the battery Bt, a center of gravity WC of the mobile robot, a right spin rotation axis Osb, a left spin rotation axis Osa, and a geometric center TC of a body. The center of gravity WC of the mobile robot and the geometric center TC of the body may be disposed in an imaginary triangle TR formed by sequentially connecting the caster 58, the right spin rotation axis Osb, and the left spin rotation axis Osa. A center of gravity MCa of a left-mop motor, a center of gravity MCb of a right-mop motor, and a center of gravity PC of a water tank may be disposed at an outside of the imaginary triangle TR.

In addition, the center of gravity WC of the mobile robot, the geometric center TC of the body, and the center of gravity BC of the battery Bt may be disposed in the imaginary triangle TR formed by sequentially connecting the caster 58, the right spin rotation axis Osb, and the left spin rotation axis Osa.

According to the present disclosure, a body has a circular shape and a dry-type module does not protrude to an outside of the body. Accordingly, the robot cleaner can be freely rotated at any position in a cleaning area. Also, an agitator can have a sufficiently large width, and thus, a cleaning range can be wide, and both of collecting and mopping a foreign material having a relatively large size can be operated.

In addition, according to the present disclosure, friction force of a mop can be increased and efficiency of mopping a floor can be enhanced by disposing a battery and a motor that are heavier than other components or elements on the spin mop to be vertically overlapped with the spin mop.

In addition, according to the present disclosure, friction force of a mop can be increased and efficiency and accuracy of mopping a floor can be enhanced. Accordingly, in a cleaner running or traveling by friction force of a mop, an accurate driving pattern can be performed and more meticulous cleaning can be performed than in the case of a random driving of the mobile robot.

In addition, according to the present disclosure, a robot cleaner or a mobile robot are in contact with a floor by a pair of spin mops at left and right sides and auxiliary wheels spaced apart from the spin mops in a front direction and spaced apart from each other in a left-right direction. Also, through appropriately disposing a component or an element that is relatively heavy and other component or element, a center of gravity of the robot cleaner or the mobile robot is positioned within an imaginary quadrangle formed by the pair of auxiliary wheels and the pair of spin mops. Accordingly, an overturn of the robot cleaner or the mobile robot to a front side can be prevented by a sweep module, and an overturn of the robot cleaner or the mobile robot to a rear side can be prevented by a mop surface of a mop module. Thus, stable driving is possible regardless of a water level of a water tank.

In addition, a sweep module provides friction force against shaking of a mop module in a left-right direction, and thus, a robot cleaner or a mobile robot can move straight while moving due to the friction force of the mop surface.

In addition, according to the present disclosure, a water level is exposed to a rear side of a body so that a user intuitively knows the water lever, considering a spatial limitation. Also, a center of gravity of a battery that is relatively heavy is disposed between a geometric center of a body and a central horizontal surface connecting central axes of a pair of spin mops, and the pair of spin mops are disposed at a central horizontal line or at an upper side of the central horizontal line. Accordingly, a center of gravity of a robot cleaner or a mobile robot can be deviated to a front side of the central horizontal line through appropriately disposing the component or element that is relatively heavy.

In addition, by applying the largest friction force to a left front of a lower surface of a left spin mop and applying the largest friction force to a right front side of a lower surface of a right spin mop, a ratio of weight of a rear side to weight of a front side is increased with respect to an imaginary axis connecting the two points Pla and Plb that receive the greatest friction force. In this case, with regard to a total load of the robot cleaner, a ratio of a load transmitted to a mop module to a load transmitted to a sweep module can be increased. Therefore, mopping efficiency and driving efficiency can be enhanced by a rotation operation of the mop module.

Furthermore, a pair of auxiliary wheels, a pair of mop driving units, and a pair of mop motors are symmetrical to each other, respectively, with respect to a central longitudinal axis, and a center of gravity or a geometric center of a battery, a water tank, or an agitator is disposed at the central longitudinal axis. Therefore, stability in a left-right direction can be enhanced and driving control can be more accurate.

Further, through disposing a center of gravity of a water tank, a battery and/or a pump at the central longitudinal axis, the driving control can be more accurate.

In addition, by providing a collection driving unit including a motor rotation axis disposed at the central longitudinal axis, the collection driving unit can be symmetrically provided with respect to the central longitudinal axis. On the other hand, a gap is formed between a pair of collection portions and between a pair of sweeping portions, respectively, it assists that the collection driving unit is disposed at the central longitudinal axis and that the collection driving unit is bisymmetrical or has a bi-lateral symmetry.

A sweep module is disposed at a front side of a mop module, and a pair of sweeping members are disposed at a front side of a pair of collection portions. Therefore, it is possible to mop a floor where sweeping of a foreign material was performed while following the swept portion. Accordingly, efficient cleaning can be possible.

What is claimed is:

1. A mobile robot, comprising:
   a body;
   a left caster and a right caster, each of the left and right casters being configured to support the body and contact a floor;
   a left spin mop rotatably mounted on the body, configured to support the body, and disposed at a rear side of the left caster and the right caster;
   a right spin mop rotatably mounted on the body, configured to support the body, and disposed at a rear side of the left caster and the right caster;
   a left-mop motor installed on the body and supplying driving force to the left spin mop; and
   a right-mop motor installed on the body and supplying driving force to the right spin mop,
   wherein a center of gravity of the mobile robot is positioned at a rear side of a geometric center of the body, wherein the left-mop motor is disposed on the left spin mop, and the right-mop motor is disposed on the right spin mop, wherein the left-mop motor vertically overlaps the left spin mop and is positioned at a left front side of the mobile robot relative to a spin rotation axis of the left spin mop, wherein the right-mop motor vertically overlaps with the right spin mop and is positioned at a tight front side of the mobile robot relative to a spin rotation axis of the right spin mop, wherein the center of gravity of the mobile robot and the geometric center of the body are positioned within an imaginary quadrangle formed by sequentially connecting the left caster, the right caster, the spin rotation axis of the right spin mop, and the spin rotation axis of the left spin mop, wherein a center of gravity of the left-mop motor and a center of gravity of the right-mop motor are positioned at an outside of the imaginary quadrangle, wherein the mobile robot further comprises:
a battery mounted on the body and configured to supply power to the left-mop motor and the right-mop motor; and
a water tank disposed on the body and configured to store water to be supplied to the left spin mop and the right spin mop, wherein at least a part of the battery is disposed on the left spin mop and the right spin mop, wherein the water tank is vertically overlapped with a central longitudinal axis of the mobile robot, wherein a center of gravity of the battery is positioned at an imaginary central horizontal line connecting the spin rotation axis of the left spin mop and the spin rotation axis of the right spin mop, and wherein a center of gravity of the water tank is positioned at a rear side of the imaginary central horizontal line.

2. The mobile robot of claim 1, further comprising:
a sweep module disposed on the body at a front side of the left spin mop and the right spin mop and spaced apart from the left spin mop and the right spin mop, and configured to collect a foreign material on the floor,
wherein a center of the sweep module is positioned at a central longitudinal axis of the mobile robot.

3. The mobile robot of claim 1, wherein the left-mop motor and the right-mop motor vertically overlap with a central horizontal line connecting the spin rotation axis of the left spin mop and the spin rotation axis of the right spin mop.

4. The mobile robot of claim 1, wherein the left-mop motor and the right-mop motor are symmetrically arranged with respect to each other and with respect to a central longitudinal axis of the mobile robot.

5. The mobile robot of claim 1, wherein the battery vertically overlaps with an imaginary central horizontal line connecting e spin rotation axis of the left spin mop and the spin rotation axis of the right spin mop.

6. The mobile robot of claim 1, wherein the spin rotation axis of the left spin mop and the spin rotation axis of the right spin mop are disposed at the rear side of the geometric center of the body.

7. The mobile robot of claim 1, wherein the battery vertically overlaps with the central longitudinal axis and is disposed at a front side of the water tank.

8. The mobile robot of claim 1, wherein the center of gravity of the mobile robot changes position along the central longitudinal axis according to an amount of the water in the water tank.

9. The mobile robot of claim 1, wherein a center of gravity of the battery and a center of gravity of the water tank are positioned along the central longitudinal axis.

10. The mobile robot of claim 2, wherein the center of the sweep module is positioned at a front side of the geometric center of the body.

11. The mobile robot of claim 2, wherein a center of gravity of the sweep module is positioned within an imaginary quadrangle formed by sequentially connecting the left caster, the right caster, the spin rotation axis of the right spin mop, and the spin rotation axis of the left spin mop.

12. The mobile robot of claim 2, wherein the left caster and the right caster are mounted on the sweep module.

13. A mobile robot, comprising:
a body;
a left caster and a right caster, each of the left and right casters being configured to support the body and contact a floor;
a left spin mop and a right spin mop, each of the left and right spin mops being rotatably mounted on the body and configured to support the body;
a left-plop motor and a right-mop motor mounted on the body and supplying driving force to the left spin mop and the right spin mop, respectively;
a sweep module disposed on the body at a front side of the left spin mop and the right spin mop and spaced apart from the left spin mop and the right spin mop, the sweep module being configured to collect foreign material on a floor;
a battery configured to supply power to the left-mop motor and the right-mop motor and disposed at a side of the body that is rearward from the sweep module; and a water tank configured to store water to be supplied to the left spin mop and the right spin mop, the water tank being positioned at a side of the body that is rearward from the battery, wherein a center of gravity of the battery, a center of gravity of the water tank, and a center of gravity of the sweep module are positioned along a central longitudinal axis of the mobile robot, wherein the left spin mop and the right spin mop are symmetrically arranged with respect to each other and with respect to the central longitudinal axis, wherein the left-mop motor is disposed on the left spin mop, and the right-mop motor is disposed on the right spin mop, wherein the left-mop motor vertically overlaps the left spin mop and is positioned at a left front side of the mobile robot relative to a spin rotation axis of the left spin mop, wherein the right-mop motor vertically overlaps with the right spin mop and is positioned at a right front side of the mobile robot relative to a spin rotation axis of the right spin mop, wherein the center of gravity of the mobile robot, and a geometric center of the body are positioned within an imaginary quadrangle formed by sequentially connecting the left caster, the right caster, the spin rotation axis of the right spin mop, and the spin rotation axis of the left spin mop, wherein a center of gravity of the left-mop motor and a center of gravity of the right-mop motor are positioned at an outside of the imaginary quadrangle, wherein the center of gravity of the battery is positioned between a center of the body and an imaginary central horizontal line connecting the spin rotation axis of the left spin mop and the spin rotation axis of the right spin mop, and wherein the center of gravity of the water tank is positioned at a rear side of the imaginary central horizontal line.

\* \* \* \* \*